US011948116B2

(12) United States Patent
Epstein et al.

(10) Patent No.: US 11,948,116 B2
(45) Date of Patent: *Apr. 2, 2024

(54) SYSTEMS AND METHODS FOR RISK DATA NAVIGATION

(71) Applicant: 1nteger, LLC, Los Angeles, CA (US)

(72) Inventors: Matthew Epstein, Los Angeles, CA (US); Benjamin Schmidt, Los Angeles, CA (US); David R. Elam, Los Angeles, CA (US)

(73) Assignee: 1nteger, LLC, Los Angeles, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/865,046

(22) Filed: Jul. 14, 2022

(65) Prior Publication Data
US 2023/0004889 A1 Jan. 5, 2023

Related U.S. Application Data

(63) Continuation-in-part of application No. 17/705,185, filed on Mar. 25, 2022, now Pat. No. 11,734,633,
(Continued)

(51) Int. Cl.
G06Q 10/0635 (2023.01)
G06F 16/28 (2019.01)
(Continued)

(52) U.S. Cl.
CPC ......... *G06Q 10/0635* (2013.01); *G06F 16/28* (2019.01); *G06F 16/3331* (2019.01);
(Continued)

(58) Field of Classification Search
CPC .. G06Q 10/0635; G06Q 40/08; G06Q 30/018; G06Q 50/0265; G06Q 30/02;
(Continued)

(56) References Cited

U.S. PATENT DOCUMENTS 7,315,626 B2  1/2008  Pedersen
7,315,826 B1  1/2008  Guheen et al.
(Continued)

FOREIGN PATENT DOCUMENTS

EP  1755056 A1  2/2007
EP  3000041 A4  5/2017
WO  2015/019364 A2  2/2015

OTHER PUBLICATIONS

European Search Report for Application No. EP 18000756.9, dated Nov. 8, 2018.
(Continued)

*Primary Examiner* — Rutao Wu
*Assistant Examiner* — Stephen S Swartz
(74) *Attorney, Agent, or Firm* — Fox Rothschild LLP

(57) ABSTRACT

A computer implemented system, method, or computer readable medium for providing a visual interactive software tool that permits users to investigate and evaluate financial, trade, and business-related risks. An interactive tool is provided that can integrate front and back end capabilities to, for example, provide quick and efficient navigation to pertinent information in a visual workspace. The system, method, or computer readable medium can be configured to include a software engine that identifies corridors or other subgraph features in accordance with automated traversal based on a set of rules. The features can provide a notification and selective visual access to risk-related subgraphs based on topic, category, or sanctions as a virtual lens for the user in connection with a displayed node.

30 Claims, 24 Drawing Sheets

Related U.S. Application Data which is a continuation of application No. 17/243,384, filed on Apr. 28, 2021, now Pat. No. 11,734,632, which is a continuation of application No. 16/782,043, filed on Feb. 4, 2020, now Pat. No. 10,997,541, which is a continuation-in-part of application No. 16/506,772, filed on Jul. 9, 2019, now abandoned, which is a continuation of application No. 16/104,706, filed on Aug. 17, 2018, now Pat. No. 10,373,091, which is a continuation of application No. 15/713,260, filed on Sep. 22, 2017, now Pat. No. 10,127,511.

(51) Int. Cl.
| | | |
|---|---|---|
| *G06F 16/33* | (2019.01) | |
| *G06Q 30/018* | (2023.01) | |
| *G06Q 30/02* | (2023.01) | |
| *G06Q 40/08* | (2012.01) | |
| *G06Q 50/26* | (2012.01) | |
| *G06F 16/2457* | (2019.01) | |
| *G06F 16/901* | (2019.01) | |

(52) U.S. Cl.
CPC ........... *G06Q 30/018* (2013.01); *G06Q 30/02* (2013.01); *G06Q 40/08* (2013.01); *G06Q 50/265* (2013.01); *G06F 16/24578* (2019.01); *G06F 16/9024* (2019.01)

(58) Field of Classification Search
CPC .. G06F 16/3331; G06F 16/28; G06F 16/9024; G06F 16/24578
See application file for complete search history.

(56) References Cited

U.S. PATENT DOCUMENTS

| | | | |
|---|---|---|---|
| 8,364,623 B1 | 1/2013 | Bunker et al. | |
| 9,116,975 B2 | 8/2015 | Shankar et al. | |
| 10,027,711 B2 | 7/2018 | Gill et al. | |
| 10,127,511 B1 | 11/2018 | Epstein et al. | |
| 10,373,091 B2 | 8/2019 | Epstein et al. | |
| 10,909,625 B2 | 2/2021 | Decanini et al. | |
| 11,003,645 B1 | 5/2021 | Thompson et al. | |
| 11,023,467 B2 | 6/2021 | Randall et al. | |
| 2002/0109680 A1* | 8/2002 | Orbanes | G06F 16/9038 345/418 |
| 2002/0138417 A1 | 9/2002 | Lawrence | |
| 2003/0084424 A1 | 5/2003 | Reddy et al. | |
| 2004/0090472 A1 | 5/2004 | Risch et al. | |
| 2004/0103393 A1 | 5/2004 | Reddy et al. | |
| 2004/0193572 A1 | 9/2004 | Leary | |
| 2005/0102273 A1 | 5/2005 | Gupta | |
| 2007/0171716 A1* | 7/2007 | Wright | G06T 11/206 365/185.12 |
| 2010/0223276 A1* | 9/2010 | Al-Shameri | G06V 20/13 707/769 |
| 2011/0225158 A1* | 9/2011 | Snyder | G06Q 30/02 707/E17.089 |
| 2011/0288905 A1 | 11/2011 | Mrakas | |
| 2012/0137367 A1* | 5/2012 | Dupont | G06F 21/00 726/25 |
| 2012/0265675 A1 | 10/2012 | Lawrence | |
| 2013/0073387 A1 | 3/2013 | Heath | |
| 2013/0144957 A1 | 6/2013 | Sherman et al. | |
| 2015/0032468 A1 | 1/2015 | Soon-Shiong | |
| 2015/0154281 A1 | 6/2015 | Carlsson et al. | |
| 2015/0169746 A1 | 6/2015 | Hatami-Hanza | |
| 2015/0227559 A1 | 8/2015 | Hatami-Hanza | |
| 2017/0024531 A1* | 1/2017 | Malaviya | G16H 50/30 |
| 2017/0316114 A1* | 11/2017 | Bourhani | G06F 30/00 |
| 2018/0004822 A1* | 1/2018 | Mulder | G06F 16/248 |
| 2019/0005395 A1* | 1/2019 | Dutkowski | G06T 11/206 |
| 2019/0102477 A1 | 4/2019 | Mayers et al. | |
| 2020/0334237 A1 | 10/2020 | Yousaf et al. | |
| 2020/0382515 A1 | 12/2020 | Badawy et al. | |
| 2021/0117978 A1 | 4/2021 | Silva et al. | |
| 2021/0168150 A1 | 6/2021 | Ross et al. | |
| 2022/0036302 A1 | 2/2022 | Cella et al. | |

OTHER PUBLICATIONS

Didmo, W. et al., "An Advanced Network Visualization System for Financial Crime Detection"; IEEE Pacfic Visualisation Symposium (2011); pp. 203-210.

RELX Group, Benefits of Online Compliance, Accuity Vishal Rauniyar, "Minimise risk with comprehensive sanctions and PEP data", https:/taccuity.com/product/online-compliance/, 3 pages (09/12120•17).

Bridger Insight® XG, OFAC Compliance, KYC & PATRIOT Act Software from Bridger Insight® XG—Lexis Nexis, "Streamline regulatory compliance, protect your business and increase revenue" https://www.iexisnexis.com/risk/products/bridger-insight.aspx#features, 4 pages (Sep. 13, 2017).

Bureau van Dijk, Orbis, "Powering the business of certainty" http://www.bvdinfo.com/About-BvD/Brochure-Library/Brochures/ORBIS-broct1ure, 16 pages (2017).

Compiiance Catalyst. Bureau Van Dijk, Free trial (/en-gb/contact-us/free-trial?product-Compiiance Catalyst) http:i/www bvclinfo.com/About-BvD/Brochure-Library/Brochures/Compliance-Catalyst, 5 pages, (Sep. 13, 2017) http://www.bvdinfo.com/en-gb/our-products/catalyst/cornpliance-catalyst.

Regulatory Data Corp Inc., (RDC) The Trust Diligence company, world-class risk and compliance protection, strengthen fraud protection, Industry Solutions, 3 pages, (Sep. 13, 2017), http://rclc.com.

APAC CIO Outlook, "Regulatmy Data Corp: A GRC Organization Built For The Insiders By The Insiders", Thomas Obermair., http://compiiance.apacciooutlook.com/vendor/article34/regulatory-data-corp, 6 pages (Sep. 13, 2017) http://compliance.apacc:iooutlook.com/vendor/regulatory-data-corp-a-grc-01\ianization-built-for-the-insiders-by-the-insiders-cid-736-rnic:I-34. html.

Worid-Check, Division: Risk Management Solutions from Thomson Reuters, "Uncover Risk Take Action", 9 pages, (2016) https://risk.thomsonreuters.com/content/dam/openweb/docurnents/pdf/risk/brochures/thomson-reuters-world-check- brochure.pdf.

World-Check One, Division: Risk Management Solutions from Thomson Reuters, "A Better Way To identify Financial Crime & Reputational Risk", 9 pages, (2016); ttps://risk.thomsonreuters.com/content/dam/openweb/documents/pdf/risk/brochures/thomson-i-euters-world-check- brochure.pdf.

Arachnys Information Services Ltd., Arachnys Overview "A Global Research Platform For Emerging Markets" 26 pages (2017), http://momentumevents.com/wp-contentlupioads/2014/06/Arach nys-Presentation.pdf.

ARACHNYS/D3, Define/Follow/Prove, "Designed for in-house Enhanced Due Diligence", KYC/AML/EDD/3rd paity; risk, 2 pages, (2017) https :/led n2. h ubspot. net/11 u bfs/489197 /a rach nys Jan2016 fi les/03 flyer. pdf?t=1487935323000.

Nice Systems Ltd, NiCE-Actimize, Solution Delivery Globai Services & Support, "Deliver Measurnbie Value to Clients", Systems Ltd., 2 pages, (2017) http://www.niceactirnize.com/Lists/Brochures/SolutionDelivery_Brochure.pdf.

Arachnys/Investigation, investigations are rearely Just A to B, (Designed for deep-dive investigations), 6 pages, (Sep. 13, 2017), https:itwww.arnchnys.com/hubfs/investigator_Flyer_ 1.1_AC.pdf?=1487936323000.

GiantOak, inc., Marks & Registrations, Introduction To GOSPM, 4 pages, (Sep. 13, 20'17) https://www.giantoadk.com/#proclucts#gost-product.

GiantOak, Giant Oak Search Technology (GOST™), Big Data, Behaviorial Science, Sacl Guys, 6 pages, (Sep. 3, 2017) https://www.giantoadk.com/#we-see-ttie-peopie-behInd-data.

ICIJ Offshore Leaks Database, 11 pages, (Sep. 13, 2017) tittps://offshoreieaks.icij.org/pages/howtouse.

(56) References Cited

OTHER PUBLICATIONS

Neo Technoiogy, Inc., NEO4J—The #1 Platform for connected Data, 6 pages, (Sep. 19, 2017); Neo4j, the world's leading graph database, https:t/neo4j.corn.

Neo Technoiogy, Inc., Developer Neo4J Database, Intm to Graph Database, (Neo4j)-[:LOVES]-(Developers) https://neo4j.c:om/developer/?ref=home, 6 pagies, (Sep. 19, 2017).

Palantir Gotham I Palantir, How Does It Work?, 5 pages, (Sep. 19, 2017); https :/ /www. pal a ntir.com/paianti r-gotharn.

Palantir Gotham I Palantir, APPLICATIONS, 4 pages, (Sep. 19, 2017); https :// www.palantirl.corn/pa ianti r-gotharn/appiications.

Palantir Metropolis Applications I Palantir, APPLICATIONS, 5 pages, (09119/2017); https://www.palantir.com/palantir-metropolis/appiications.

PalantirPaiantir Metmpolis, How Does It Work? It Starts With Aii Tile Data, 5 pages, (Sep. 19, 2017); https ://www. pala ntir.corn/pa ianti r-metropol is/.

Risk & Compliance , Third-Party Risk Assessment—Dow Jones, Identify And Evaluate Third Party Risk, Latest Insights, 11 pages, (Sep. 19, 2017), link https://www.dowjones.com/products/risk-cornpliance/#insigl1ts-analysis.

Cornpiiance Catalyst, Bureau Van Dijk, Free trial (/en-gb/contact-us/frne-trial?product-Corpliance Catalyst) http://www.bvdinfo.com/About-BvD/Broc1ure-Library/8rochures/Compiiance-Catalyst, 5 pages, (09/1312017).

Walter didimo et al., "An Advanced Network Visualization System for Financial Crime Detection" IEEE Pacific Visualisation Symposium, pp. 203-2•10 (2011).

Tiger Graph, "A Graphing Software Used to Indentify Fraud", https://www.tigergraph.com/.

Neo4j, "A Graphing Software Used To Indentify Fraud", https://neo4j.com/.

* cited by examiner

OTHER RISK TYPES:

FIG. 18

930 — CONSOLE | FOCUS | CHARTS     Contact   Admin   Settings | Log Out

ALL   INSIGHTS   READBOOK

935 — CATEGORIES — SELECT TO NARROW RESULTS
- IMPOR
- ABC SUPPORT NETWORKS
- ANTEGRIA
- FFF TRAFFICKING & GGG CRIME
- PROLIFERATION
- SARKHAN
- RAGAAN

940

INSIGHT 1
JANUARY 13, 2030
Imporian Economic Foundation Designated for ABC S...
READ MORE

INSIGHT 2 — 945
JANUARY 13, 2030
Ragaan based charity supported by designated Anteg...
READ MORE — 950

INSIGHT 3
JANUARY 13, 2030
Publicly Listed Ragaan Steroid Supplier Owns Firm tha...
READ MORE

INSIGHT 4
JANUARY 13, 2030
Ragaan Company Sanctioned by the US for Proliferation...
READ MORE

INSIGHT 5
JANUARY 13, 2030
Son of Sanctioned Sarkhan Tycoon is CEO of Sarkhan Multi...

INSIGHT 6
JANUARY 13, 2030
Post-Designation Ownership Transfers by Dunham Fami...

SYSTEMS AND METHODS FOR RISK DATA NAVIGATION

CROSS-REFERENCE TO RELATED APPLICATIONS

This application is a continuation-in-part of U.S. patent application Ser. No. 17/705,185, filed Mar. 25, 2022, which is a continuation of U.S. application Ser. No. 17/243,384, filed Apr. 28, 2021, which is a continuation of U.S. application Ser. No. 16/782,043, filed Feb. 4, 2020, now U.S. Pat. No. 10,997,541, issued May 4, 2021, which is a continuation-in-part of U.S. application Ser. No. 16/506,772, filed Jul. 9, 2019, now abandoned, which is a continuation of U.S. application Ser. No. 16/104,706, filed Aug. 17, 2018, now U.S. Pat. No. 10,373,091, issued Aug. 6, 2019, which is a continuation of U.S. application Ser. No. 15/713,260, filed Sep. 22, 2017, now U.S. Pat. No. 10,127,511, issued Nov. 13, 2018. Each of the foregoing application is expressly incorporated by reference herein.

FIELD OF INVENTION

The present invention is generally directed to systems and methods for investigating and evaluating financial crime and sanctions-related risks.

BACKGROUND OF THE INVENTION

Today's corporations, financial institutions, and government agencies face a wide range of challenges stemming from issues at the intersection between international commerce and global security threats. Risk management professionals, investigators, and analysts require data and analytics on commercial actors that are implicated in global security threats to avoid excess risk and costs. For example, banking and financial systems are subject to complex regulations that can subject those institutions to significant fines, other regulatory penalties, reputational risk and other economic loss. Financial crime and sanctions-related risks can arise from directly or indirectly conducting or supporting financial transactions with entities under sanctions or otherwise engaged in illicit activity. These regulations can be complex and can involve identified entities and other entities that fall under sanctions by association. Other business-related risks may arise from export controls on restricted entities or jurisdictions and supply chain-focused security restrictions. Generally, such risks are referred to as financial, trade, and other business-related risks.

Various procedures and systems have been developed to assist in monitoring, investigating, and avoiding risks posed by global security threats. There are a number of existing systems, but thus far, they have been found to be inadequate in providing the institution with a cogent and quick representation of the risk as new situations arise. There is a tremendous amount of information, and understanding and assessing the information down to relevant parts has been difficult to achieve. The efficiency in providing such services and the way the information is interactively made available have also been inadequate.

SUMMARY OF THE INVENTION

In accordance with principles of the invention, a computer implemented system for providing a visual interactive software tool that permits users to investigate and evaluate financial, trade, and business-related risks is disclosed. The system comprises a computer system configured to include: a database, stored in nonvolatile memory and configured to store graph data structures comprising a plurality of different types of nodes, edges, and related properties that are used by the system to build a graph, wherein the database stores information represented as nodes, edges, and related properties; an electronic online customer platform that includes a visual interactive interface having a visual workspace and interactive tools, the tools include a search engine that provides keyword searching capability that surfaces possible matching nodes in the database, that provides the user with the ability to add an identified node to the visual workspace, that generates a visual graphic representation of the identified node in the visual workspace, that communicates that the identified node has a certain number of connections, and that permits the user to select one of the connections to add to the visual workspace and in response displays additional nodes and edges using separate visual graphical elements for nodes and edges that visually illustrate the selected connection.

The computer system is further configured to receive data input including selections of nodes of interest and selections of criteria that specify a type of edge to be traversed by a software engine and implement a software engine configured to automatically traverse pathways starting from each node of interest through the types of edges specified by the criteria and identify one or more nodes in the database as associated nodes, wherein the software engine performs node traversal from each node of interest and stops traversing when a node has no edges that match the type of edge specified by the criteria and in response saves corresponding information representing the associated node of interest and the type of edges connecting the associated nodes and the corresponding node of interest in accordance with the criteria.

The computer system is further configured to implement the electronic online customer platform to be configured to determine whether the identified node is one of the associated nodes, and, responsive to the determination, displays an interactive visual graphical element on the visual graphic representation of the identified node in the visual workspace and provides the user with the ability to interact with the interactive visual graphical element to selectively add, as a group, the edges and nodes connecting the identified node to one or more particular nodes of interest in accordance with the corresponding information.

The computer system is further configured to provide that the visual interactive interface is configured to allow the user to select a graphical representation of individual nodes displayed in the workspace and in response be presented with selectable options to add or remove individual nodes or edges to or from the visual workspace to further investigate and evaluate financial, trade, and business-related risks.

The computer implemented system can be implemented such that the corresponding information is configured to be ingested into another computer system and be displayed as in a table format, wherein the table format comprises alphanumeric names of actors represented by nodes of interest or associated nodes, identifiers for each of the associated nodes, and related textual information, and wherein the identifiers are configured to provide access to information of the corresponding associated nodes.

The electronic online customer platform can be further configured to, in response to a user interaction with the visual graphical element, display some or all of the corresponding information.

The node of interest comprises a sanctioned person or entity. The criteria can comprise an ownership connection. The visual interactive interface can comprise an inspection area configured to display, in response to user selection of a node or connection, information about the node or connection.

The inspection area can be configured to display, in response to user selection of a node, information about corridors related to a user-selected node. The software engine can be configured to automatically traverse pathways starting from a sanctioned node in response to the sanctioned node being added to the database. The visual interactive interface can be a web-based interface. The visual graphical element can comprise an indication of the criteria.

The system can automatically display a graphic representation of a corresponding connection between two nodes, based on the relationship between the nodes. The system can be configured to determine that the identified node corresponds to plural associated nodes and displays interactive option to select each association and retrieve a corresponding subgraph. The system can be configured to display a list of selectable options each corresponding to a subgraph that contains the identified node. The system can be configured to display the list in a graphical popup menu that is displayed on the identified node.

The system can be configured to display a set of selectable options to add subgraphs that contain the identified node, wherein the one option corresponds to an ownership subgraph, a second option corresponds to a subgraph that comprises a connection to a sanctioned node, and third option corresponds to a subgraph related to investigational topic or theme, and wherein in response to the selection of one of the options, the system retrieves and displays the corresponding subgraph to the workspace.

Corresponding or related systems, methods, and computer readable medium are contemplated.

BRIEF DESCRIPTION OF THE DRAWINGS

The nature and various advantages of the present invention will become more apparent upon consideration of the following detailed description, taken in conjunction with the accompanying drawings, in which like reference characters refer to like parts throughout, and in which:

FIG. 18 depicts another illustrative computer-implemented system for providing a visual interactive software tool that permits user to investigate and evaluate financial crime and sanctions-related risks in accordance with some embodiments of the present invention.

DETAILED DESCRIPTION OF THE INVENTION

Figure 1:
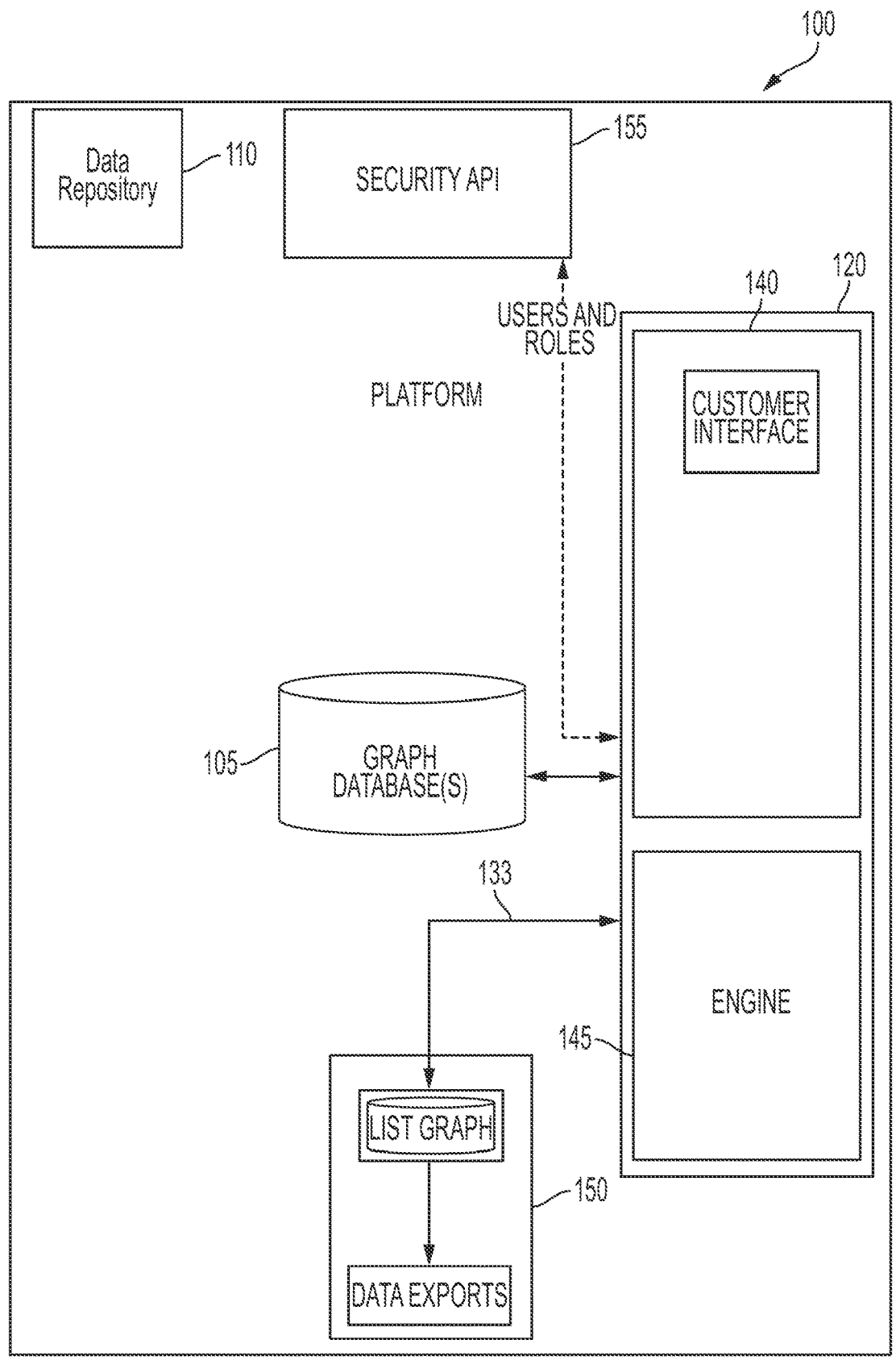
FIG. 1 depicts an illustrative computer-implemented system for providing a visual interactive software tool that permits user to investigate financial, trade, and other business-related risks in accordance with some embodiments of the present invention.

Embodiments of the present invention are directed to improvements in the field of interactive electronic investigation systems and in particular to interactive electronic risk investigation platforms. Such systems are actively being developed to provide tools, information, guidance, and resources for users to interact via a dedicated platform to investigate and comprehend financial, trade, and other business risk related to past or future activity and in particular the field is directed to financial crime or sanctions related risk. As can be well understood, the number of entities, activities, resources, rules or regulations, and known relationships (direct or indirect) is massive and complex. In addition, in each particular situation (such as proposed involvement with an individual), the greater the size and detail of the generally available information, the more difficult to know or detect risk related relationships or activities through known standard methods. Interactive platforms integrating advanced tools such as interactive guided or aided tools can be implemented. However, the filter or guided nature and the way the graphical tool interacts with the user are important aspects of the system that can provide benefits and advantages. These can provide a fluid and simple interface while maintaining valuable content and access to content. It can be key to the user for the interface to provide rapid discovery through the interactive tools (rapid in user action and rapid in user learning and comprehension) without potentially eliminating important information. The development and construction of such interactive and/or integrated systems are important and successful solutions materially add to the growth and success of this field. As mentioned, the platform or system can combine advanced processing such as a software engine with improved user interface tools to advance this field.

At a high level, a software platform can be configured to map entities, relationships, and characteristics of financial, trade, and other business networks such as the commercial, financial, and facilitation networks of sanctioned or other actors that may be associated with illicit activity. Through embodiments of the present invention, financial institutions, multinational corporations, legal professionals, and other stakeholders can access visual graphs depicting relationships between relevant actors in order to evaluate their possible exposure to financial, trade, or other business-related risks. For example, such stakeholders can access visual graphs depicting relationship between sanctioned and non-sanctioned actors in order to evaluate their possible exposure to financial crime or sanctions-related risks. Many embodiments illustrated herein are directed to financial crime and sanctions-related solutions and have particular suitability to solving and assisting users with financial crime and sanctions compliance related issues but are also applicable in other ways to financial, trade, and other business risks. For example, constructs for similar sanctioned and non-sanctioned entity relationship can exist or interconnect with sanctions in other financial, trade, or business area. It should be understood that the present features or systems can have broader or different applications.

With respect to the application to sanctions, sanctions refers to laws or regulations issued by a government that places commercial restrictions on certain identified entities or entities that are described in more general terms or indirectly (e.g., all subsidiaries of an entity that is specifically identified) and also place restrictions on commercial activities involving the restricted entities. Individuals, companies, or organizations that violate the restrictions are subject to civil or criminal penalties, which can be significant source of risk, typically arising from being a primary or secondary actor in a financial transaction. In the United States, government organizations involved in issuing and enforcing such regulations include the Department of the Treasury, the Department of State, and the Department of Justice, but others exist in the U.S. and in other countries.

The investigation of actions or relationships involving financial, trade, or other business activity such as sanctions, financial crime, or other similar activity using a software platform for conducting financial crimes and trade compliance is an established niche area and, as mentioned, is a field of development. From an investigation and process perspective, the field can be demanding in the amount of information to evaluate, the volume of transactions to consider, the time to carry out the process, and amount of visual or navigational interaction and information. New navigation tools that are supported by automated traversal tools that interact with each other can provide improved features to the field of development.

The tools can, for example, allow the software platform to discover entities (nodes) in the graph through traversal that meet certain traversal rules based on edge type stemming from a node of interest and in response, display a graphical element in close association with the discovered node. The graphical element can be interactive and can include information communicating that the node was found in a specialized automated discovery procedure, using traversal rules, and can also display that the node (if applicable) is discovered to meet multiple traversal rules (such as one being 50% owned by one or more sanctioned entity, directly or through intermediaries, and another being a series of vendor relationships that connect a supplier of parts to a retailer of finished goods). The tool can be configured to allow the user to interact with the visual representation of the node to visually see the option (while visually focused on the node) and to select for example the 50% owned option and in response, the software platform displays and adds the subgraph that explains the path(s) that meets the traversal qualification to be displayed in the current visual workspace. This is available at the same time for example as a visual interactive tool to add corridors to the current visual workspace. The software platform may display in the visual workspace interactive panels in which options for adding nodes, edges, or subgraphs can be selected. There are many advantages. For example, the interface in some embodiments allows for an interactive tool to be selectable in an area close to the node which allows a user to quickly conduct an investigation to assess exposure to financial, trade, and other business risk. Another example is that the traversal qualification can be part of a related service that defines the criteria and is configured as a service to send identified nodes (entity names) to customers by way of a list of entities that meet defined criteria. The software tool can be configured to enhance the visual workspace for interactive investigation to be able to include the entities (and the corresponding subgraph) and provide a specialized graphical tool that is for quick and efficient visual investigation using that underlying system-wide knowledge. It is possible that user and/or system defined qualifications or criteria are used. Considering the tremendous volume of transactions in this field, enhanced tools that provide quick value to the user in the investigation can be critical to the success of the user and adoption of the platform.

The integration of the "back end" capabilities with interactive graphical user tools can provide a sophisticated interactive guide and advanced navigational tools to users. The combination can for example actively determine and identify, in the visual interface, that the platform previously determined (or can simultaneously or simultaneously in combination with saved graph features) that with respect to a current node under view (selected in the interface) there is a graph pattern (node, edge, and/or combination) that is associated with the node in the platform. If desired, the platform can apply a set of rules based on the current node or current displayed graph and the platform in response, determines the identification and display of further information about associations with the node (or graph).

FIG. 1 depicts an illustrative computer-implemented system 100 for providing a visual interactive software tool that permits users to evaluate financial, trade, and other business risks. The below described implementations are primarily directed to financial crime and sanctions-related risks, but the application to other financial, trade, and business risk is understood. The system 100 comprises a graph database 105 configured to store nodes, edges, and properties, a data repository 110 configured to communicate with different sources over a network to receive financial crime and sanctions-related risk information and save received information used by analysts and automated processes to create nodes, edges, and properties, a production environment 120 configured to interact with customers. It would be evident that this is one implementation and variations are contemplated.

The graph databases 105 include an internal graph database and an external graph database. The internal graph database is configured to store nodes, edges, and properties inputted into the system 100 by analysts and automated processes, store nodes, edges, and properties for access and use by analysts and automated processes and store other information entered and produced from the inputted nodes, edges, or properties. The information produced may be information created using the nodes, edges, and properties (e.g., connections and corridors). System 100 may have a process such as an automated process that adds nodes, edges, properties or other data to the external graph (e.g., from the internal graph database). System 100 may be configured for example to include a graph database 105 without an internal graph database (e.g., only an "external graph database") such that system 100 adds or updates the graph database from various sources based on automation (e.g., using a set of configured rules), manual entry, or variations thereof without requiring a preliminary (internal) graph database. The graph database 105 is configured to store nodes and edges for customers' use in the production environment 120 and store visual graphs produced and saved by customers in the production environment 120. The graph database 105 may be a component separate from the production environment 120 or be integrated with the production environment 120. The system 100 is configured to logically divide or secure (e.g., by a mechanism such as user authentication executed by subsystem 155) the production environment 120, wherein customers are only permitted to access or interact with nodes or edges in the external graph database (in graph database 105) and authorized features for that customer.

A node represents a subject. The system 100 is configured to allow for the subject to be an individual, entity, postal address, e-mail address, event, number, telephone number, campaign, or other subject. In the application to sanctions and financial crime, the subject may be one that appears on a sanctions list or one that faces similar government imposed restrictions (sanctioned subject), one that is materially associated with a sanctioned subject but does not appear on a sanctions list (associated subject), or one that is neutrally associated with a sanctioned subject or an associated subject and does not appear on a sanctions list (neutral subject). A node is described by properties that include one or more words, numbers, symbols, or a combination thereof by which the underlying subject is known or referred to. When the subject (or property) is a number, the number may be a phone number, fax number, driver license number, social security number, passport number, bank account number (including credit card and debit card account numbers), identification number used by the system 100, or other number.

Figure 2:
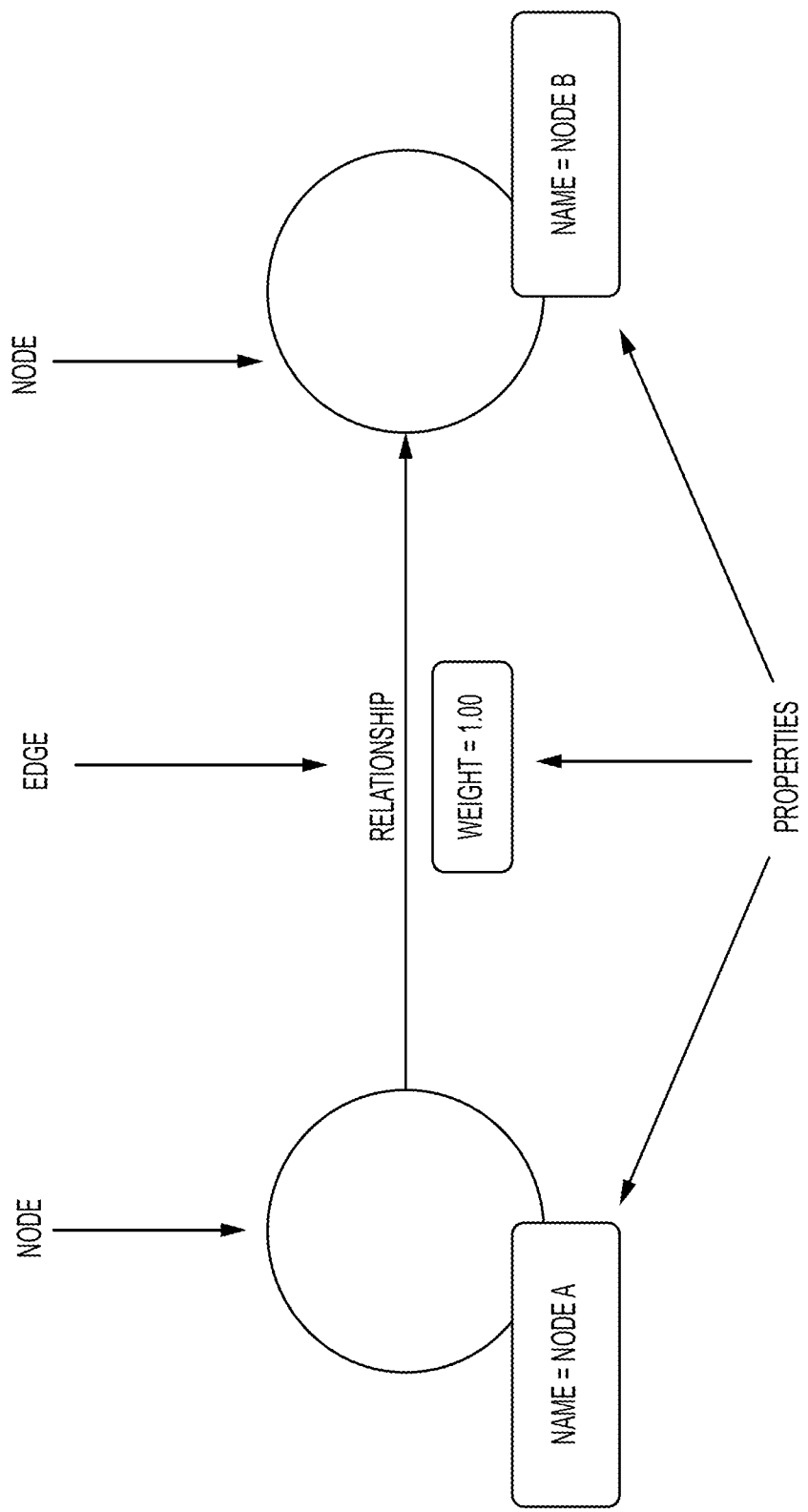
FIG. 2 depicts illustrative nodes, properties, and an edge and their respective roles in accordance with some embodiments of the present invention.

An edge represents a relationship between two nodes. The relationship may be a business relationship (e.g., creditor, supplier, joint-venture, etc.), an ownership relationship (e.g., majority shareholder, minority shareholder, subsidiary, etc.), a position relationship (e.g., director, manager, owner, etc.), a banking relationship (e.g., account holder, mortgagor, etc.), a familial relationship (e.g., father, daughter, cousin, etc.), and other relationships. An edge is described by properties that include one or more words, numbers, symbols, or a combination thereof by which the underlying subject is known or referred to. FIG. 2 depicts an illustrative node, property, and edge and their respective roles.

FIG. 2 depicts a graphical structure of the node, property, and edge that is presented to user when he or she assembles them through the workspace in the production environment. The graph database 105 stores nodes, edges, and information in nonvolatile memory. Nodes and edges are part of a graph database and can also have a graphical representation as part of a user interface.

As would be understood, a range of variations and combinations are contemplated such that the features or components of the system can interact and support each other or be available if desired. The system 100 can create particular nodes or edges (and related properties) from one or more sources of data in accordance with a model, ontology, or structure such as by the system receiving or applying a data ontology to a set of received data into the system 100. The system 100 can be configured to communicate with many different data sources and perform manual or automated operations to process and add the data from the different data sources to the graph database 105 in accordance with one or more corresponding data ontologies. In automated form, for example, data from a certain source is known by the system to be structured and the system can automatically perform operations to add the data to the graph database.

Data repository 110 can be included in the system to receive and store for retrieval structured, unstructured, and partially structured data or information from a various sources. Data repository 110 can be configured to be a data lake, which is defined as a centralized repository designed to store, process, and secure large amounts of structured, semistructured, and unstructured data. It can store data in its native format and process any variety of it. The data repository 110 communicates with different data sources over a network to receive information such as financial crime and sanctions related information. Data sources may include government sanctions lists, court records, records of incorporation, corporate filings, shipping records, news, websites, public social media postings, multi-media, and other sources. The information is used by the system 100 to create or input a node and related properties in graph database 105. Information in the data repository can include supporting information (including links or text of webpages) that provide underlying evidence of the nodes and edges that are added to the graph database 105. For example, data received from Securities and Exchange Commission filings with the government can be used to generate nodes and edges in the graph database 105 and the data repository 110 can store or provide access to the related government documents or company filings. This can allow the system 100 to permit customers to retrieve for display from the system 100 the specific documents that are the source of the graph configuration. In this way, entered nodes, edges, and/or properties can be checked for accuracy or evaluated in context by reviewing the actual received information directly (instead of just the nodes, edges, and properties) if necessary. For example, the received information may include a legal filing (or other source), a link to the legal filing, or information about the legal filing, and the customer can review that legal filing from the customer interface.

The system 100 can automatically add nodes and related properties using data in the data repository 110. The system 100 can use one or more data models or data ontologies adapted for the field of application to add data from the data repository 110 as nodes and/or related properties.

A node can be identified as a node of interest. Once a node is identified as being a node of interest, the system can as a result, designate it as a corridor endpoint node. For example, the system can identify whether an entity of a node is found on a sanctions list and the system can record that in the system and select to make one or more (all) sanctioned nodes to be individual points of interest. The designation imparts to the inputted node different characteristics and effects that enables the software engine 135 to find paths and corridors (further discussed below) accordingly and that allows the electronic online platform of the production environment 120 to generate a visual graphic as a distinctive representation. A node can be identified to be a node of interest by the system automatically or designated manually. System 100 can review the inputted nodes against one or more criteria and data in the data repository to identify which inputted nodes are to be identified as a node of interest. For example, an inputted node can be identified as appearing on a sanction list. Also by way of example, a node of interest can be identified by the system using data in the data repository to determine which inputted nodes are state owned, are located in a particular city, and develop certain technology. The resulting entities may not be a sanctioned entity (directly or indirectly) but the identified nodes can provide an additional strategy for visually investigating risk such as through relationships or network of activities.

A node can also be created to represent a legal filing or other data that serves as a source for additions. In some situations, this type of node is configured not to have a graphical node inserted into a workspace.

The system can allow the addition of a second category of information specifying an edge and related properties between inputted nodes. The system 100 can automatically add edges and related properties using data in the data repository. The system 100 can use one or more data models or data ontologies adapted for the field of application to add data from the data repository 110 as edges and/or related properties between inputted nodes. In some embodiments, adding a certain node and/or specifying the type and direction of the relationship between two nodes in the graph database 105 may cause the system 100 to automatically select a certain relationship between that certain inputted node and another inputted node and store that relationship in the graph database for those nodes. The relationship selected by the system 100 may be a mandatory relationship. In some embodiments, specifying a certain relationship may cause the system 100 to automatically change or specify the type of node (e.g., source or corridor endpoint node). The type of node selected by the system 100 may be a mandatory type of node.

The first category of information and the second category of information are stored in the graph database 105 and can be accessed by the workspace.

The system 100 can include a first subsystem that is configured to store and provide one or more defined data models or data ontologies (generally referred to as data ontologies) adapted for nodes and edges in the application. A data ontology can refer to data mappings, a graph data structure, or to categories or types of data for entry into the graph database. In general, the data ontology is user defined. In simple applications, data from certain data sources may be structured or primarily structured at the source (e.g., upon transfer to system 100) and the system 100 can define a data ontology that applies to the data structure of the data source (e.g., provide corresponding translation, transformation, or modification to successfully ingest the data into system 100 for use in system 100 investigation and operable use). The system can use the information and ontology to determine nodes, edges, and other characteristics for the graph database 105. The system can be configured to automatically receive data from a data source and automatically apply such a process to ingest data into the graph database 105 in accordance with a corresponding data ontology.

A data ontology can govern what and how each piece of information is added to the graph database 105. It can govern how information is added in relationship to a node and specify the relationship between nodes and can relate the entered information to a node in the graph database 105 based on information in the entered information. It can determine how the entered information should be linked to or integrated with the node if the entered information is related. In some embodiments, a data ontology may be available as a template for entering the first and/or second category of information. In some embodiments, the system 100 can automatically select the appropriate data ontology to use for received data into the system 100. The data ontology may include the corresponding fields and the required data structure and format so that the system 100 or the graph database 105 can be built and maintained uniformly across all users and processes involved in populating data in the graph database. Thus, for example providing automated graph generation based on the data ontology. The data models can also be created for other situations.

The system is configured to allow collaboration. The system can be configured to have many automated graph generation processes and users to interact and save their work on the system. The system can be configured to allow users to share their work and to build on that work (efficiently building a larger and more complex set of information). For example, the system 100 is built with a database storing information that visually identifies direct and indirect relationships between an actor that does not appear on a list (e.g., a sanctions list) and other actors that do appear on the list. The system 100 can add additional actors or nodes to the database to continue the direct and indirect relationships and/or new actors or nodes to the database to create new direct and indirect relationships that are not already in the database. The system 100 can include an approval or transition process for new information that is being added to the production environment. The process can be configured as an automated process involving a workflow in which the system specifies that a new set of subjects or relationships are being added to the system and in response, an automated approval or transition process is implemented that can involve a trigger based on automated or manual approval adding or updating the graph database with the new additions. For example, a daily update from a government database can be received into the system 100 and the system 100 applies processes to the update such as to apply a data ontology to model the received data and apply other processes as necessary. In response, the system 100 updates the graph database available to customers to include the new nodes and relationship and may also perform additional automated processing such as identifying and updating customer navigation and research tools (e.g., identifying new corridors).

The software engine 145 includes a set of computer implemented rules (generally referred to as rules) that are configured to traverse paths and find ("surface") a subset of the paths that meet certain rules (and therefore, eliminate other paths). The subset that meets the rules is referred to herein as corridors. The software engine 145 is configured to find or identify corridors based on the stored first and second category of information. A corridor is a pathway connecting any node that is not a corridor endpoint node to a node that is designated as a corridor endpoint node via one or more edges and/or one or more connecting nodes. A connecting node can be any node except a node designated as a corridor endpoint node and/or other nodes deemed to have no value in the traversal (e.g., having low or no illicit finance or sanctions-related risk relevance for the purpose of corridor generation because the node has a large number of connections). The system 100 may be configured to specify whether an added node is a corridor endpoint node or some other kind of node (e.g., a node that has no risk relevance or low risk relevance for the purpose of corridor generation, or any further specificity with respect to the type of node can for example be determined by the software engine 145 based on the edges or paths connected to that node). The system 100 can automatically specify nodes to be points of interest by applying a process such as by determining whether the node is on a list (e.g., a sanctions or trade restrictions list) or applying a plurality of criteria. At a base level, a corridor is determined (found) by identifying a node (that is not a corridor endpoint node) from the first category of information and connecting the identified node to a designated corridor endpoint node in the first category of information via a direct edge connection or via other nodes in the first category of information and the edges in the second category of information. Rules are incorporated into the software engine 145 that traverses or finds paths from identified nodes to designated corridor endpoint nodes and finds corridors as a subset of all paths where a path from an identified node can be traversed by the software engine 145 to reach a designated corridor endpoint node. In operation, the software engine 145 automatically traverses from the identified node through connected nodes and edges until it reaches a designated corridor endpoint node. A corridor endpoint node is a type of node that is specified or designated within the system as having different properties than other nodes. A corridor endpoint node cannot be the starting point of a corridor and is only available to end a pathway or corridor. The corridor endpoint node is defined by the system 100 (e.g., by rules, configurations, and/or data structures and ontologies) to function that way with respect to identified nodes. A corridor is found when the identified node is connected to a corridor endpoint node and also certain rules are satisfied. A corridor can be graphically illustrated by the system 100 (e.g., as part of the graphical user interface) using a graphical structure comprising the connected nodes, edges and corridor endpoint node that form the corridor. Subject to meeting certain additional rules (discussed herein) a corridor can be identified by the software engine 145 whenever an identified node can reach a corridor endpoint node. Multiple corridors can be generated for an identified node. The multiple corridors may be pathways between an identified node and a corridor endpoint node, between an identified node and multiple corridor endpoint nodes, or a combination thereof. The software engine (or components thereof) can directly or indirectly interact with the customer using the application interface to support the customer facing aspect of the system.

Figure 3:
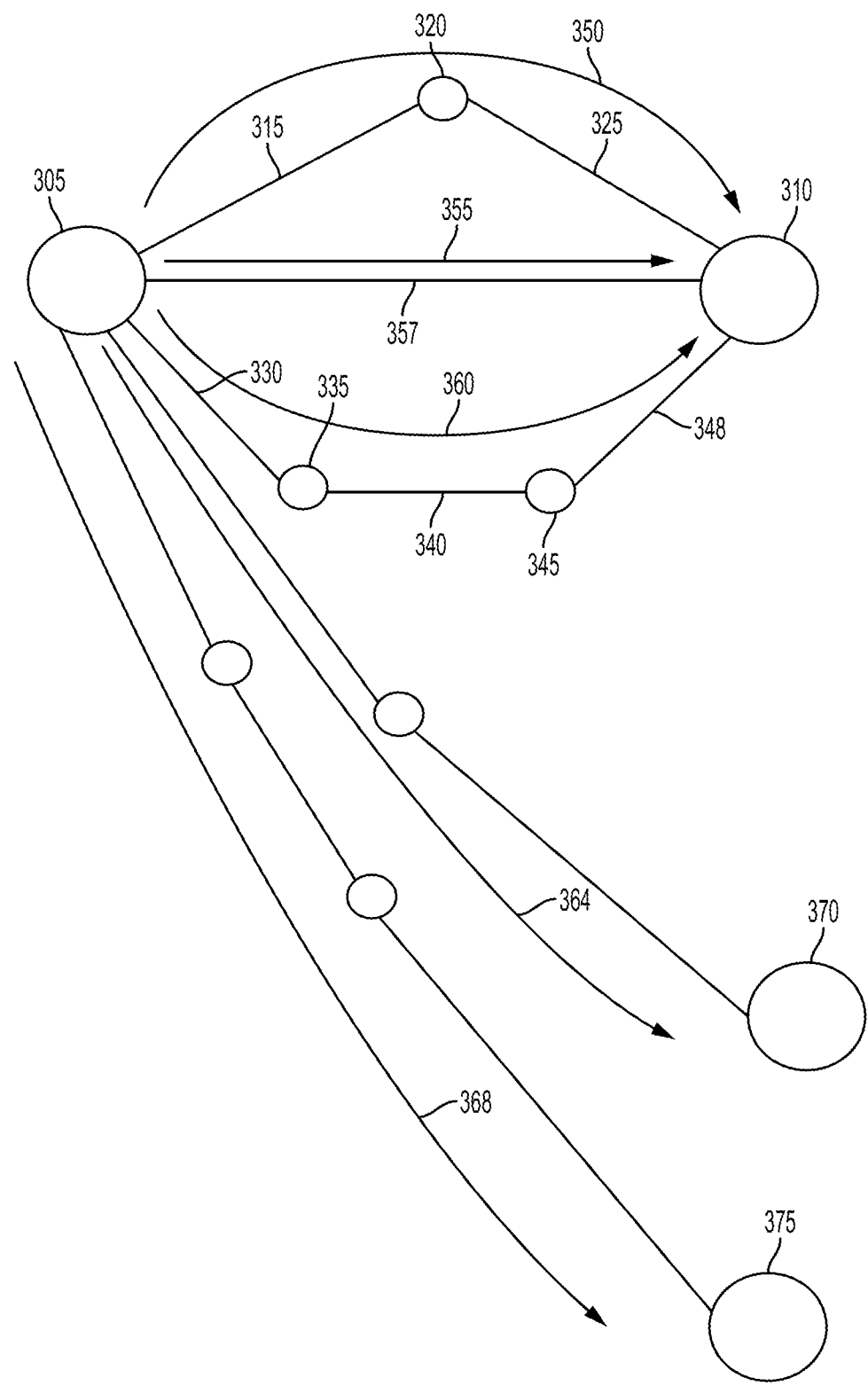
FIG. 3 depicts illustrative corridors in accordance with some embodiments of the present invention.

FIG. 3 depicts illustrative corridors 350, 355, 360, 364, 368. As mentioned above, a corridor is a pathway between a source node and a corridor endpoint node that meets certain rule requirements. For discussion purposes, in connection with FIG. 3, corridors are discussed in more general terms and additional specificity is discussed further below. The corridors 350, 355, 360 represent pathways between a source node 305 and a corridor endpoint node 310. The corridor 350 includes an edge 315 joining the source node 305 and a connecting node 320, a connecting node 320, and an edge 325 joining the connecting node 320 and the corridor endpoint node 310. The corridor 355 is an edge 357 between the source node 305 and corridor endpoint node 310. The corridor 360 includes an edge 330 joining the source node 305 and a connecting node 335, a connecting node 335, an edge 340 joining the source node 335 and a connecting node 345, a connecting node 345, and an edge 348 joining the connecting node 345 and the corridor endpoint node 310. The corridor 364 represents a pathway between the same source node 305 and a different corridor endpoint node 370. The corridor 368 represents a pathway between the same source node 305 and another different corridor endpoint node 375. The software engine 135 may not generate corridors for some of the source nodes since not all the source nodes can be connected to a corridor endpoint node.

The software engine 145 can be programmed with a maximum number of degrees of node-traversal. The maximum number of degrees of node-traversal refers to the number of nodes in a pathway the software engine 145 is permitted (by rule) to traverse to reach a corridor endpoint node from a particular source node. The software engine 145 can end the node traversal, exit the traversed pathway, and eliminate that traversed pathway from qualifying as a corridor when the software engine 145 determines that the current traversed node is equal to the maximum number of degrees of node-traversal. The software engine 145 is configured to eliminate a pathway when the number of nodes in the path (after the source node) reaches a maximum. The maximum can be specified internal to the system and not otherwise visible to users when interacting with the system. The maximum can, for example, be selected to be one of 4, 5, 6, 7, or 8 nodes, which can have advantages in processing, relevancy, and presentation. Other maximums are contemplated. With this rule, the software engine 145 prevents pathways that exceed the maximum number of degrees of node-traversal from qualifying to be corridors. If the software engine 145 has reached the maximum number and no corridor endpoint node is found, then the software engine 145 moves onto traversing another pathway (e.g., which can start from the same source node again if that source node has other pathways or from the next source node) to find a corridor endpoint node. Since the graph database 105 may store a large number of nodes and edges, their combinations may produce an enormous number of pathways. The maximum number can control the number of iterations performed by the software engine 145 to save processing time and power consumption. For brevity, the term maximum number of degrees of node-traversal is sometimes referred to or abbreviated as the maximum number, the maximum number of node traversal, the maximum number of node traversal or degrees of traversal, or the maximum number of traversal nodes.

Figure 4:
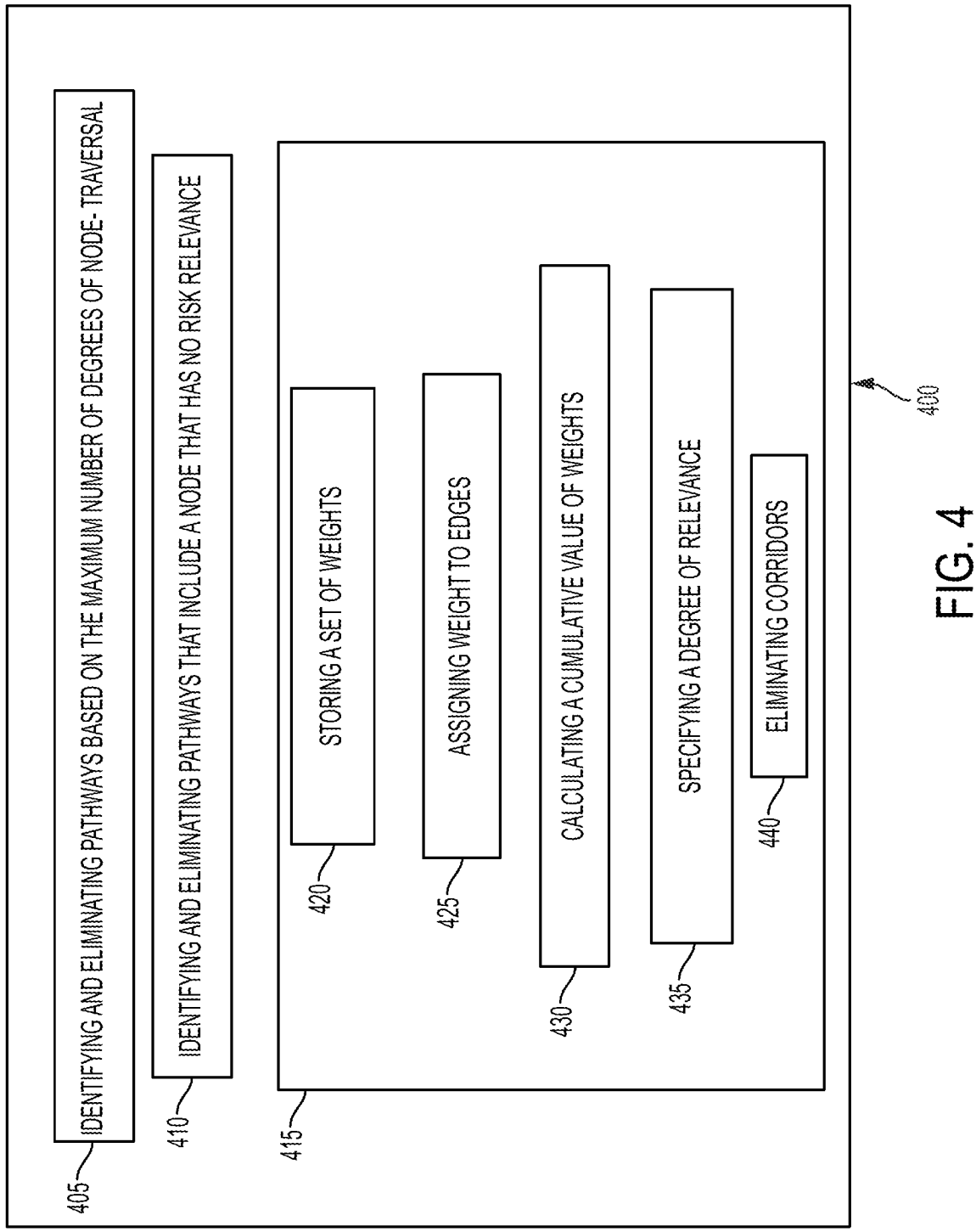
FIG. 4 depicts an illustrative process for finding corridors in accordance with some embodiments of the present invention.

FIG. 4 depicts an illustrative process 400 for finding corridors. In addition to the programmed maximum number, the software engine 145 can be configured to apply a process that identifies and eliminates pathways that include a node in the path (between a source node and a corridor endpoint node) that has been designated as having no risk relevance or low risk relevance for the purpose of corridor generation when traversing through that node to a corridor endpoint node. The determination by the system of which nodes (or edges) are ones that have no risk relevance or low risk relevance for the purpose of corridor generation can be performed in one or more ways (or combinations thereof) that are described herein as illustrative examples. A node (or edge) can be designated as having no risk relevance or low risk relevance automatically or manually. The software engine 145 can determine whether a node is one that has no risk relevance or low risk relevance, without user involvement in the decision. The software engine 145 can make the determination by analyzing the edge connecting the two nodes, the properties of the edge and two nodes, the number of edges the node has, or a combination thereof, and determining that the inclusion of the node, or the path associated with the node, would indicate a neutral or primarily neutral relationship between the two nodes. If desired, a software module that incorporates artificial intelligence, machine learning, or a set of rules can be implemented in some embodiments that determines whether a node or edge has no or low risk relevance for the purpose of corridor generation. Low risk relevance is mentioned to explain that a low level of relevance would still not be sufficient to reach a threshold value for the purpose of corridor generation. The software engine 145 can be configured to recognize nodes that have no risk relevance or low risk relevance (e.g., government node).

This configuration improves the technical and informational aspects of the resulting corridors. For example, in a sanctions applications, a node for a government entity can be removed by this rule because its inclusion provides very limited or no relevance for the purpose of evaluating financial crime and sanctions-related risks for two distinct nodes that connect through the government node. In operation, in one embodiment, the system implements a process in which as part of the automated node traversal process, it determines whether each node is identified as a type of node that the system has stored with a designation that this type of node has no risk relevance or low risk relevance for the purpose of corridor generation. If the system identifies a match, the system would eliminate that pathway from consideration and would discontinue traversing that pathway. The node and related connection would be available and displayed (if desired) in a workspace to provide additional information to a user.

Figure 5:
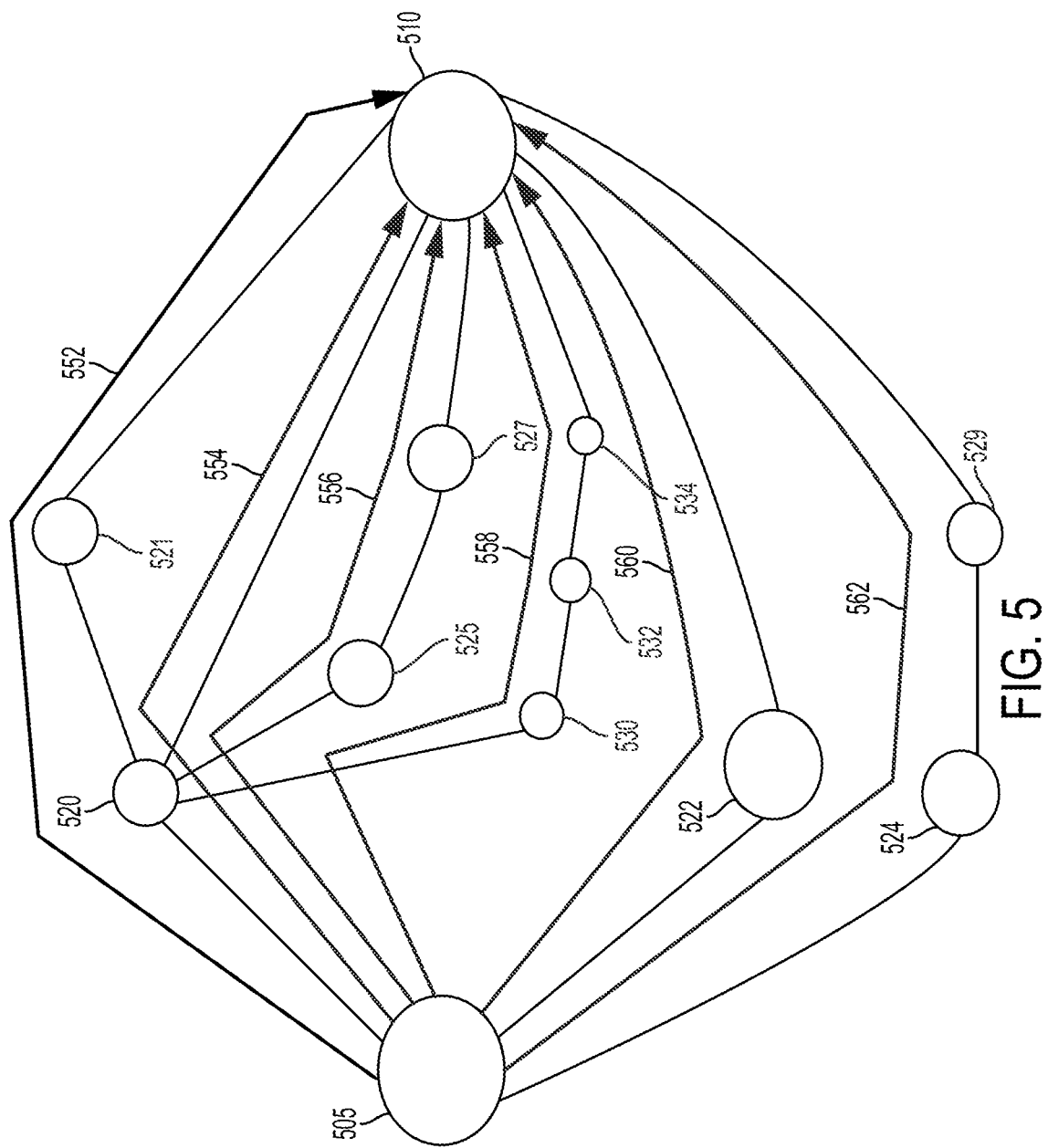
FIG. 5 depicts illustrative steps that determine whether pathways have satisfied certain automated rules to be qualified as corridors in accordance with some embodiments of the present invention.

FIG. 5 depicts illustrative steps 405 and 410 of FIG. 4. In this example, a low maximum number (e.g., 3) is used for explanatory purposes. FIG. 5 shows a graphical illustration of the process in order to further elaborate about its operation. If desired, the graphical illustration could be incorporated into an interactive graphical interface. In FIG. 5, node 505 may have been recently added to the system 100. At this point, for example, the system processes the addition as part of the already existing nodes and edges in the production environment. The system will automatically start at node 505 and traverse connections (e.g., one by one, at the same time, or some variation thereof) and applies automated rules to select corridors. In this case, node 505 has connections to node 510 (a node on a sanctions list and thus a corridor endpoint node) through nodes 520, 521, 525, 527, 530, 532, 534, 522, 524, and 529. The software engine 135 would traverse connected edges and nodes until reaches node 510 or the node traversal is terminated before it reaches node 510 when the software engine 135 determines that the current path it is traversing has reached a maximum number of nodes before reaching a corridor endpoint node or a node or edge (reached in the traversal process) that is in the category of nodes or edges that have no risk relevance or low risk relevance for the purpose of corridor generation. In the illustration, for convenience, lines 552, 554, 556, 558, 560, and 562 are provided as a way to mark and discuss an associated set of nodes and edges that (based on information stored in the environment) establish a path from node 505 to node 510. Those lines are markers for discussion purposes. For example, in this case, using step 405 of FIG. 4, the software engine 135 identifies pathways, referenced using associated markers, 552, 554, 556, 558, 560, 562 that connect node 505 to corridor endpoint node 510 and eliminates pathway 558 because pathway 558 involves more than 3 connecting nodes (e.g., 520, 530, 532, and 534). In operation, the process would stop the traversal process when it reaches the maximum number of traversal nodes (3 in this example) and the system would not identify or "know" that there is a pathway 558 to node 510 because it would have stopped the traversal process when it reached the maximum (i.e., node 532). By performing step 410 of FIG. 4, the software engine 135 identifies that node 522 has no risk relevance or low risk relevance for the purpose of corridor generation, when it reaches that node in the node traversal process, and eliminates pathway 560 associated with node 522. Similarly, in operation, the process would stop the traversal process when it reaches the node 522 (determines node has no risk relevance or low risk relevance for the purpose of corridor generation) and at that point the system would not identify or "know" that there is a pathway 560 to node 510 because it would have stopped the traversal process when it reached node 522. As a result, the software engine 135 keeps only pathways 552, 554, 556 and 562 after performing steps 405 and 410 and the kept pathways are determined to be corridors associated with node 505 in relation to node 510 (since there can be other relations). Corridors are automatically added to be available as a tool in the production environment when or in response to being found by the software engine 135. Other implementations are also contemplated. The "eliminated" nodes or edges would continue to exist in the graph database and can be visually added or included in the user workspace when a user is interactively investigating data using system 100.

The predetermined node type for non-traversal, the type of node that the process should identify and use to eliminate the path being traversed (no risk relevance or low risk relevance), and the predetermined number of connecting nodes (maximum number of node traversal or degrees of traversal) may be inputted by a user into the software interface or can be pre-programed in the software engine 135 (in the implementation of the overall system). For example, a customer that is using the system 100 to conduct an investigation can be provided an interactive option to select a setting such as the maximum number of node traversal or to exclude/include nodes of low or no relevance in generating or presenting corridors.

The process 400 (FIG. 4) further comprises determining a degree of relevance for the corridors 415. The step 415 comprises storing a set of weights in correspondence with the different types of edges 420, assigning weights based on the type of edges in each corridor 425, calculating a cumulative value of weights for each found corridor based on the assigned weights 430, and specifying a degree of relevance to other corridors for each corridor 435 based on the cumulative value. The types of edges may be based on the relationship such as whether the relationship is a shareholder one, an employment one, a banking one, a familial one, or other one and/or the rank in the relationship (majority shareholder vs. minority shareholder, director vs. associate, son vs. cousin, etc.). Each relationship type and rank can an assigned weight, and certain relationships types and ranks can be configured to have a weight higher than other relationship types and ranks. Higher weight may refer to a higher assigned number or a higher multiplier in the calculation step 430 or the formula used in the calculation step 430. An equal weight arrangement can be implemented such that each edge or type of edge is assigned the same weight whereby emphasis is placed on traversal distance rather than weighting the particular type of edge or node connection for example. The calculation step 430 may be based on adding all the assigned weights of the connecting edges in a corridor. The total sum or cumulative value may be used as the only parameter in the specifying step 435 to determine the degree of relevance. The cumulative value may also be used with other parameters or in another procedure to determine the relevance in step 435. A higher cumulative value may represent that the corridor has a higher relevance compared to other corridors. In some embodiments, a lower cumulative value may represent that the corridor has a higher relevance compared to other corridors. If desired, the degree of relevance may be output as a number on a scale configured to convey such degree. For example, the corridor with the strongest degree of relevance may be marked with "1", the corridor with the second strongest degree of relevance may be marked with "2," and so forth. Other numbers, letter, characters, or orders (e.g., from large number to small number) may also be used. The number may be different from the cumulative value. In some embodiments, the system can be configured to only assign weights that are equal or greater than 1 (with 1 indicating most relevant and ascending numbers, totals, indicating lower relevance, in relation to a weight of 1).

If desired as an option, the step 415 may further comprise a step 440 that eliminates corridors based on relevance determined from calculating weights. The step 440 may eliminate corridors based on assigned weights in step 425 and before the calculation step 430. In this case, steps 430 and 435 calculate a cumulative value and specify a degree of relevance for the remaining corridors. The step 440 may eliminate corridors based on the calculated cumulative value in step 430. The step 440 may eliminate corridors that do not have a cumulative value that is above, below, or matches a predetermined cumulative value. In this case, step 435 specifies a degree of relevance for the remaining corridors. The predetermined cumulative value may be system specified and may include the option to be selected or modified by the customer via a software interface of the system 100. Also, to clarify "eliminate" refers to the process of determining corridors that identified and presented to the customer interacting with the system. The "eliminate" nodes or edges remain the graph database and can be used in the workspace through visual illustration in response to user interaction with nodes displayed in a workspace or search results.

The step 415 may be performed after the step 405 is executed, after the step 410 executed, or after both steps 405 and 410 are executed. In any of these scenarios, the step 415 may operate to determine a degree of relevance for corridors kept by step 405 and/or 410 without the step 440. The step 415 may also operate to further eliminate one or more corridors kept by step 405 and/or 410 and determine a degree of relevance for the remaining corridors. In other words, the step 440 may be optional in some embodiments.

In some embodiments, the step 415 may be configured to perform before steps 405 and/or 410. In that situation, steps 405 and/or 410 may further eliminate corridors kept by the step 415 (whether step 415 performs the eliminating step 440 or not). In some embodiments, the step 415 may be configured as an alternative step to steps 405 and 410. The process 400 may operate based on the step 415 to eliminate corridors without steps 405 and 410. As mentioned above, this elimination is from the determination of which paths the system identifies to be corridors as an electronic investigational and navigational tool for customer interaction in the application.

All the data available to (e.g., all the predetermined numbers, assigned weights, etc.) and produced by the software engine 145 (e.g., the generated corridors, the cumulative values, kept/resulting corridors, etc.) may be stored in the graph database.

The production environment 120 (FIG. 1) is configured to receive and store the resulting corridors and the associated nodes, edges, and properties in the graph database. The graph database can aggregate resulting corridors and associated source nodes (e.g., adding current resulting corridors and associated nodes, edges and properties to resulting corridors and associated nodes, edges, and properties previously stored in the graph database) and maintain edge connections between nodes in different corridors.

Figure 8:
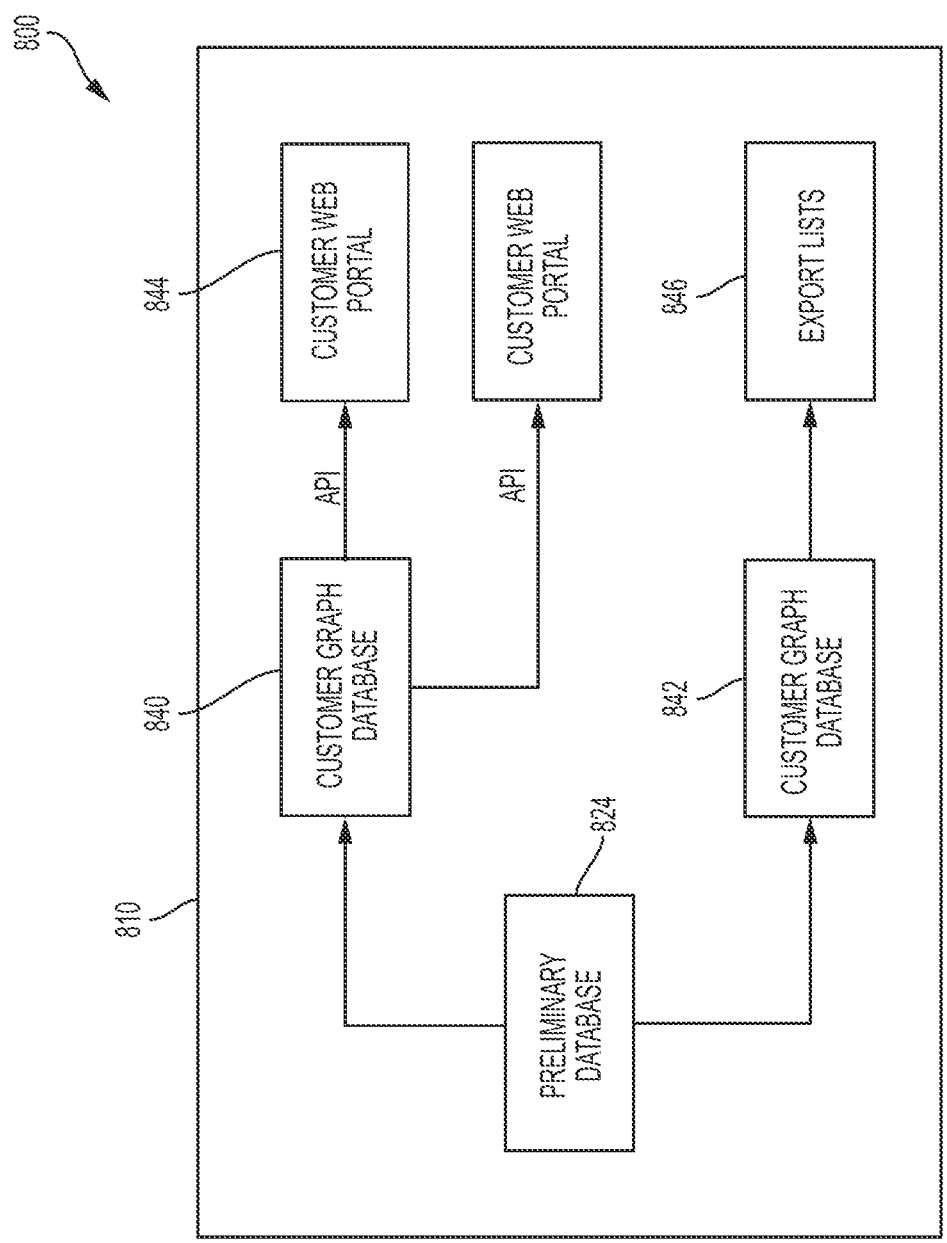
FIG. 8 depicts another illustrative computer-implemented system 1000 for providing a visual interactive software tool that permits user to investigate and evaluate financial, trade, and other business-related risks in accordance with some embodiments of the present invention.

The production environment 120 includes an electronic online customer platform 140 (and is accessible via a web portal 844 as shown in FIG. 8) and a software engine 145. The customer platform 140 provides a visual interactive interface that allows a customer to enter a keyword search, search for nodes with properties that match the keyword search in the graph database, add a node that matches the keyword search to an electronic (visual) workspace, view information accompanying a node in a side panel, and add additional nodes and/or a corridor to the workspace. The customer platform 140 perform its functions through the software engine 145. As the customer enters a keyword search through the interface, the software engine 145 searches indexed properties on nodes in the external graph database and identifies nodes that match or are similar to the search query. When the customer selects and adds an identified node to the workspace, the software engine 145 adds the identified node to the workspace by generating and displaying a visual graphical element as representation of the identified node in the workspace. The software engine 145 or more broadly the platform can retrieve the accompanying information (which includes properties) of the identified node from the graph database and displays that information through the visual interactive interface. The displayed or accompanying information may include the relevant information about the node, other nodes directly connected to the identified node, and a number of corridors. Upon the customer selecting and adding one of the corridors, the customer platform 140 generates and displays a visual graphic as representation of the corridor in the workspace. The visual graphic for the corridor is generated and displayed by the nodes and edges that form the corridor. Customers can access the production environment 120 over network connections such as over an Internet connection.

Figure 6:
FIG. 6 depicts illustrative visual graphical elements with color indicating a particular type of node and symbol indicating a particular type of subject in accordance with some embodiments of the present invention.

The platform 140 is configured to generate and display a plurality of visual graphical elements. The platform 140 may generate a circle as the visual graphical element for a node (see FIGS. 2, 3, and 5). The circle may have a different size or color to indicate whether the node is identified as a particular type of node, including, for example, a corridor endpoint node. The circle may be further produced with a symbol indicating a particular type of subject. FIG. 6 depicts illustrative visual graphical elements 600 of a node with color 605 indicating a particular type of node and symbol 610 indicating a particular type of subject. As shown, visual graphical elements can be displayed in or on the nodes such as the shown warning signals. The platform 140 may generate a line as the visual graphical element for an edge (see FIGS. 2, 3, and 5). The line may have a different thickness, length, or color to indicate the type of relationship. The line may also have an arrow at either end to indicate the direction of the relationship. The visual graphic of corridor can be generated based on the above circle and line. A separate traversal line (e.g., arrow lines in FIGS. 3 and 5) can also be provided to illustrate the path of the corridor. Visual graphic refers to a visual representation created by one or more visual graphical elements. The platform 140 may also generate other shapes to represent node, edge, and corridor.

Figure 7:
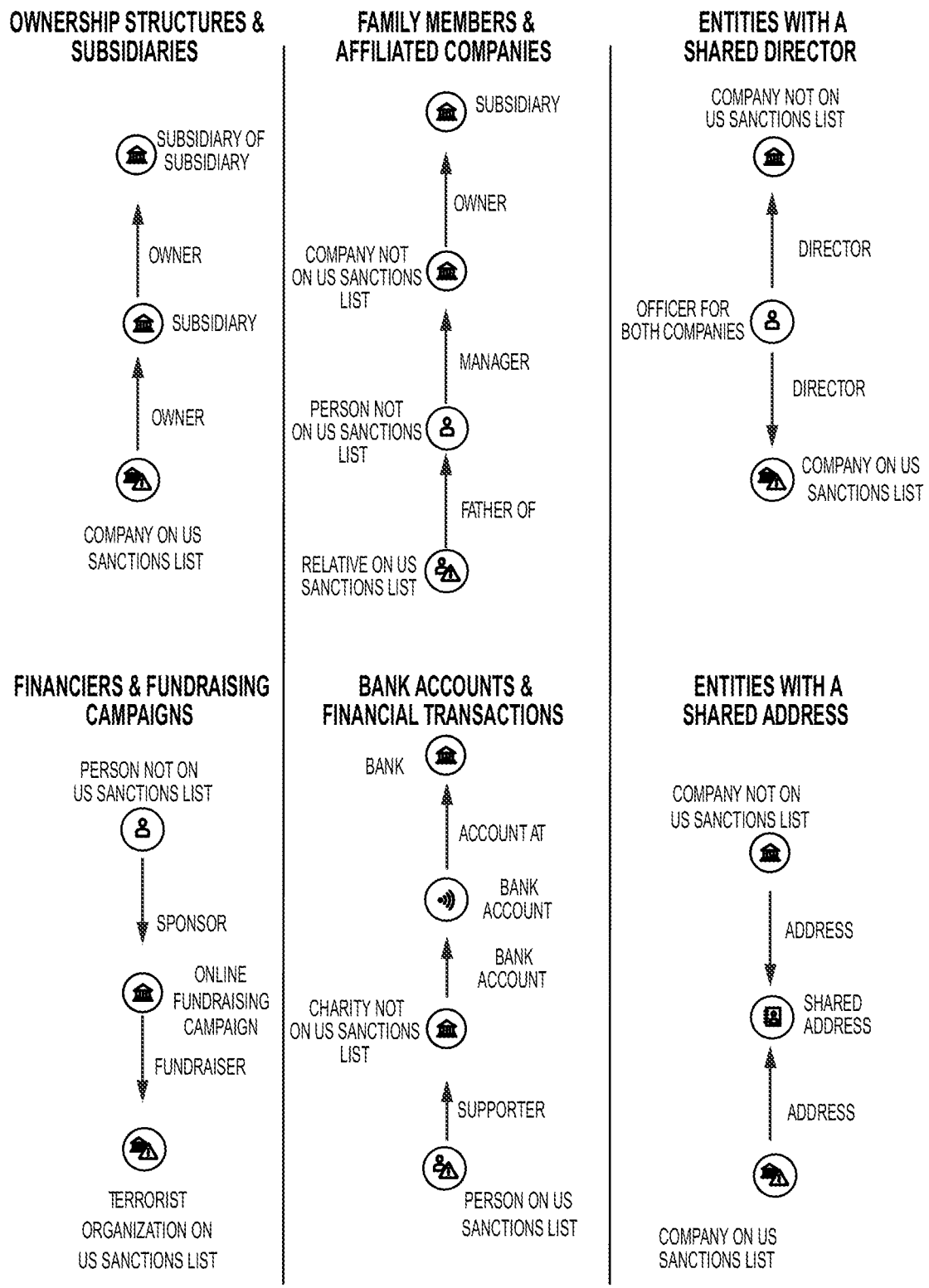
FIG. 7 depicts additional illustrative paths that have certain types of relationships in accordance with some embodiments of the present invention.

FIG. 7 depicts additional illustrative corridors that have certain types of relationships. The types of relationships may include ownership structures & subsidiaries, family member & affiliated companies, entities with a shared director, financiers & fundraising campaigns, bank accounts & financial transactions, entities with a shared address, and other types of relationships.

FIG. 8 depicts another illustrative computer-implemented system 800 for providing a visual interactive software tool that permits user to investigate financial, trade and other business risks, which as described in this illustrative application is directed to investigating and evaluating financial crime and sanctions-related risks. The system 800 comprises a production environment 810. The system 800 includes preliminary database 824. The preliminary database 824 is configured to feed or add information to the graph databases 840, 842 (customer graph database). The preliminary database 824 can be a graph database or combination of different databases. The preliminary database 824 is configured to provide if desired a software way point through which new data is added and ingested by graph database 840, 842. For example, system 800 may have a daily or continuous process in which new data is received by system 800 and held in database 824 and then added to databases 840, 842. Processes such as transformation or conversation to the system's data structures can be applied in connection with receiving or holding the data in graph database 824. System 800 can be configured to receive data (e.g., in batches or streams) from many different data sources (e.g., external such as government databases, or internal such as information generated by system 800). Communications such as Internet communications or local network communications and different types of data transfer protocols can be used to effectuate the functionality. The graph database 824 may be configured to automatically add graph data to databases 840 and 842. In some embodiments, the database are integrated or provided in the same database using logical divisions or controls to provide the described functionality. The graph databases may include one database 840 dedicated to customer web portal 844 and one database 842 dedicated to tailored data sets or bulk exporting of tailored subsets of data. Customer may log into the production environment 810, or the platform for customers 140 shown in FIG. 1, via the portal 844. The communication between customer and the platform 140 and between the customer web portal 844 and the graph database 824 may be based on an application programming interface (API) to determine whether a customer is an authorized user and to ensure that the communications are secure. The customer platform 140 communicates with the graph database 840 to access the information and save the work customer produced from the platform 140. The graph database 842 is configured to allow using or exporting of tailored subsets of data or files containing the information and work produced. The lists may be exported periodically from the database 842 and for distribution to customers. Generated lists allow individuals to view information and analysis produced by the system without the individuals keyword searching through the production environment 810. The lists can be generated using an automated process that incorporates a set of rules such as identities of entities or nodes in the graph database 840, 842 that are more than 50% owned (directly or indirectly) by a sanctioned entity. In application, corridors are configured to provide an efficient navigational tool for customers that automatically starts from nodes and explores and identifies connections (pathways of one or more edges and nodes) to corridor endpoints in accordance with rules (as illustratively described herein) whereas lists as a navigational or investigative tool are configured to apply rules that rely on whether connecting nodes, edges, or properties in a pathway are of a particular type (e.g., owned by type relationship, which can be directional in nature). Being a node of interest or corridor endpoint can be included in the rules for lists. These tools, including other related ones described herein, provide an automated system that assists to remove less valuable data or noise, automatically while also making the "eliminated" data available in the database for inspection and addition to the workspace. Given the massive amount of interrelated data that can exist, the interactive navigational tools herein address a multitude of needs from perspectives such as comprehensiveness, reduced time of use, visual presentation, speed, or clarity.

In some embodiments, databases 840 and 842 may be one single database configured to be accessible by customer web portal 844 and to export lists 846. The production environment 810 can include the software engine 145 in FIG. 1 to perform the related or supporting operations of the platform 140.

In some embodiments of the present invention, an application of graph databases can be provided to customers while retaining the power of the system and being able to surface highly relevant information for the customer. Due to different operational use cases or other reasons, including technical reasons, customers may want to use a complimentary alternative to the application of the graph database, or the related interactive interface previously described. These reasons can be because of the need for financial institutions and companies to identify and receive data about subsets of actors that are associated with actors of interest according to specific criteria such as sanctioned actors. In the field of sanctions, financial institutions and other companies are prohibited from providing services to or conducting business with sanctioned actors and certain other materially associated parties. The data are used in a different operational use case where financial institutions and companies screen customers, transactions, and/or counterparties to determine if they have material associations with sanctioned actors. As mentioned, other criteria or factors can be important to companies that use the system such as in the event of internal guidelines or polices that are directed to ethics or sustainability (e.g., such as to avoid using prison labor). Financial institutions and other companies can incorporate data about this subset of actors into their operations to screen for possible exposure to sanctions or illicit activity, or to perform other analytics.

As discussed, the system can include a tool that is configured to permit the selection of a criteria to perform a customized navigation, such as traversal in accordance with an algorithm that traverses by a particular edge type, or combination of edge type, node types, and properties, to find nodes of a certain type that are of interest to the customer. The system provider or customer can select the criteria and the system is configured to apply the criteria to the graph database of the production environment of the system, for example. The traversal can involve starting from a node of interest (for example, a node of interest means (or can be) a sanctioned node, a node that does not appear on a sanctions list but is associated with a sanctioned node, a node that presents financial crime and sanctions-related risks but does not appear on a sanctions list, or a non-sanctioned node that the provider or customer wishes to investigate, for example with respect to the latter, because the node has a certain general or specific characteristic such as a specific country association) and only traversing an edge if its immediately connected edge meets the specified criteria. The traversal will end if there is no connected edge that meets the criteria (e.g., that edge type). An edge is a particularly suitable criterion, but other criteria are contemplated, and in some cases, the traversal can traverse multiple nodes and check multiple properties as long as the criteria is satisfied as the traversal proceeds through a node and its edges. Examples of this are further described below.

As mentioned, embodiments of the present invention can also explore an actor that appears on a sanctions list (e.g., sanctioned node) and identify actors that do not appear on a sanctions list but are associated with the sanctioned actor via certain relationships and present financial crime or sanctions-related risk (e.g., associated nodes). For ease of convenience, the text will refer to government issued sanctions (e.g., individuals or entities that are subject to direct government sanctions) but it is understood to also be applicable to financial crime (financial crime and sanctions-related risks can arise from directly or indirectly conducting or supporting financial transactions with entities under sanctions or otherwise engaged in illicit activity). Financial crime can for example involve an entity or its actors that have been found or accused by a government of money laundering, terrorism, nuclear weapons proliferation, human rights abuses, corruption, or other illicit activity. An actor can be an individual or entity or another type of node. In general, embodiments of the present invention are particularly suited for sanctions and financial crimes applications but can be applicable in other areas (e.g., general embodiments are contemplated). In operation, the system, through the software engine, can start traversing from a node of interest, such as the sanctioned node, through its connected edges and nodes and finds the associated nodes based on a specified criterion or traversal process. The node of interest, the associated node(s) (meaning those identified through traversal to meet the specified criteria), and the relationship(s) connecting the node of interest and the associated node(s) can be represented and saved as a subgraph according to the type of traversal (e.g., type of relationship or edge) used to identify the associated node(s). A subgraph is a graph obtained from the information stored in the graph database or from the overall graph constructed using a subset the information stored in the graph database. Subgraphs can be stored in the graph database. The data in a graph or subgraph can be visually represented using nodes, edges, and properties. The subgraph can be quickly accessed by the system in response to a request from users and provide users data surfacing or showing paths that survived a specified traversal process emanating from the node of interest (by way of a data table, graph data, or visual representation). That is, the subgraph represents a portion of the graph database perceived from the node of interest through a virtual lens formed by the traversal criteria. As is evident, in this process, as illustrated, the traversal is configured to start with a node of interest and traverse outward and in the corridor feature, the process is configured to start at a node (that is not a node of interest) and traverse through pathways to a node of interest to generate corridors.

The system can be configured, for example, by way of the combination of the graph database, sets of rules, and interactive user interface to provide a powerful and quick investigative, navigational, and informational tool. The tool can be referred to as a lens or lens tool, as mentioned above. For example, the system can permit the user to use the lens tool in connection with a current node in the workspace (that is selected, e.g., highlighted by the user or system) and the lens tool is displayed to the user (by way of an indicator such as circle positioned on the node) in association with the current node. The graphic visual element can be a circle or other shape or other visually displayed items. This is to communicate that variations are contemplated. For example, a color can by itself be an element. This tool informs the user that one or more subgraphs are in the graph database that meet one or more sets of rules (e.g., a corridor). The lens tool permits the user to be informed of risk or research relevant to the current node as analyzed in the graph database and accessible visually by the lens tool. For example, in the present context, the user can see the node and if there is a lens (indicator), view the contents of the lens (e.g., by seeing a list) and selecting from the lens items to add to the workspace and conduct further review and investigation. This significantly reduces the processing and investigation involved in the user manually traversing the graph. It can also provide a more efficient user interface in that the user can, for example, conduct a purposeful expansion using selections ("clicks") that are positionally close to the node in the workspace.

The subgraph may be enriched with custom data. For example, in the application in field of sanctions and financial crime, subsets of the sanctions graph can be classified by sanctions program, research area, themes, or topics such as North Korea, IRGC, al-Qaeda, military end use or human rights to enable specific reporting on the sanctions information or other information. For instance, a subset of the sanctions graph can be classified as related to North Korea to enable reporting on sanctions information related to North Korea gathered from all the sanctions lists or other information. The sanctions subgraph can provide information that may not be available from the sanctions list and in a manner that can be easily digested by users. The subgraph may be displayed on an interactive user display or may be used to enhance other information displayed on an interactive user display as discussed in more detail below.

The system can find associated nodes by several methods that use a node of interest. The particular method, or traversal process, to be performed by the system in revealing the associated nodes can be set by specifying a criterion. One of the criteria is ownership. Ownership can mean the share of ownership a node of interest (e.g., a sanctioned node) has in another node. The share of ownership can be represented using percentage and available percentages for user selection (either by system or customer) can be pre-stored in the database. The percentage may also be adjustable. For example, the sanctioned node's share of ownership in another node can be 30%, 50%, 80%, or other percentages. By specifying ownership, the system executes a traversal process that involves ownership edges (involves primarily ownership edges or only ownership edges). An ownership edge that includes an ownership percentage property can be used to calculate the share of ownership the sanctioned node has in another node. The traversal process uses the specified percentage to find associated nodes. This traversal process may be referred to as the ownership traversal method.

The process traverses from the node of interest and finds nodes in which the node of interest has ownership and the aggregate share of ownership meets the specified percentage (e.g., equal to or greater than the specified percentage). The software engine traverses from the node of interest through ownership edges, finds nodes connected through ownership edges (nodes in which the sanctioned node has ownership), and determines whether the share of ownership meets the specified percentage. The software engine can determine whether the share of ownership meets the specified percentage directly or indirectly, and individually or in aggregate by one or more nodes of interest (i.e., directly and individually, directly and in aggregate, indirectly and individually, and indirectly and in aggregate). One or more nodes of interest can for example refer to one or more sanctioned nodes. The share of ownership meets the specified percentage when the share of ownership (individually or in aggregate) is equal to or more than the specified percentage (or is at least equal to the specified percentage). In one application, some laws and regulations subject entities that are 50% or more owned by sanctioned actors to the same restrictions as sanctioned actors. Financial institutions and other companies need lists of entities that are 50% or more owned by sanctioned actors to screen against customers or transactions.

For example, the percentage threshold for ownership by a sanctioned node is set to 50%. In this example, the node of interest is a sanctioned node. For clarification, a sanctioned node can be a category of nodes and similarly a node of interest can be referring to a particular node or a category of nodes (sanctioned nodes). This is relevant because in the context of sanctioned nodes, the question may be to identify a node that is associated to one or more sanctioned nodes (e.g., different entities under government sanctions) by being owned by 50% or more by one or more sanctioned nodes (e.g., different entities under government sanction). For ease of discussion, sanctioned nodes are used in the example. If the share of ownership is set to determine directly and individually, then a node may be an associated node when it is directly connected to the sanctioned node via an ownership edge and the sanctioned node owns at least 50% of that node. If the share of ownership is set to determine indirectly and individually, then a node may be an associated node when it is indirectly connected to the sanctioned node via one or more intermediary nodes and the total share of ownership in one of the available paths or edges needs to be at least 50%. For instance, a sanctioned node is connected to node A and owns 25% of node A, and node A is connected to node B and owns 25% of node B, and the total share of ownership in that series or in each path is 25%. Therefore, node B is not an associated node. Node B would be an associated node if the sanctioned node owns 50% of node A and node A owns at least 50% of node B.

If the share of ownership is set to determine directly and in aggregate, then a node may be an associated node when it is owned by one or more sanctioned nodes directly and the total share of ownership by the one or more sanctioned nodes is at least 50%. If the share of ownership is set to determine indirectly and in aggregate, then a node may be an associated node when it is owned by one or more sanctioned nodes indirectly and the total share of ownership in all the paths is at least 50%. In some embodiments, the total share of ownership can be calculated using only certain paths from all the paths. The in-aggregate option is used to detect situations or associated nodes when each sanctioned node may not have enough share of ownership in a certain node to qualify as a majority owner (e.g., each sanctioned node is a minority owner), but in aggregate the sanctioned nodes own the majority of the node.

In the example, the following procedures can also determine whether the share of ownership meets the specified percentage. If a node is 50% or more owned by a sanctioned node, then the software engine identifies that node as an associated node. If aggregate ownership by one or more sanctioned nodes in a node is 50% or more, then the software engine identifies that node as an associated node. For example, if a sanctioned node A owns 20% of node Z and another sanctioned node B owns 35% of node Z, then the software engine identifies node Z as an associated node.

The software engine performs iterations to determine whether the share of ownership meets the specified percentage. Whether the software engine finds an associated node or a node that is not yet determined to be an associated node, ownership percentage from a previous iteration can be used in a subsequent iteration to determine whether the share of ownership meets the specified percentage. If aggregate ownership by one or more sanctioned nodes in a node is less than 50% and there are additional ownership edges that are connected to that node, the node has an undetermined status and is revisited in a subsequent iteration.

Subsequent iterations check other nodes owned by a sanctioned node or associated node (a 50% or more node), determine ownership percentage in those nodes by the sanctioned node or associated node, and determine whether the share of ownership in those nodes meets the specified percentage by including any additional ownership percentage determined in the previous iteration. For example, if a node with an undetermined status is owned in the aggregate by a sanctioned node and another sanctioned node or by a sanctioned node and an associated node, the node with an undetermined status is identified as an associated node (50% or more node) if aggregate ownership by the sanctioned nodes or by the sanctioned node and associated node is 50% or more. One of the ownership percentages may be determined from a previous iteration and another ownership percentage may be determined from a subsequent iteration. For instance, ownership percentage in the node with an undetermined status by one of the sanctioned nodes may be determined from a previous iteration and ownership percentage in the same node by another sanctioned node may be determined from a subsequent iteration. For instance, ownership percentage in the node with an undetermined status by the sanctioned node may be determined from a previous iteration and ownership percentage in the same node by the associated node may be determined from a subsequent iteration. As mentioned above, sanctioned nodes are provided in this example; other nodes of interest or types of node of interest are contemplated.

Figure 9A:
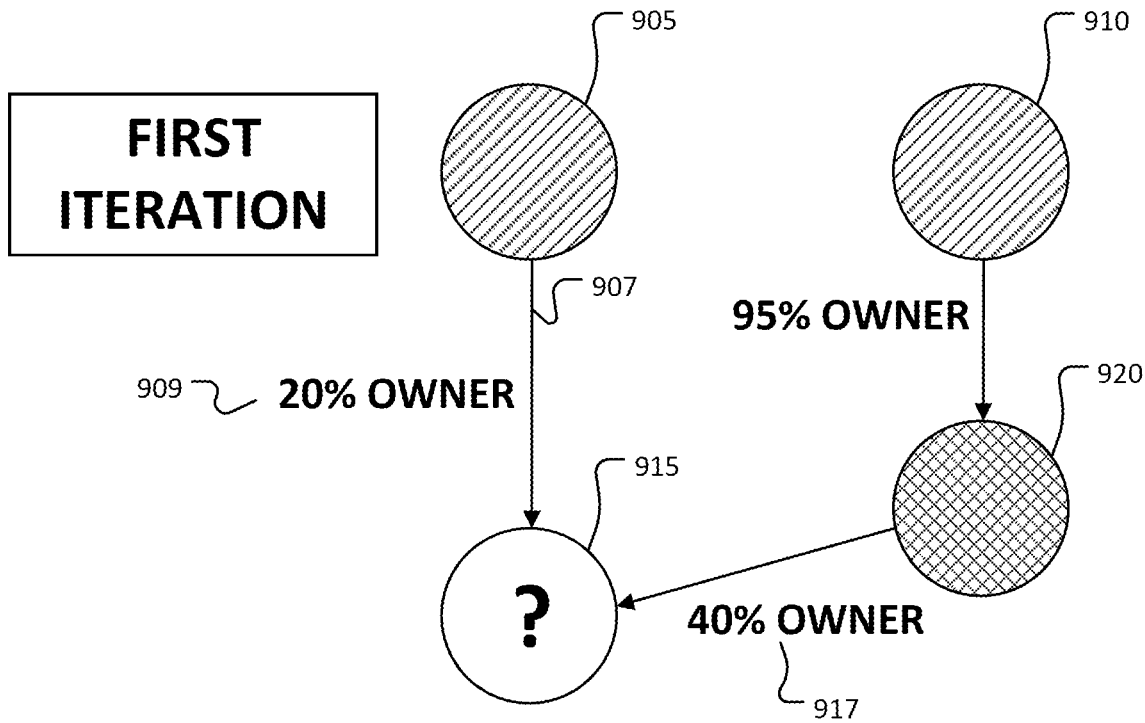
FIG. 9A depicts an illustrative iteration performed by the software engine to determine whether the share of ownership meets the specified percentage in accordance with some embodiments of the present invention.
Figure 9B:
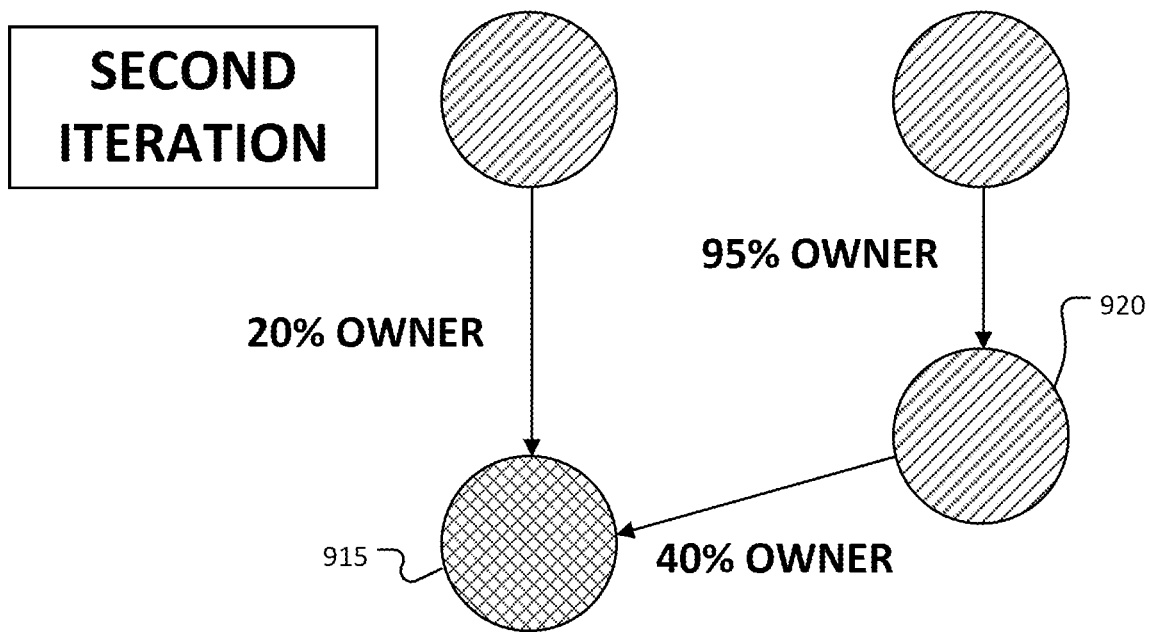
FIG. 9B depicts another illustrative iteration performed by the software engine to determine whether the share of ownership meets the specified percentage in accordance with some embodiments of the present invention.

FIGS. 9a-9b depict illustrative iterations performed by the software engine to determine whether the share of ownership meets the specified percentage. The traversal process starts from sanctioned nodes 905, 910 which are identified from the research graph and the sanctions graph. In the first iteration, the software engine finds that sanctioned node 905 has ownership in node 915 (through ownership edge 907) and the share of ownership is 20% (from the ownership edge property 909). The software engine also finds that node 915 has another ownership edge 917. Since aggregate or total ownership in node 915 at this moment is less than 50% and there is another ownership edge 917 to node 915, node 915 has an undetermined status and will be revisited in a subsequent iteration. The determination of whether node 915 is an associated node is postponed until a later iteration, or until another iteration when the share of ownership by a sanctioned node or associated node through ownership edge 917 is determined. The software engine further finds that sanctioned node 910 has ownership in node 920 and the share of ownership is 95%. Since sanctioned node 910 owns 50% or more of node 920, the software engine identifies node 920 as an associated node. Therefore, in the first iteration, the software engine discovers node 915, and discovers that node 915 has an undetermined status, and node 920 is an associated node.

In the second iteration, the software engine finds that associated node 920 has ownership in node 915 and the share of ownership is 40%. Since aggregate ownership in node 915 is 60% (20%+40%) after the second iteration, the software engine also identifies node 915 as an associated node because aggregate ownership in node 915 is 50% or more (or changes node 915's undetermined status to an associated node status).

The software engine iterates until all relevant nodes have been visited (determined by the specified criterion). It is understood that 50% and other percentages shown in FIGS. 9a-9b are merely used for illustration purposes only. Other ownership percentages may also be specified. Moreover, other determination procedures and combinations are also contemplated. Furthermore, the software engine can perform more than two iterations to determine whether the share of ownership meets the specified percentage based on the concepts discussed above. A subsequent iteration may refer to an iteration that occurs after the previous iteration concludes or an iteration that occurs after the previous iteration begins (the previous iteration does not necessarily need to end first).

Ownership refers to an entity or individual's ultimate and exclusive rights, conferred by a lawful claim or title, to property. Share of ownership refers to the proportion of rights an entity or individual has to an entity or other property and can be represented in percentage. Share of ownership can be determined by identifying the number of shares the sanctioned node has in the other node, by identifying a title or other information indicating ownership, or by other methods. The system can be configured to receive data with respect to ownership and use that data property in the graph database for the automated analysis. For example, certain public databases or paid research sites may store entity and ownership information and the system can retrieve that information and apply it in the system in the graph database and related features.

The traversal process could also be based on a sanctioned node's ownership or control of another node only, without considering the share of ownership because that information is unknown or not relevant to the data being analyzed. This traversal process may be referred to as the expanded ownership and control method. This method traverses from the sanctioned node and finds nodes in which the sanctioned node has ownership or control without considering the sanctioned node's share of ownership in that node. Expanded ownership or control is determined by whether a node is a unit of the sanctioned node or controlled by the sanctioned node or owned with an unknown ownership percentage by the sanctioned node. Once this traversal method is initiated, the software engine traverses from the sanctioned node through ownership edges, finds nodes connected through ownership and control edges (nodes in which the sanctioned node has ownership and control), and determines whether a node is a unit of, controlled by, or owned by the sanctioned node. Associated nodes identified by this method may be referred to as expanded ownership and control nodes.

The software engine can use additional criteria to perform a traversal process that identifies other types of associations, or risk types, between nodes of interest and associated nodes. The other types of associations or risk types can include identifiers shared between nodes of interest (e.g., sanctioned nodes) and associated nodes, commercial, facilitation, and leadership relationships, and relationships between vessels and their operators. To satisfy the additional criteria, the software engine can also perform traversal processes that include other types of nodes, edges, and properties.

Figure 10A:
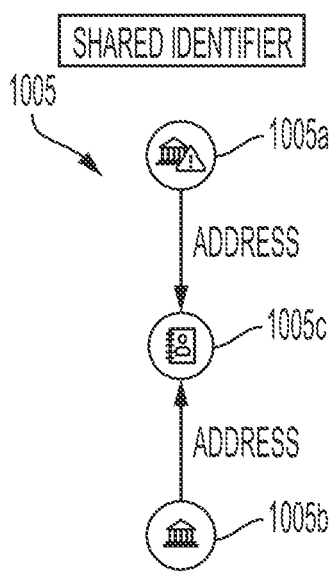
FIG. 10A depicts an illustrative result upon performing the shared identifier traversal process in accordance with some embodiments of the present invention.

A criterion that can be set to find associated nodes is the shared identifier criterion. Setting the criterion to find a shared identifier instructs the software engine to perform a traversal process that starts from a node of interest and traverses through any shared identifier nodes and edges. A shared identifier node is a node that represents information identifying both the node of interest and another node, or information shared by both the node of interest and another node. The identifying information in a shared identifier node can include location or contact information such as postal addresses, phone numbers, and email addresses. A shared identifier node may also be referred to as an identifying information node. A shared identifier edge is an edge that leads to a shared identifier node. By visiting a shared identifier node, other nodes using or sharing the same identifying information as the node of interest can also be identified by the software engine. The identified other nodes are associated nodes. For example, after setting the criterion to shared identifier, a particular type of shared identifier can be further selected such as location or postal address. The traversal process starts from a node of interest and traverses through all available location edges and location nodes to reach other nodes connected to location nodes via location edges. The other nodes reached by the traversal process are nodes sharing a location with the node of interest and are identified as associated nodes. FIG. 10a depicts an illustrative result 1005 upon performing the shared identifier traversal process. The result 1005 shows that node 1005b uses or shares the same address 1005c as node of interest 1005a.

Other criteria that can be set to find associated nodes include commercial, vessel owners and operators, leadership, and facilitation. The traversal process for each of these criteria is similar to the shared identifier traversal process discussed above and is based on the corresponding edges and nodes of the selected criterion. Other criteria are contemplated.

Figure 10B:
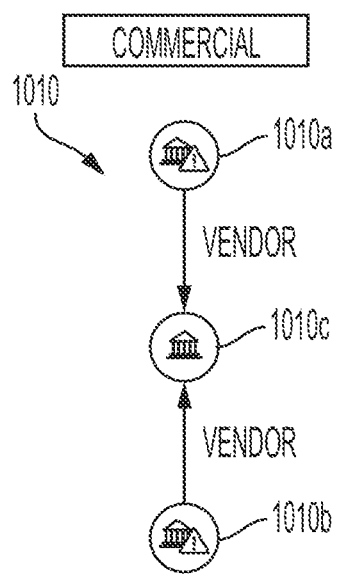
FIG. 10B depicts an illustrative result upon performing the commercial traversal process in accordance with some embodiments of the present invention.

For the commercial criterion, the traversal process relies on commercial edges (e.g., seller, buyer, distributor, vendor, or other commercial relationship) and commercial nodes (e.g., entities or individuals that have commercial activities or do business with others). In some embodiments, the software engine can consider the strength of the commercial edges in deciding whether the commercial nodes should be identified as associated nodes. The strength may be based on a characteristic or property of a commercial edge (e.g., if the commercial edge is vendor, then the commercial edge should be given a higher weight), the number of commercial edges connecting the node of interest and the commercial node, or a combination of factors. Other factors that may be considered in determining the strength include the amount or volume of the transaction (or the number of transactions) between the node of interest and the commercial node. FIG. 10b depicts an illustrative result 1010 upon performing the commercial traversal process. The result 1010 shows that node 1010c has commercial exposure to sanctioned nodes 1010a, 1010b and is identified as an associated node (e.g., because it has sufficient commercial exposure to sanctioned nodes 1010a, 1010b based on the strength of the commercial edges).

Figure 10C:
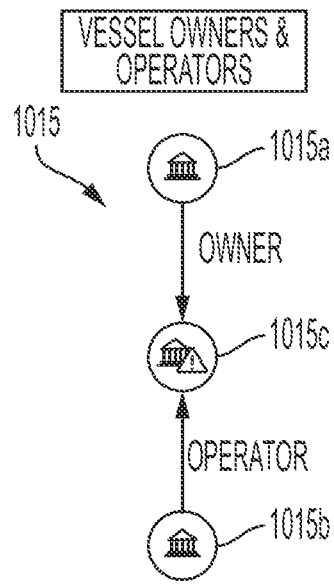
FIG. 10C depicts an illustrative result upon performing the vessel owners and operators traversal process in accordance with some embodiments of the present invention.

For the vessel owners-and-operators criterion, the traversal process uses a sanctioned node that represents a vessel as a starting point and traverses through owner or operator edges to find non-sanctioned (associated nodes). Other entities owned by the non-sanctioned nodes (non-sanctioned owner or operator or associated owner or operator) of the vessel node can also be identified. The traversal process can also start with a sanctioned node and identify vessels owned or operated by the sanctioned node. The non-sanctioned nodes found by this traversal process are also identified as associated nodes. A vessel may be a land vehicle, watercraft, aircraft, or other types of vehicles. FIG. 10c depicts an illustrative result 1015 upon performing the vessel owners-and-operators traversal process. The result 1015 shows that sanctioned node 1015c is owned by node 1015a and operated by node 1015b, and nodes 1015a and 1015b are identified as associated nodes.

Figure 10D:
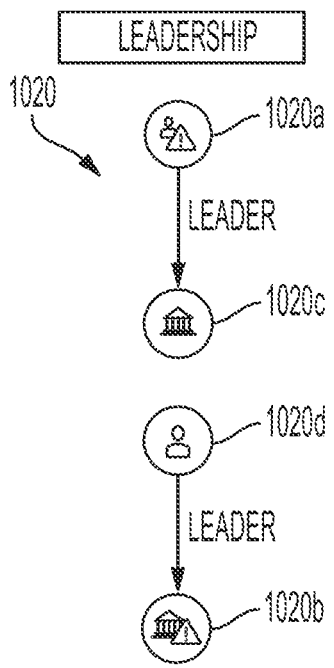
FIG. 10D depicts an illustrative result upon performing the leadership traversal process in accordance with some embodiments of the present invention.

For the illustrated leadership criterion, the traversal process uses a node of interest that is a sanctioned node as a starting point and traverses through leadership edges to find any non-sanctioned nodes led by the sanctioned node, or any non-sanctioned nodes that are leaders of the sanctioned node. In some embodiments, the software engine can consider the strength of the leadership edges in deciding whether the non-sanctioned nodes should be identified. The strength may be based on a characteristic or property of a leadership edge (e.g., boss, subordinate, or colleague of the sanctioned node), the number of leadership edges connecting the sanctioned node and the non-sanctioned node, or a combination of factors. Other factors that may be considered in determining the strength include the type of leadership activities involved between the sanctioned node and the non-sanctioned node (e.g., management level of meeting, causal or formal one-on-one meeting, number of meetings, etc.). FIG. 10d depicts an illustrative result 1020 upon performing the leadership traversal process. The result 1020 shows that non-sanctioned node 1020c has sanctioned node 1020a as the leader and that non-sanctioned node 1020d is the leader of sanctioned node 1020b. Nodes 1020c, 1020d are identified as associated nodes.

Figure 10E:
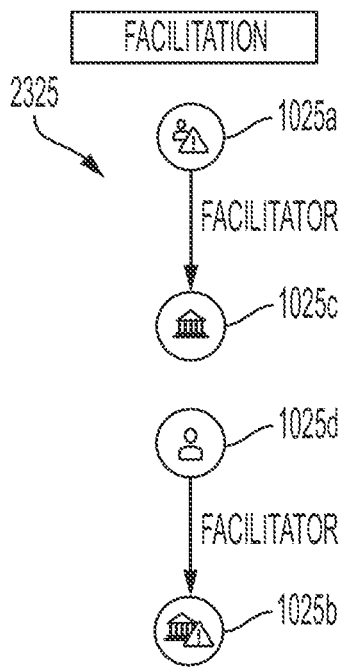
FIG. 10E depicts an illustrative result upon performing the facilitation traversal process in accordance with some embodiments of the present invention.

For the facilitation criterion, the traversal process uses a node of interest that is a sanctioned node, for illustrative purposes, as a starting point and traverses through any facilitation or support edges to find non-sanctioned nodes. In some embodiments, the software engine can consider the strength of the facilitation edges in deciding whether the non-sanctioned nodes should be identified. The strength may be based on a characteristic or property of a facilitation edge, the number of leadership edges connecting the sanctioned node and the non-sanctioned node, or a combination of factors. Other factors that may be considered in determining the strength include facilitation activities involved between the sanctioned node and the non-sanctioned node. FIG. 10e depicts an illustrative result 1025 upon performing the facilitation traversal process. The result 1025 shows that node 1025c is being facilitated by sanctioned node 1025a and that node 1025d is facilitating sanctioned node 1025b. Nodes 1025c and 1025d are identified as associated nodes.

Each of the results in FIGS. 9-10 may be saved as a subgraph corresponding to the criteria and type of traversal performed. The subgraphs allow queries to rapidly recall the results of the traversal processes. The subgraph can also store information about the parameters used by the traversal processes, such as the threshold percentage and edge types used by the software engine in the traversal processes and the threshold percentage and edge types required by the software engine to continue the traversal process. In some embodiments, the results of each of the above traversal processes are stored by assigning labels to non-sanctioned nodes found by the traversal processes and connecting the non-sanctioned nodes to an additional subgraph that stores any additional information. This enables non-sanctioned nodes, or a subset of non-sanctioned nodes identified by the traversal processes, to be recalled automatically.

Another method or traversal process that can be performed by the system to reveal associated nodes is based on community detection. The software engine uses edge betweenness (the community detection method) to identify highly interconnected networks of nodes of interest such as sanctioned nodes. The method finds highly interconnected networks by making partitions to the graph of the nodes of interest. The method performs partitions by calculating edge betweennesses for all the nodes and edges in the graph of the node of interest, determining edges that have a high edge betweenness or that have an edge betweenness in the top 10% (or other specified percentage) of all the determined edge betweennesses, and removing the determined edges from the graph of the sanctioned node. Removing the determined edges divides the graph of the node of interest into subgraphs (or disconnects the graph of the node of interest from within to create subgraphs or to break it into subgraphs). Each resulting subgraph or partition is a highly interconnected network. The betweenness of an edge is calculated by computing the total number of shortest paths between a first node and a second node (first total number), computing the total number of shortest paths between the first node and the second node via the edge for which the betweenness is calculated (second total number), and dividing the first total number by the second total number. The method may employ Girvan-Newman algorithm or other process to perform partition. The method can be configured to perform a desired number of iterations to produce a desired number of partitions, instead of partitioning the entire graph to find all the interconnected networks.

A sanctioned node may have one or more highly interconnected networks. Each highly interconnected network includes a set of highly interconnected nodes and edges. A set of highly interconnected nodes and edges can be referred to as an actor community (e.g., a sanctioned actor community). Each partition containing an actor community is connected to a community subgraph. The community subgraph allows queries that can rapidly recall the results of the community detection method. The community subgraph may also store details pertaining to risk scoring and qualitative descriptions of the community (e.g., as part of a data model). Risk score may be calculated through a variety of ways, including considering number of nodes, node types, number of edges, edge types, edge weights, and properties, or other measure. The community detection method can detect communities in a complex graph (networks of the sanctioned actor) that may not be distinctly shown in or understood from the complex graph (the graph of or overall information about the sanctioned actor). For example, highly interconnected networks in the graph may be intertwined or otherwise combined such that the system or users may not know such networks exist. The community detection method and community subgraph can provide more detail and precise reporting of nodes of interest and associated nodes than is currently possible such as in the field of financial crime and trade compliance based on information governments provide in sanctions lists. The community detection method and community subgraph can also provide information that may not be available from the sanctions list and in a manner that can be easily digested by users. Girvan-Newman algorithm or other partition process can be connected to the community subgraph to update the community subgraph when an iteration is performed. The number of iterations can determine more or less fine-grained partitions in the graph.

A second traversal process can be executed after the community detection method to identify nodes that interact with the actor community. The identified nodes are also nodes that are not nodes of interest (e.g., not on a sanctions list) and that may present financial, trade, or other business-related risk such as financial crimes and sanctions-related risks. For example, the process starts from sanctioned nodes that are members of the community (sanction nodes that are different from the sanctioned node used to find that node's interconnected networks) and traverses through a specific edge type or relationship. For example, the process can traverse via commercial type edges and find actors that are involved in commercial activity with the sanctioned actor community. The process can further consider node types and properties of found nodes in filtering identified nodes. The identified or resulting nodes can be referred to as members of a specific dimension (e.g., commercial dimension) of the sanctioned actor community. These nodes are connected to the community subgraph so queries can rapidly recall the results of this traversal process. The community subgraph also stores details of the identified node's risk score and qualitative descriptions explaining its relationship to the sanctioned actor community. Risk score may be calculated through a variety of ways, including by weighting edges used to identify the node in the specific dimension, degrees of separation from a sanctioned node or the starting sanctioned node (e.g., the starting node in the community detection method), or other measure. As discussed and generally understood, the embodiments to sanctions are also illustrative of embodiments to more generally involves nodes of interest.

The results generated from executing the above methods or traversal processes can be accessed and shown via an interface of the system such as the visual interactive interface in the production environment. For example, a user can input research data and select a criterion, a relationship type, or risk type from the interface (a query). The selection determines the traversal process the system uses to find associated nodes. The interface may provide additional commands (e.g., buttons) for selection after selecting a criterion. For instance, when ownership is selected, the interface may provide an option allowing users to enter a percentage representing a sanctioned node's share of ownership in a non-sanctioned node. After entering the information, the interface would automatically present a graph, such as those shown in FIGS. 10, showing, for example, the extent of the financial crimes and sanctions-related risk spreading from the sanctioned node (e.g., nodes that are not on a sanctioned list but are connected to the sanctioned node in some way and may present risk). For example, the sanctioned node may be presented in a location on the visual workspace and some of the associated nodes may be directly connected to the sanctioned node through the selected criterion and some of the associated nodes may be indirectly connected to the sanctioned node via one or more intermediary nodes through the selected criterion, (e.g., nodes that are not on a sanctioned list but are connected to the sanctioned node in some way and may present financial crimes or sanctions-related risk).

Figure 11A:
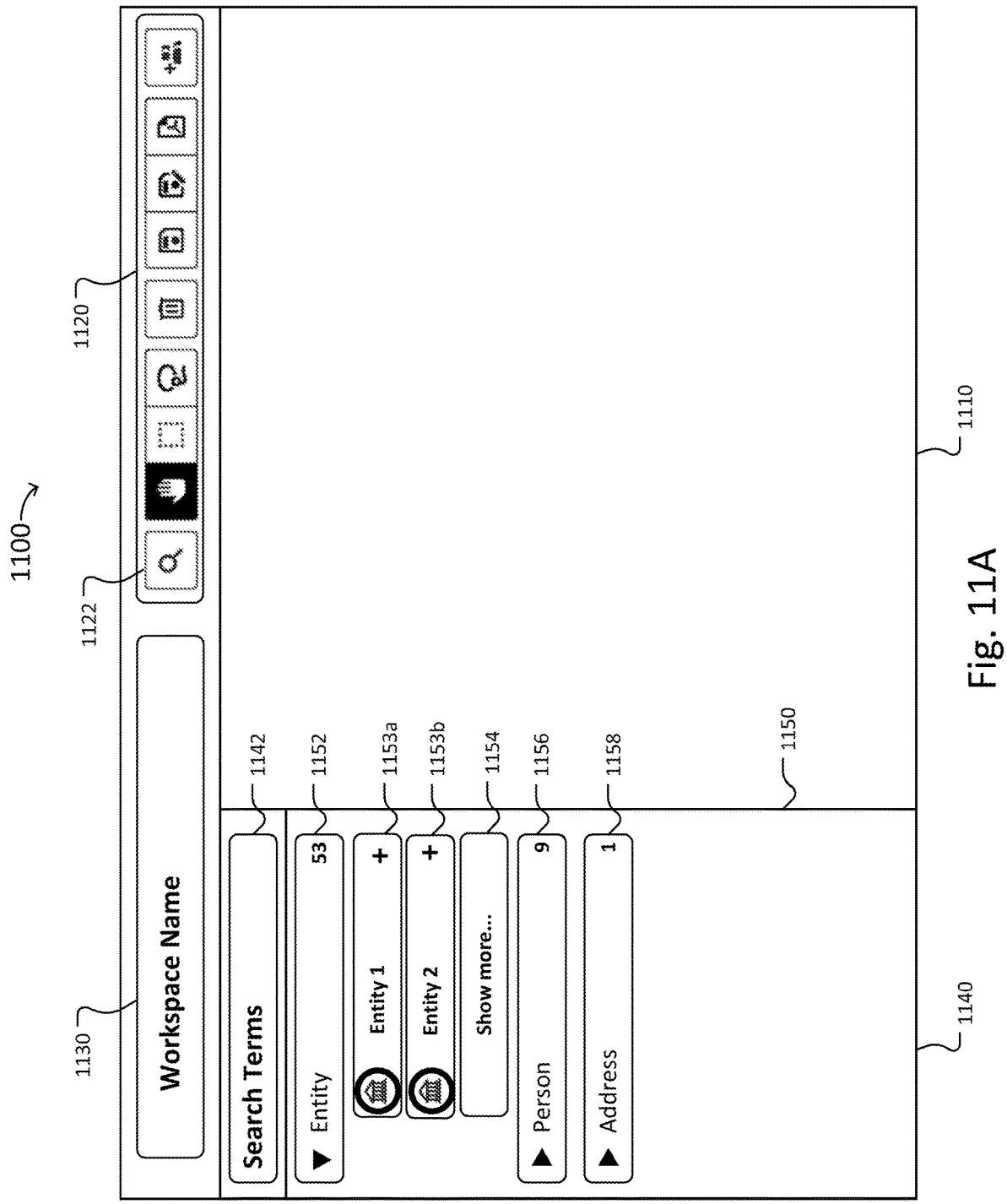
FIGS. 11A-11G depict an illustrative interactive user interface in accordance with some embodiments of the present invention.

As described above, the customer platform may include a visual workspace and interactive tools in communication with the graph database. The visual workspace may be implemented as a stand-alone application executing on a computer system of the customer and accessing the graph database. In some examples, the visual workspace is web-based, e.g., executing on a page of a web browser. In this case, the web server (e.g., in environment 120) may access the graph database. The graph database may be configured to store nodes and edges for customers' use in the production environment and store visual graphs produced and saved by customers. In some examples, the interactive tools provide for customers to research and map the commercial, financial, and facilitation networks of nodes of interest and associated actors such as sanctioned or other actors that may be associated with illicit activity, as described above. Furthermore, the interactive tools may be enhanced by subgraphs including nodes of interest and associated nodes as described in the preceding paragraphs. For example, FIG. 11A illustrates an example visual interactive interface 1100. The interface 1100 includes a visual workspace 1110 where the user can explore nodes (e.g., individuals, organizations, or other entities) and edges (relationships) between nodes. The interface 1100 may also include a toolbar 1120, allowing the user to quickly access common functions, and a title area 1130 allowing the user to provide and/or maintain the name of the workspace (e.g., a name associated with or describing the research being performed by the user in the workspace). Using the toolbar 1120, the user may save or print the current workspace, recall saved workspaces, create new workspaces, share access to the workspace with others, and so forth. In this way, users may pursue multiple avenues of research in an interleaved or quasi-simultaneous fashion. For example, the user may store one workspace and recall another workspace to continue a previous research initiative. Graphs and/or subgraphs developed using the interface 1100 may be stored in the graph database. Within the current workspace, the user may identify nodes of interest using a keyword search to find possible matching nodes in the (graph) database. Here, the search capability may be invoked by selecting the search icon 1122 in the toolbar 1120 of the visual interactive interface 1100.

When the user invokes the search capability, the interface 1100 may present an interactive search form 1140. The search form 1140 may include a keyword input text box 1142 into which the user may enter keywords or other search terms used by the system to find or "surface" nodes in the graph (e.g., in the graph database) with properties that match the search terms. Search terms may include names, aliases, descriptions and/or addresses. The search form 1140 may provide a list 1150 of identified nodes to the user. Here, the list 1150 of identified nodes is separated into sub-lists by type of node. The sub-lists include entities (such as business organizations) 1152, persons 1156, and addresses 1158. Other sub-lists or category of nodes may also be shown, including, but not limited to, bank accounts. As shown, the persons sub-list 1156 and address sub-lists 1158 are in a collapsed state. In the collapsed state, the sub-list contents are not currently shown, but each sub-list (1156, 1158)

includes an indicator of the number of items in the list. In this example, there are nine (9) people in the person sub-list 1156 and one (1) address in the address sub-list 1158. The user may selectively expand each list to explore the items in each list surfaced by the search. Here, entity sub-list 1152 is shown in a partially expanded state. As shown, there are a total of fifty-three (53) entities in the entity sub-list 1152, two of which are currently displayed (1153*a*, 1153*b*). The user may cause the interface 1100 to display additional entities by selecting the "Show more" button 1154. The interface 1100 may indicate the sanctioned status of each entity as a node of interest such as by indicating it to have a sanctioned status, e.g., using an icon or other visual indication. Here, the interface 1100 displays an entity icon preceding the entity name for each displayed entity 1153. If the entity is a node of interest such as being sanctioned or de-listed, the interface 1100 may also display a warning indication over or adjacent to the entity icon. The interface 1100 may display information related to items in other expanded sub-lists (e.g., 1156, 1158) in a similar manner. FIG. 6 includes an example list of symbols 610 that may be used to provide information about a node displayed in a sub-list. Here, neither Entity 1 nor Entity 2 are nodes of interest, sanctioned in this example. The interface 1100 may display additional details about each identified node in response the user moving the cursor to "hover" over the displayed entity 1153, or otherwise indicating a desire to see more detailed information about the entity.

Figure 11B:
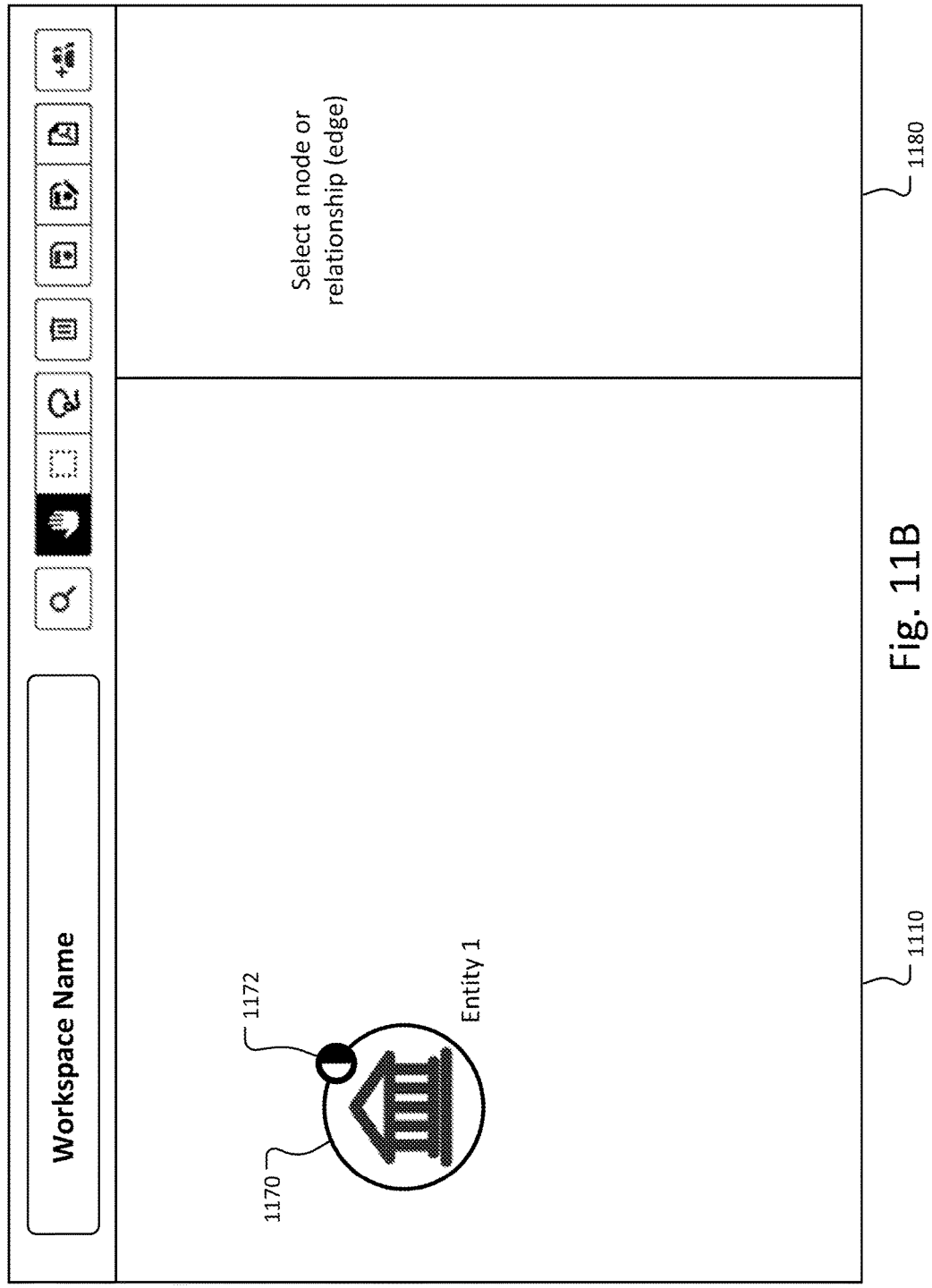

Even though neither Entity 1 nor Entity 2 are sanctioned in the example shown in FIG. 11A, the user may want to explore whether Entity 1 and/or Entity 2 have a close association with a sanctioned node, or other node of interest in the graph database. The interface 1100 facilitates exploring and understanding relationships between nodes in the graph. For example, the user may select one or more nodes from the list 1150 of identified nodes for display in the visual workspace 1110 of the interface 1100. Here, the user may add entities from the entity sub-list 1142 (such as Entity 1 or Entity 2) by selecting the plus sign (+) displayed to the right of the entity name. Similarly, the user may add people from the persons sub-list 1156 (after expanding the persons sub-list 1156 to display identified nodes) by selecting the plus sign (+) displayed to the right of the person name (not shown). As each node is added to the workspace 1110, the interface may automatically display connections between the displayed nodes, if such connections are stored in the graph database. The interface 1100 may facilitate adding nodes to the workspace 1110 in additional ways, including dragging the corresponding icon from the sub-list to the workspace 1110, right clicking on the entity name, etc. In response to the user selection, the interface 1100 displays a visual graphic representing the selected entities and/or persons (and/or other selected nodes) in the visual workspace 1110. FIG. 11B illustrates the example visual interactive interface 1100 displaying a graphic 1170 related to the user-selected node corresponding to Entity 1. Here, the visual graphic 1170 includes an additional visual graphic element 1172 as an indication that node represented by the visual graphic 1170 (e.g., Entity 1) is identified by one or more defined traversal rules (relying on edge type) applied to the overall graph to have a defined corresponding type of relation to a node of interest (regardless of whether the one or many nodes of interest are currently displayed on workspace or are not displayed but are known in the graph) (discussed in more detail below). This relationship is sometimes herein referred to as "closely associated" for ease of discussion but it should be understood that the association can involve multiple traversals of edges and nodes between the node in the workspace and the node of interest. For clarification, the term lens is also used below to generally refer to this feature. When the traversal rule is performed, the system can save the subgraph or information representation of the subgraph in correspondence with the specific traversal rule and retrieve for display (adds the corresponding subgraph) in the current visual interface. This allows for informed navigation and quick appreciation of the landscape by itself and also in conjunction with other tools. The interface 1100 may provide additional information about nodes displayed in the workspace 1110 and relationships (graph edges) between nodes displayed in the workspace 1110. Here, the workspace 1110 includes an inspection area 1180. The user may select (or merely hover the cursor over) one of the visual graphics (e.g., 1170) displayed in the workspace 1110, causing the interface 1100 to display more detailed information about the selected node or relationship in the inspection area 1180. Multiple (separate) visual graphic elements such as element 1172 can be displayed on the visual graphic to communicate that different corresponding lenses exist for that node. The indicators as discussed here are not necessarily limited to lenses.

As described above, the system can find associated nodes by several methods that use a node of interest such as a sanctioned node. The system, through the software engine, can start traversing from a node of interest, such as the sanctioned node, through its connected edges and nodes and finds the associated nodes based on a specified criterion or traversal process. The node of interest, the associated node(s) (meaning those identified through traversal to meet the specified criteria), and the relationship(s) connecting the node of interest and the associated node(s) can be represented and saved as a subgraph according to the type of traversal (e.g., type of relationship or edge) used to identify the associated node(s). In some embodiments, the software engine performs traversals according to predefined criteria. For example, the predefined criteria may be ownership, by a sanctioned node, greater than 50%. Using that criteria, the software engine may recursively traverse connections of a node of interest (the sanctioned node) to find nodes that are at least 50% owned by the node of interest and identify those nodes as associated with the sanctioned node. The software engine may perform the traversal when a sanctioned node is added to the graph, or when a node becomes sanctioned, e.g., when the person or entity appears on a sanctions list or when updates or additions are performed. As described above, the software engine can use additional criteria to perform a traversal process to identify other types of associations, or risk types, between nodes of interest and associated nodes. The types of associations or risk types can include sanctions risk, identifiers shared between sanctioned nodes and associated nodes, commercial, facilitation, and leadership relationships, and relationships between vessels and their operators. To satisfy the additional criteria, the software engine can also perform traversal processes that include other types of nodes, edges, and properties. The result of these traversals may be subgraphs which include the associated nodes and the connections traversed to identify the associated nodes. In some examples, when a node becomes node of interest such as a sanctioned node or similar type of node, the software engine performs traversals according to a number of predefined traversal types and criteria, generates a number of subgraphs, and stores the generated subgraphs (which may include other nodes found by the traversal process to be closely associated with the node of interest, for example, sanctioned node) in the graph database. Subsequently, when a node is displayed in the workspace 1110, the interface 1100 may access the graph database to determine whether the displayed node is an associated node in a stored subgraph. As can be understood, an associated node indicates that the traversal rules (in connection for example with a corridor, list, lens, etc.) have identified that node to meet the particular traversal rules with respect to a node of interest. If the displayed node is an associated node, the interface 1100 may add the additional visual graphic element 1172 as an indication that the node represented by the visual graphic 1170 (e.g., Entity 1) is currently a specified "hit" from an identification process adapted to identify entities (other than node of interest such as a sanctioned entity) that have an associated risk stemming from relationship directed path to a node of interest such as a sanctioned node (or similar node), as described above. The additional visual graphic element 1172 may also indicate the traversal type. Here, the additional visual graphic element 1172 shows a circle which is half filled. The half-filled circle indicates 50% ownership by a sanctioned node as an example.

In some embodiments, users may define specific traversal types and/or criteria to meet specific requirements. For example, a user may want to identify nodes that are at least 50% owned by a node of interest that is not a sanctioned node (e.g., if the user has reason to believe that a node may become a sanctioned node). Or the user may want to identify nodes that are at least 30% (or other value) owned or controlled by a sanctioned node, rather than at least 50% owned by a sanctioned node. In some examples, the software platform allows users to define custom traversal types and/or criteria. The software platform may perform the custom traversals on the graph database and store the resulting subgraphs in the graph database. The software platform may perform custom traversals on demand by the user, or when the graph database is updated. The software platform may provide for the user to manage custom traversal types and/or criteria, e.g., to edit and/or refine the criteria, to selectively enable and disable traversals, etc. Subsequently, when a node is displayed in the workspace 1110, the interface 1100 may add the additional visual graphic element 1172 as an indication that node represented by the visual graphic 1170 (e.g., Entity 1) may be closely associated with a node of interest according to a custom traversal. The results generated from executing one or more of above traversal processes, including custom traversal processes, can also be produced in a data export format, suitable to be ingested into another computer system. The data export may include textual and/or alphanumeric node identifiers and other information related to the associated nodes and the traversed edges. The table may be saved as JSON, XML, or comma-separated values (CSVs) or in a spreadsheet format, such as Excel.

Figure 11C:
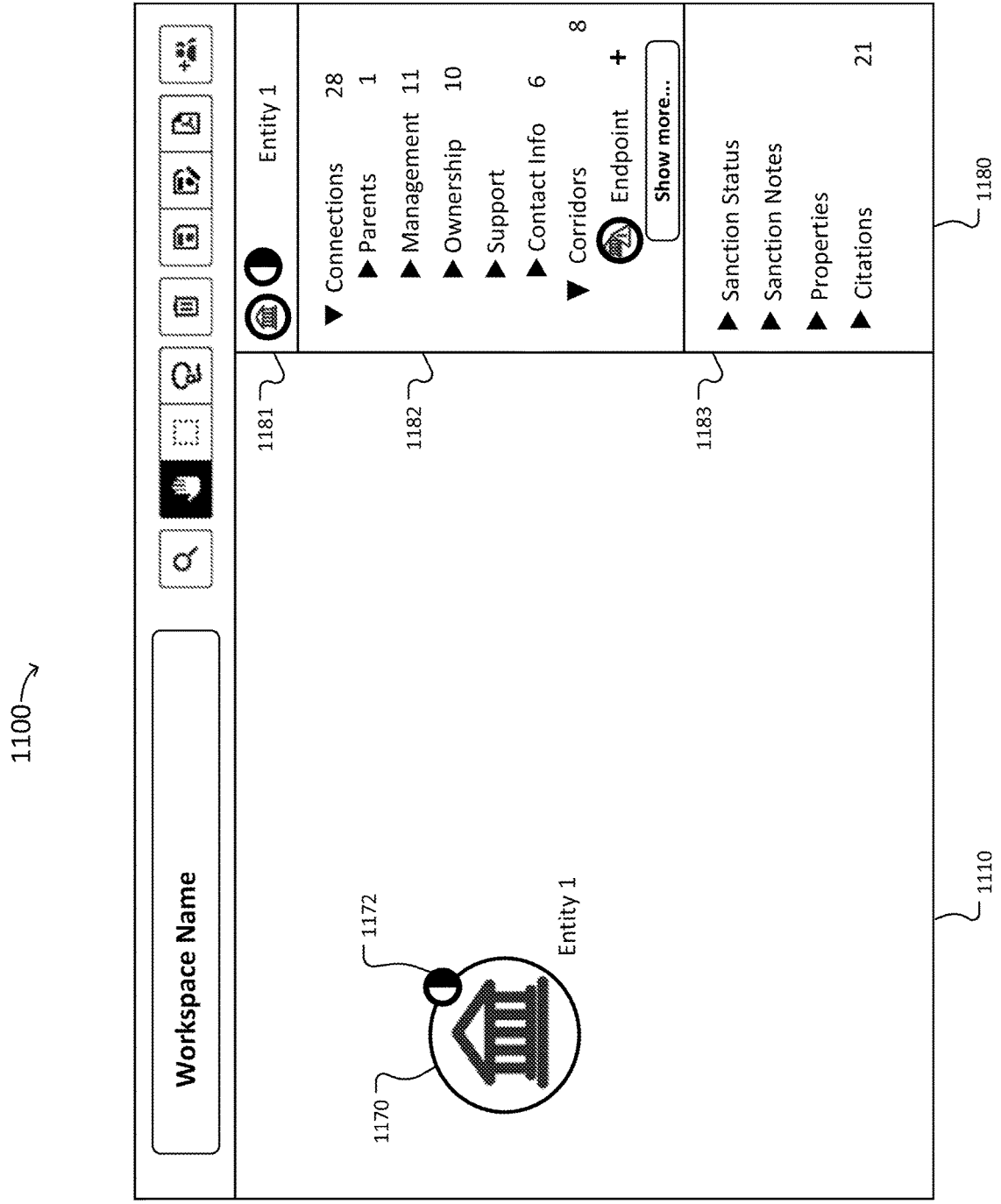

FIG. 11C illustrates the example visual interactive interface 1100 displaying, in the inspection area, detailed information related to Entity 1. Here, the inspection area 1180 displays detailed information about a node (Entity 1). The inspection area includes a title region 1181, a relationship region 1182, and a detailed information region 1183. The detailed information region 1183 may include information related to the node including whether the node is a sanctioned person or entity, any notes related to the sanction status of the node, any other property of the node, or annotations applied to the node, and citations to supporting documentation related to the node, the sanction status of the node, properties of the node, etc. The title region 1181 includes an icon indicating the type of node. Here, the node type is entity. Therefore, the interface displays the entity icon from the list of icons of FIG. 6. The title region 1181 also includes information that is also displayed in the workspace 1110, including the name of the node (Entity 1), and the visual graphic element 1172 indicating that Entity 1 may be closely associated with a node of interest. The relationship region 1182 provides information related to connections (graph edges) between Entity 1 and other nodes in the graph database. The relationship region 1182 may indicate the total number of connections (e.g., 28) between Entity 1 and other nodes in the graph database. The relationship region 1182 may provide separate sub-lists for different types of connections. Here, Entity 1 has one parent relationship with another node (e.g., an entity node), eleven leadership and/or management relationships with other nodes (e.g., persons), ten ownership relationships, and six items of contact information that may match with other nodes in the graph database. The Connections list is shown in an expanded state, showing each sub-list. Each sub-list (parents, management, ownership, support, and contact info) are shown in their respective unexpanded states. The user may expand one or more sub-list to access items contained in each sub-list. The interface 1100 may facilitate exploring connections between nodes in additional ways. For example, the interface may present a popup dialog in response to the user selecting the visual graphic 1170 displayed in the workspace 1110. The popup dialog may allow the user to select individual connections to be displayed in the inspection area 1180 or elsewhere in the interface 1100.

The relationship region 1182 may also provide information related to corridors or pathways between Entity 1 and corridor endpoint nodes. As described above, corridors may be automatically added to the production environment when or in response to being found by the software engine 135. The interface 1100 may access the graph database to obtain corridor information, including the corridors from a node (e.g., Entity 1) to a corridor endpoint node. The interface 1100 facilitates exploring corridors by presenting the list of corridors from the graph database in the relationship region 1182 of the inspection area 1180. Here, Entity 1 has eight associated corridors. That is, in this example, the software engine 135 found eight pathways from Entity 1 to a node that is identified on a sanctions list (e.g., following the corridor traversal rules described above). As shown, the corridor sub-list is shown in a partially expanded state. Here, one corridor is shown, identified by the name of corridor endpoint node. An icon is also displayed indicating that the sanctioned node is an entity. The user may cause the interface 1100 to display additional corridors by selecting the "Show more" button, as described above with respect to the entity sub-list of FIG. 11A. The user may add the displayed corridor endpoint by selecting the plus sign (+) displayed to the right of the endpoint name. In response, the interface 1100 may display the entire corridor, and may also display connections and intervening nodes between the corridor endpoint and the node displayed in the inspection region 1180. The interface 1100 may facilitate adding corridor endpoints to the workspace 1110 in additional ways, including dragging the corresponding icon from the corridors sub-list to the workspace 1110, right clicking on the corridor endpoint name, etc. In this way, a user may explore relationships between the node identified in a keyword search and sanctioned nodes. The interface may include features to address overcrowding in the workspace 1110, e.g., after a user selects several corridors for display, resulting in many nodes and edges being displayed. The interface 1100 may include a zoom feature, allowing the user to zoom in to view a particular subset of the workspace 1110, or to zoom out to view the entire set of nodes and relationships in the workspace 1110. The interface 1100 may include the ability to select individual nodes and/or connections or select groups of nodes and/or connections, e.g., by defining a bounding box or free-form perimeter around the nodes and/or connections to be selected. Furthermore, the interface 1100 may include a delete function (e.g., in the toolbar) allowing the user to selectively remove nodes and edges from the workspace 1110.

Figure 11D:
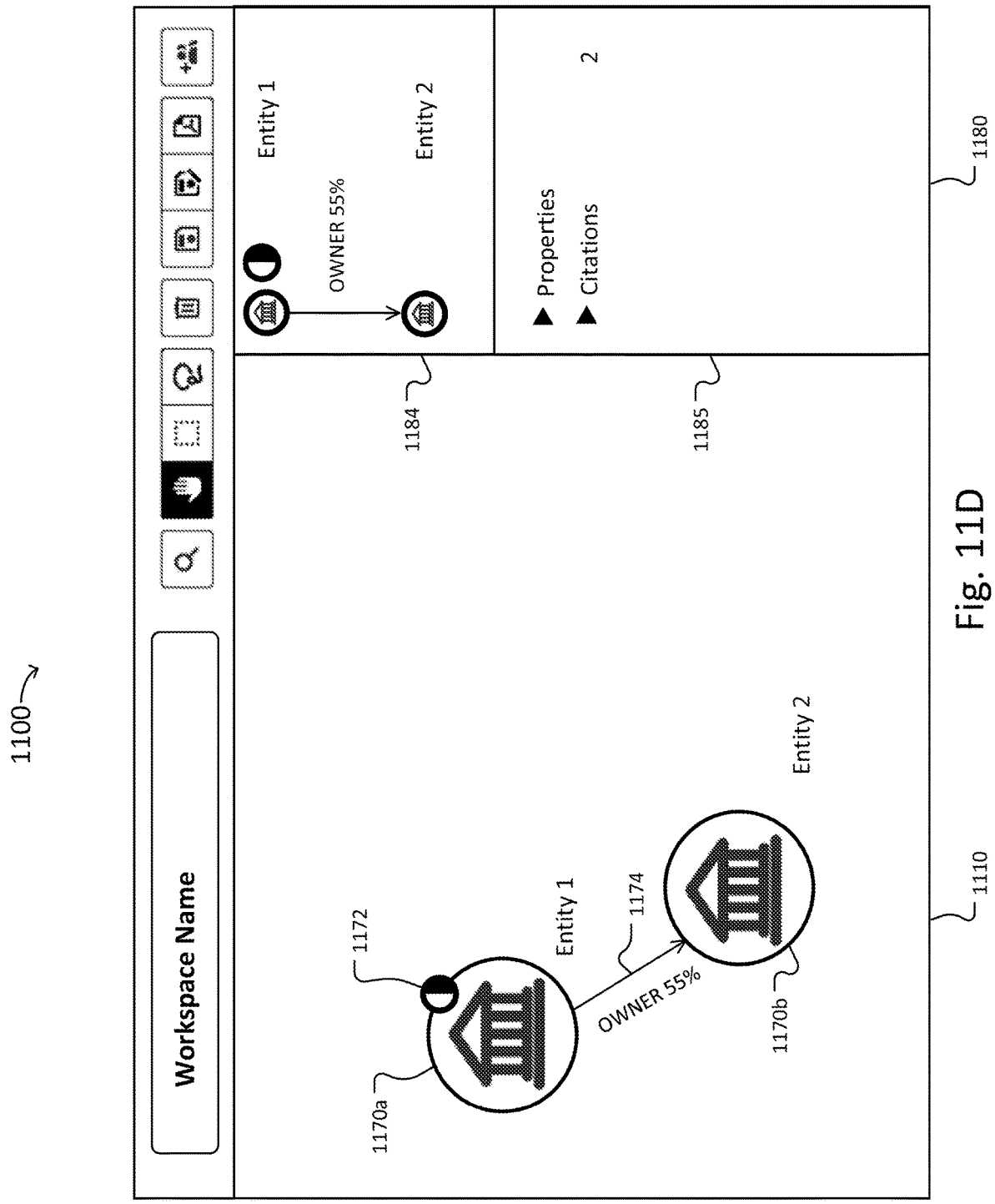

FIG. 11D illustrates the example visual interactive interface 1100 displaying graphic 1170a, 1170b related to nodes corresponding to Entity 1 and Entity 2, respectively. For example, the user may have selected both Entity 1 and Entity 2 from the Entity sub-list of FIG. 11A. In response to displaying graphics 1170a, 1170b corresponding to multiple nodes, the interface 1100 may automatically display an additional graphical element 1174, such as a line indicating the relationship between nodes represented by relationship graphics (e.g., 1170a, 1170b) displayed in the workspace 1110. Here, the relationship between Entity 1 and Entity 2 is an ownership relationship. In response to the user causing Entity 1 and Entity 2 to be displayed in the workspace, the interface displays graphical element 1174 to indicate the ownership relationship (an edge). The relationship graphic 1174 includes an arrowhead indicating the direction of the relationship and associated text indicating the type of relationship (e.g., ownership) as well as a property or weight of the relationship (e.g., 55%). Here, the arrowhead and text indicate that Entity 1 owns 55% of Entity 2. The relationship graphic 1170 may display additional information associated with the relationship in various ways. For example, the interface may display the line as a dashed line to indicate a prior relationship. The user may select (or merely hover the cursor over) one of the visual graphics (e.g., relationship graphic 1174) displayed in the workspace 1110, causing the interface 1100 to display more detailed information about the selected node or relationship in the inspection area 1180. Here, the user has selected the relationship graphic 1174 between Entity 1 and Entity 2. When the inspection area 1180 displays relationship information (i.e., information about a relationship between nodes), the inspection area may include a relationship title region 1184 and a detailed relationship information region 1185. The detailed relationship information region 1185 may include any property of the graph edge or annotation applied to the edge and citations to supporting documentation related to the edge. The system is configured to provide an option in the graphical user interface to retrieve the supporting document in connection with a node or other features and to review the supporting document. As described above with respect to other sub-lists, the sub-lists of the relationship information region 1185 may be displayed in expanded or collapsed states and may include indication of the number of items in the sub-list. The user may expand one or more sub-lists to access items in the sub-list. The relationship title region 1184 may include a graphical representation of the edge, the nodes connected by the edge, and additional edge-identifying information. Here, the relationship title region 1184 includes the names of the connected nodes (Entity 1 and Entity 2), the type of edge (OWNER), properties of the edge, such as direction and percentage ownership, and an additional graphic element (similar to graphical element 1172) indicating that Entity 1 may be closely associated with sanctioned nodes.

Figure 11E:
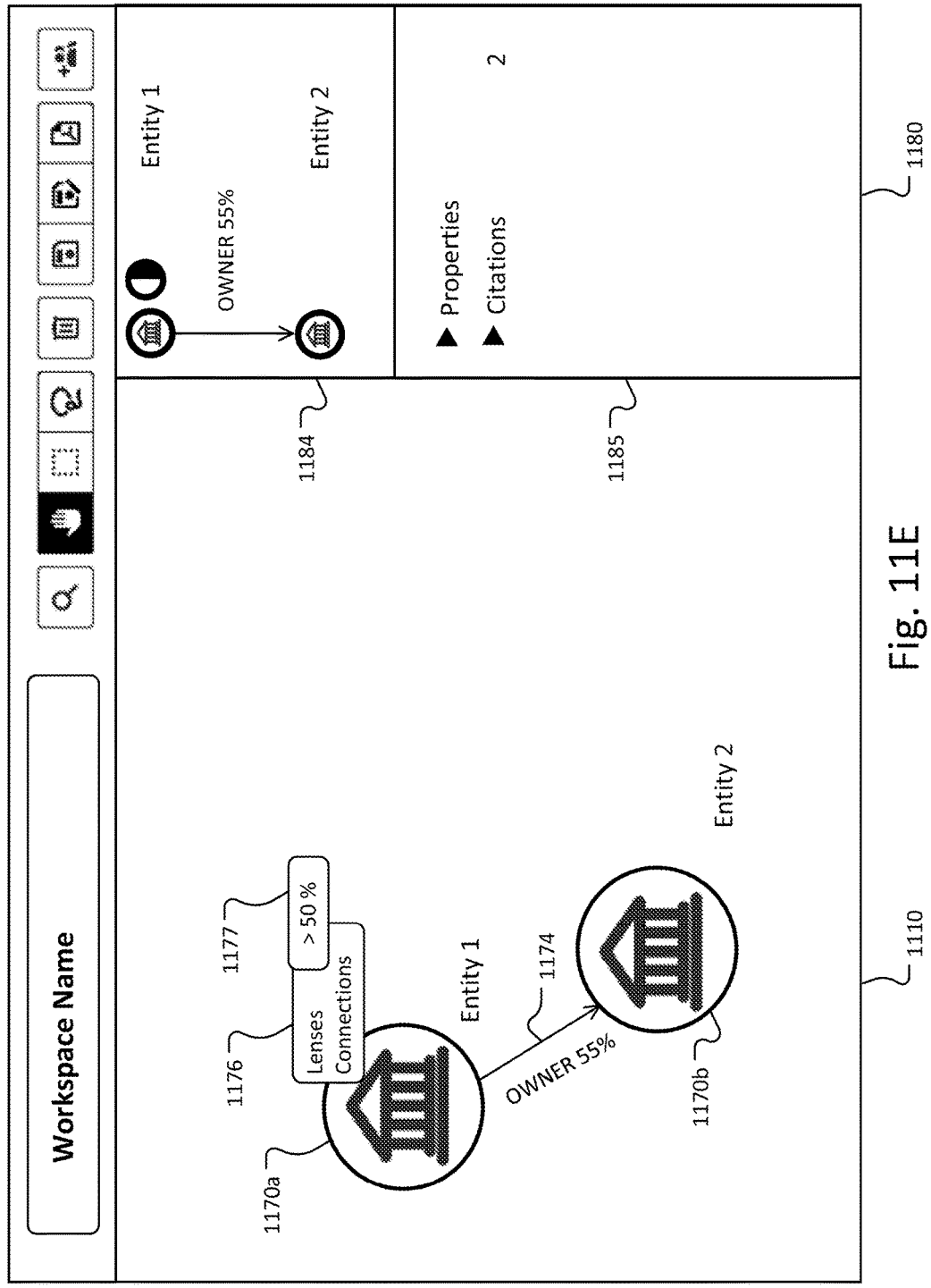
Figure 11F:
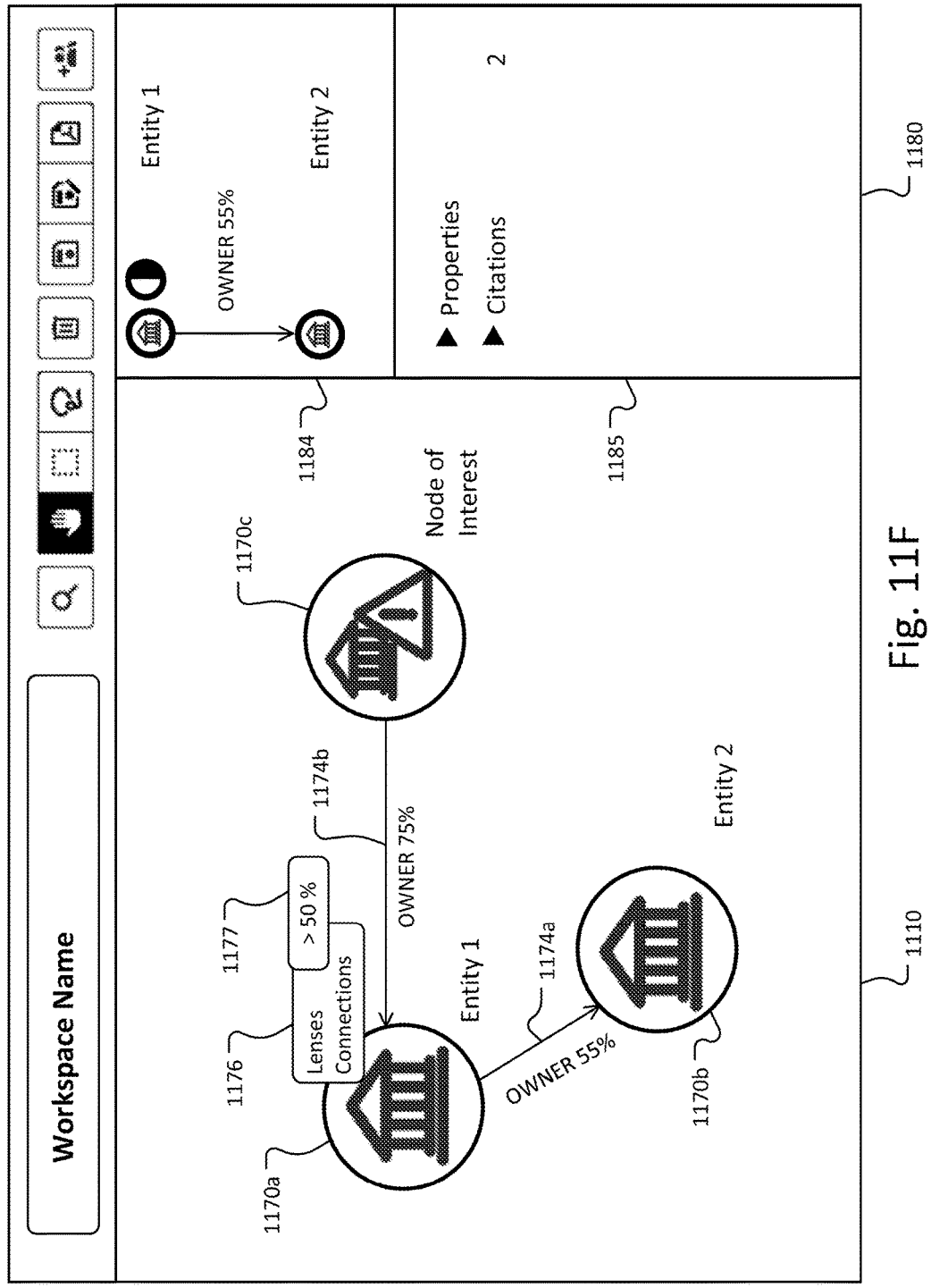

As described above, the interface 1100 may add the additional visual graphic element 1172 as an indication that node represented by the visual graphic 1170 (e.g., Entity 1) may be closely associated with a node of interest (e.g., a sanctioned node). That is, the node represented by the visual graphic is included in a subgraph resulting from one or more traversal processes described above to find nodes that are associated with a node of interest (i.e., nodes that are found by or that satisfy the traversal process). Traversal processes may be referred to as "lenses" through which associated nodes are "seen" from the perspective of the node of interest and the complex view created from a graph of nodes of interest and other nodes and edges. To further facilitate exploring the association, the additional visual graphic element 1172 may be selectable, allowing the user to access more information about the lens, such as the node of interest, the traversal criteria and process, and the resulting subgraph. In some examples, Lens information is accessible in response to right-clicking on the additional visual graphic element 1172 or hovering the cursor over the additional visual graphic element 1172 or provided by the interface 1100 through a menu selection. FIG. 11E illustrates the example visual interactive interface 1100 displaying a popup menu 1176 in response to the user selecting the additional visual graphic element 1172. Here, the popup menu 1176 provides the user with two options. The user may select the "Connections" option to access connection information associated with Entity 1, similar to the information available in the Connections sub-list of the relationship information region 1182 described above. These are direct one edge links in the graph extending from that node. The user may also select the "lenses" option to access lens information. This can include a process to check whether traversal rule is satisfied and retrieve an available subgraph (e.g., involving more than one edge and one node). In some examples, when the user selects the "lenses" option, the interface displays a second popup menu 1177. The second popup menu 1177 displays all the traversal processes (lenses) that resulted in subgraphs containing the node represented by the visual graphic 1170 (e.g., 1170a, Entity 1). Here, Entity 1 is only contained in the ">50%" subgraph (Entity 1 is more than 50% owned by one or more sanctioned nodes). In some examples, a node may be found in multiple lenses. The user may select which of the multiple lenses to explore. Referring to FIG. 11F, in response to the user selecting the ">50%" option of the second popup menu 1177, the interface 1100 displays the subgraph in the workspace 1110. As discussed earlier, the results of each traversal process can be saved as a subgraph in the system. The subgraphs allow queries to rapidly recall the results of those traversal processes. Variations are contemplated. In response to the user selecting one of the options in second popup menu 1177, the system may recall the corresponding subgraph or the applicable nodes from the corresponding subgraph and display the subgraph and/or nodes in the workspace 1110. In some examples, the interface 1100 displays additional nodes and relationships of the subgraph that are not already displayed, and automatically establishes connections between the previously displayed node and the newly displayed nodes. Here, the newly displayed node 1170c is node of interest. Because, in this example, the node of interest is a sanctioned entity, the interface 1100 displays the sanctioned entity icon, including a warning sign. The interface 1100 automatically displays the relationship graphic 1174b between the visual graphic 1170a representing Entity 1 and the visual graphic 1170c representing node of interest. Here, node of interest owns 75% of Entity 1, which is why Entity 1 was found by the ">50%" traversal and included in the ">50%" subgraph. From this configuration, the user may select (or hover over)

relationship graphic 1174*b* or visual graphic 1170*c*, causing the interface 1100 to display information about the node and or connection in the inspection area 1180. In the example shown in FIG. 11F, only one node and one connection are newly displayed in response to user selecting the ">50%" option. However, in other examples, e.g., examples with large subgraphs, selecting the ">50%" option may cause multiple nodes and edges to be displayed as a group in the workspace 1110.

Figure 11G:
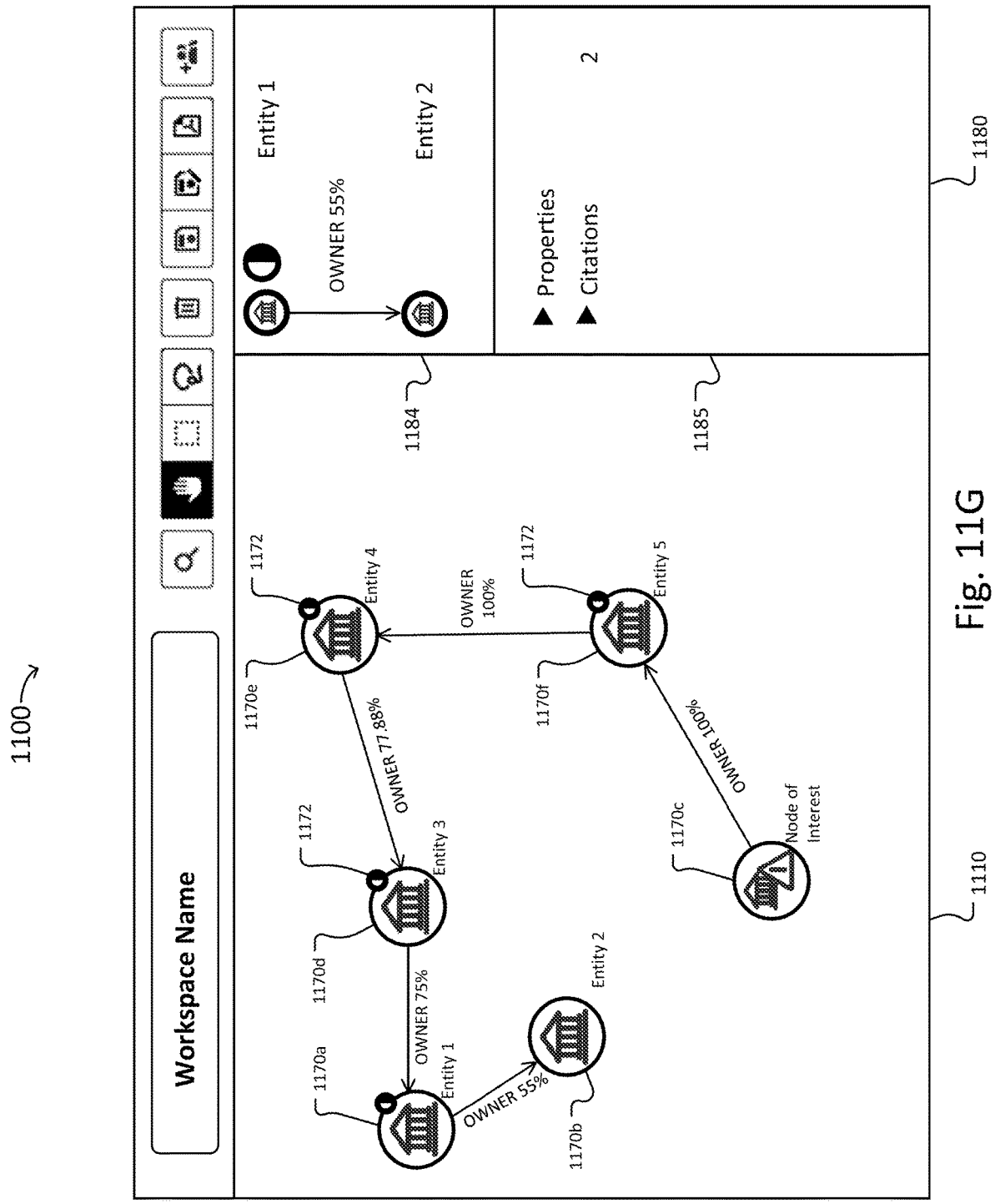

Referring to FIG. 11G, a larger sub-graph is displayed in response to selecting the ">50%" option. Here, nodes Entity 3 (1170*d*), Entity 4 (1170*e*), and Entity 5 (1170*f*) are displayed in addition to Node of Interest 1170*c*. The interface 1100 automatically placed the nodes in the workspace 1110 so that the nodes and the relationships (edges) between nodes can be easily viewed, examined, and understood by the user. The subgraph represents nodes found during an ownership traversal of edges of Node of Interest 1170*c* and contains all nodes directly or indirectly owned at least 50% by Node of Interest 1170*c*. The interface 1100 displays an additional visual graphic element 1172 as an indication that the newly added nodes of the subgraph are all at least owned 50% or more by Node of Interest 1170*c*. As such, when a user adds a node to the workspace, the system is configured to automatically inform the user of all or some of the pathways between the added node and nodes already displayed in the workspace. This can for example be all paths between existing nodes in the workspace to the node being added or can be subject to a qualification by the system such as adding corridors if one exists between the added node and an existing node in the workspace. This provides an implicit clarification that is beneficial to the user since the user may be adding a corridor along one line of investigation and the addition of the implicit corridor involving other nodes in the workspace can automatically enhance the user's understanding and navigation of the data. The system would check for such related graph content and would then retrieve the graph data and generate the visual representation for example when the node is added to show visually show the other relationship (one or more) when adding a node. This can provide great insight to the user. In some embodiments, the interface generates a shaded or dashed line visualization of these implicit paths and allows the user to decide whether to include in the workspace by user interaction. It should be understood in the figures that "entity x" or "node of interest" are used to indicate the actual entity name such as Jane Doe or Acme Corporation. The system can be configured to display a highlight such as a halo on a node of interest when it is displayed in the workspace. For example, as shown in FIG. 11G, node of interest 1170C is displayed by the system with such a halo and it is preferably displayed in a contrast color relative to the other elements such as yellow, light blue, or orange. The halo graphic can provide a quick way for the user to know and digest the potential risks arising from the node of interest. By including an indicator automatically on or more nodes of interest (e.g., as part of the lens tool), the user can quickly assess risk. The halo graphic can be adapted to light up the node by way of the color surrounding the node.

The system may be implemented using Internet protocols that make it compatible with web browsers generally available to the public (ubiquitous) so that user can quickly access and engage with the system.

Nodes of interest and their associated nodes such as sanctioned nodes and their associated nodes can be identified through the system. Users can review identified associated nodes through another interface (e.g., another web-based interface that may be different from the one above). Each entry (e.g., each associated node or a group of associated nodes) in the bulk format can be accompanied by a description that explains why the entry was provided (e.g., explaining the associated node or group, the relationship between the associated node or group and the sanctioned node, and other information). Each entry may also have a unique code that can be used to locate the entity or individual in the web-based interface and display relevant information (e.g., information about the associated node or group and other information).

As new information is introduced into the system, such as new sanctions lists or other data additions to the system, the aforementioned methods can be rerun to identify associated nodes of new nodes of interest (e.g., new nodes identified to be a point of interest because it is on a sanctioned list), update associated nodes for existing nodes, and remove existing nodes and their associated nodes. The step of updating associated nodes for existing nodes may include adding new associated nodes, deleting existing associated nodes, or updating information of associated nodes (e.g., entity name has changed), their relationships to the node of interest (e.g., 50% share of ownership in the associated node is owned by the node of interest, instead of 30%), and other information. The differences (e.g., the additions, deletions, and updates) between the old data (before rerunning with the new information) and the new data (after rerunning with the new information) can be made available via the visual interactive interface in the production environment. This information can also be provided in the form of a delta report. The changes and the new data can also be ingested by a customer system for screening, filtering, risk scoring, or other similar systems in customizable bulk format.

All of the above methods can traverse all the available nodes, edges, and properties (or entire or overall graph) in the system or graph database to identify associated nodes, and, as a result, reveal pertinent information (including indirect relationship information visible from one or more edge types). The system or graph database includes research data and other information entered by analysts or received from other sources. The process of finding associated nodes is based on the selected edge type or risk type. The process of finding associated nodes can further consider other edge types, nodes, and properties.

It is understood that although FIGS. 11A-11F are described with respect to a sanctioned node (i.e., the traversal process starts with a sanctioned node and the results are generated for that sanctioned node), those figures and their corresponding descriptions are also applicable to other financial, trade, and business risks such as other types of nodes or nodes of interest (e.g., a node that presents financial crime and sanctions-related risks but does not appear on a sanctions list, or a node or type of node (due to one or more node criteria) that is of interest to the customer such as to investigate ethics and sustainability risks or associations).

All of the above methods may be performed by the software engine, which is a software component of the system. The traversal process can be implemented sequentially, in parallel, or combinations thereof.

The system is also customizable or modifiable to provide results based on new risk relationships, to produce new actor communities, to present new risk types from research, business needs, or customer parameters or requirements. New logic and algorithms can be introduced and implemented in the system to perform those and other functions.

The results from the above methods and traversal processes can be generated on demand or live. The results can be generated only when users query a node, instead of pre-generating the results and storing the results in the database waiting for users to access them. The above methods and associated-node identification process can also be performed with no human involvement or with minimum human involvement. For example, the research data may be automatically gathered and populated by the system or other computer systems, the data, such as a sanctions list, may be automatically collected and processed by the system or other computer systems, and the traversal processes between nodes and associated nodes may be automatically performed by the system or other computer systems.

Each of the system 100, the production environments, the graph databases, and the subsystems can be implemented on one or more computer systems and be configured to communicate via a network connection. They all may also be implemented on one single computer system. In either situation, the computer system(s) can communicate with customers' client devices. The computer system(s) may also be referred to as servers. It should be understood that variations are contemplated.

In embodiments of the present invention, the graphical element that is displayed for the navigation tool to access a lens is adapted to be displayed on or over the graphic of the node such as shown in the figures using reference 1172 or 1176 (e.g., partially covering the node). The position is implemented so as to intuitively communicate the functional connection between the element and the node. Variations are contemplated such as to display the element floating or immediately adjacent in the visual workspace without the graphic element touching or overlapping with the node but in close proximity (small visual gap that shows association). In some embodiments, the graphic element is not displayed initially when the node is added to the workspace but the interface is configured to allow the user to hover a pointer over or to take some other action such as a right click while the pointer is on or near the node and in response, the interface, displays (adds) the graphical element to the display (e.g., on or over the node). The user can select (e.g., click) on the graphical element to have the subgraph added or have some intermediary step occur. In some embodiments, a text element providing additional information about financial, trade, or other business risk involved may be displayed or selected in conjunction with the graphical element. If there are multiple lenses, the interface can display the lens that resulted in the node receiving the particular categorization (and threshold criteria to a node of interest) and allow the user to select one. In response, the interface is configured to add the corresponding information (e.g., the subgraph) to the workspace. In some respect, the smaller footprint, the fewer clicks (e.g., one or two, short user action, etc.), position of information, and/or automatic addition can provide a better tool in this field. For example, graphs can already be extremely busy and complicated and by way of providing a simple way to navigate with little additional information, the interface can provide improved features to users.

In some embodiments, the system is configured to perform an inquiry to a database or in combination with a traversal when the system is prompted to the display the graphical element. In other words, the system can be configured to perform an analysis on the current node when for example the user selects to add a node to the workspace or when the user selects an option to see if the node has any lenses. This interrogation and response can be a condition before the interface displays the graphic element. Relatedly, it should be understood that in some embodiments the graph is updated continuously, regularly, or periodically and the current state of graph can cause the status of the nodes in the graph (each node) to change based on the use of the same threshold rules. As such, the lens for example may find node X this week but may not do so some time later due to changes in the graph. Thus, the status of the node is dynamic as the graph changes and is updated and it is automatically passed along to the nodes.

As mentioned, there is a significant volume of information in the field of financial, trade, and business-related risks including sanctions and financial crime compliance and there is a need to solve problems related to the user interface including the display and organization of information to provide a better electronic interactive investigational tool, that is addressed by embodiments of the present invention. For example, there are configurations and operational decisions that can provide a better tool without being too complicated (in use or visual presentation), slow, or overwhelming. The system needs to be able to aid the user and in so doing provide a balance between allowing the user to freely (free style) conduct investigations (interactive use of data) on their own and the flexibility and quickness to find the germane investigational informational content, directions, or research. In general, the configuration and operation of the interactive graphical user interface is important to provide a strong investigation tool that gains broad adoption. In some embodiments, the system is configured to determine whether an identified node (one selected by the user and added to the workspace and is the current focus of the interface) is contained in different categories of subgraphs. The subgraphs can be subgraphs that were previously identified and saved by (for example) the software engine by way of automatically traversing the graph database according to a set of rules and/or criteria. The identification may also be by manual entry by a user into the system such as an insight from a news article. A mix of automatic and manual entry is also contemplated.

Figure 12:
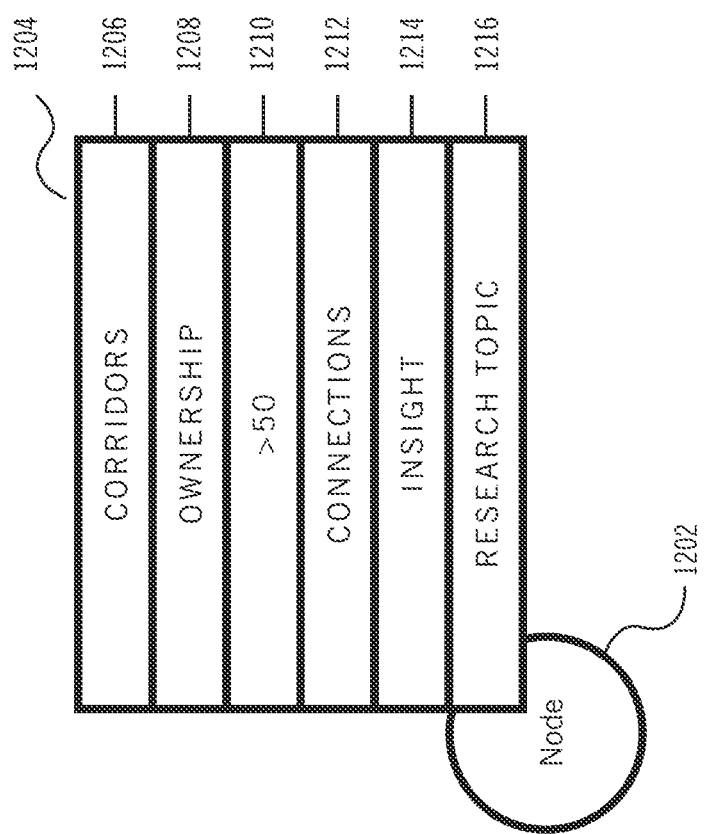
FIG. 12 depicts an illustrative interactive user interface tool that supports improved navigation features in accordance with some embodiments of the present invention.

For example, with reference to FIG. 12, the system may display node 1202 in a visual interface such as a visual workspace. The system in response to the user's selection of the node is configured to determine by retrieval, a live (current processing) process, or a combination thereof whether the node 1202 is contained in one or more subgraphs in the graph database (e.g., the full database of collected information in a graph database). The system may in response to user action (e.g., right click of a mouse over node 1202), automatically display a menu or list 1204 of options on or over node 1202. This way the user that is using a mouse or other pointing device only needs to move the pointer a short distance to the menu or list 1204. The volume of information and options presented, and the interactive feature allow a user such as a bank officer to be able to quickly investigate an individual case, which can a be significant advantage in this field of technology. In this example, the interactive list contains corridors 1206, ownership 1208, ownership >50% 1210, insight 1214, and research topic 1216. The text or a graphic display for each in menu 1204 can provide information that quickly communicates that node 1202 has been found to be contained in a subgraph for a communicated reason in the text or graphic for that option (e.g., ownership, insight, military end-use, etc.). Without such leads or automated information retrieval, the user would need to conduct individual step by step additions of nodes or edges (and visual inspection) to potentially find or understand these individual patterns and their corresponding significance. Not only that but they may need to build a graph that extends outward across multiple edges because the significant or linked value may not be evident until a larger series of edges and nodes are added (completed) which would show the indirect risk, for example, five edges away. This may take hours due to potential complexity and size of graphs. A user may not have a way to figure out or determine how far the graph network should be expanded to reach relevant assessments. Connections 1212 is included in the list and provides the option for next edge or direct connections (immediate relationships to another node), which is the way that the user can otherwise develop the working graph and understand the node better. The other options can typically represent subgraphs (or patterns) involving two or more edges and two or more other nodes, thus a more complex subgraph and pattern of information. Corridors 1206 have generally been described. Ownership 1208 when selected can retrieve a subgraph that contains a graph (connected nodes and edges) of the entities that own that entity node 1202 or shows that entity node 1202 is an owner of one or more entities downstream. Ownership >50 1210 is an option that indicates that node 1202 is owned by at least 50% of ownership by one or more nodes of interest based on a traversal of the graph of ownership edges of node 1202 (including potentially iterated traversal). Insight 124 is an option that indicates that node 1202 is contained in a subgraph prepared in connection with a particular research such as by an analyst, e.g., reflecting information in a news article, that contains node 1202 in that research. Research topic 1216 is an option that indicates that the system has saved or determined by way of node traversal in compliance with a set of rules (for a particular research topic) and/or criteria (for a particular research topic) that node 1202 (or a subgraph that contains node 1202) meets the set of rules and/or criteria. The graphic or text for option 1216 can be informative of the research such as Country X Commercial Entity Human Rights Abuse or Country Y Commercial Entity Military End Use. The labeling can be used for communicating insights. The graph traversal can be configured by the system or a user to adjust for the situation such as from a sanction node or other type of node. In response to the selection of the option, a corresponding subgraph (by retrieving graph data) is displayed in the workspace (node 1202 is already in the workspace and would not necessarily need to be added) and thus shows the corresponding pattern in the current workspace for visual comprehension and further investigation using the tools and options. The interface can be configured to allow the user to decide on the location where the graph is added and may visually demonstrate such by way of dashed lines or other visual cues when new nodes have direct or potentially indirect paths to one or more displayed nodes.

Figure 13:
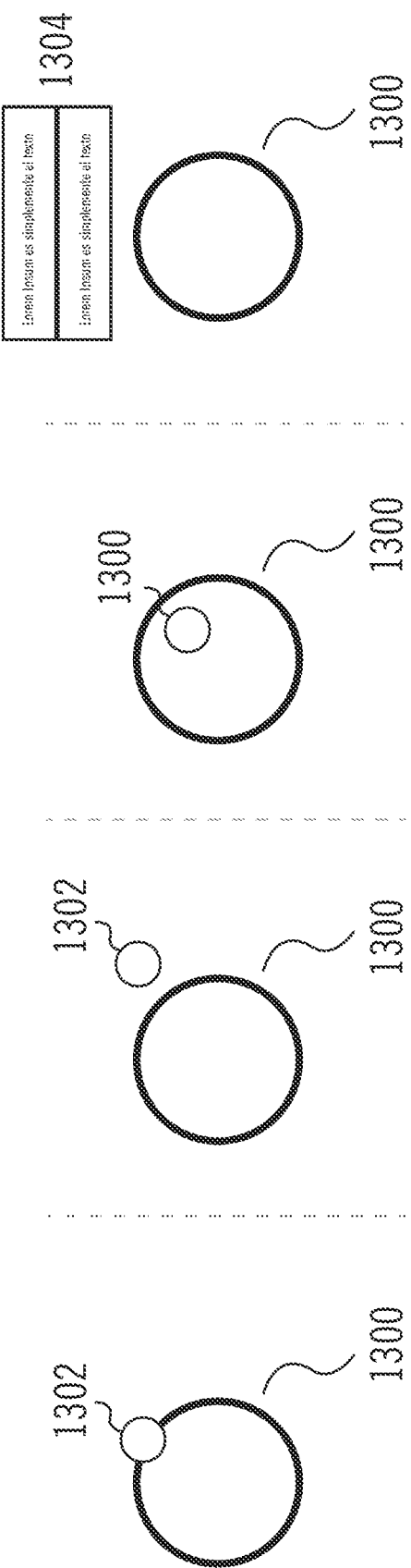
FIG. 13 depicts illustrative relationships in the visual interface between a node and related navigation functionality in accordance with some embodiments of the present invention.

The system is configured to display the visual element and/or menu/list (for discussion, visual element or visual graphical element) using a graphical representation on the display screen that is configured by the system to be displayed in a location in relation to the identified node to communicate from the viewers perspective that the element is assigned or affiliated with that node such that it is intuitively understood from the physical proximity that the element is displayed to be a related feature of that node. The use of the term displayed "on" communicates this relationship. This includes graphical relationship when the element touches, overlaps, or is located next to (in close locational association with) the displayed node. For example, FIG. 13 shows for example node 1300 and how element 1302 or 1304 is graphically displayed to have the mentioned assignment or affiliation by way of visual relationship. The element 1302 or 1304 is applied to be on the node 1300 (where in some instances the two are in close physical proximity). The element is shown in the upper right side of the node but it could be in other locations. 1304 shows a menu type option such as a pop up. This can be displayed in response to a right click or some other pointed action in connection with node 1300. It can be used in connection with element 1302 or can be opened by selecting 1302.

Figure 14:
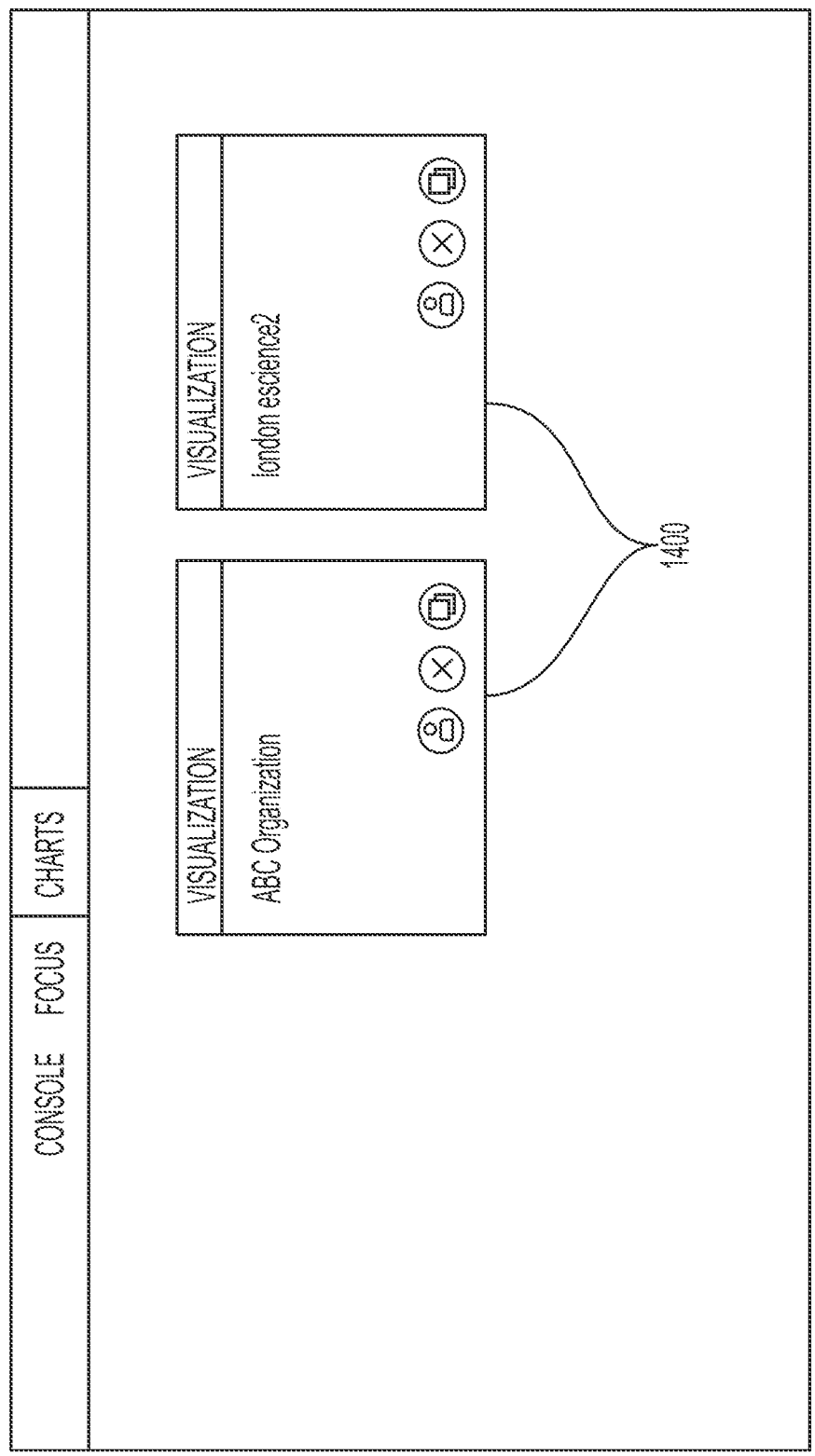
FIG. 14 depicts an illustrative display interface in accordance with some embodiments of the present invention
Figure 15:
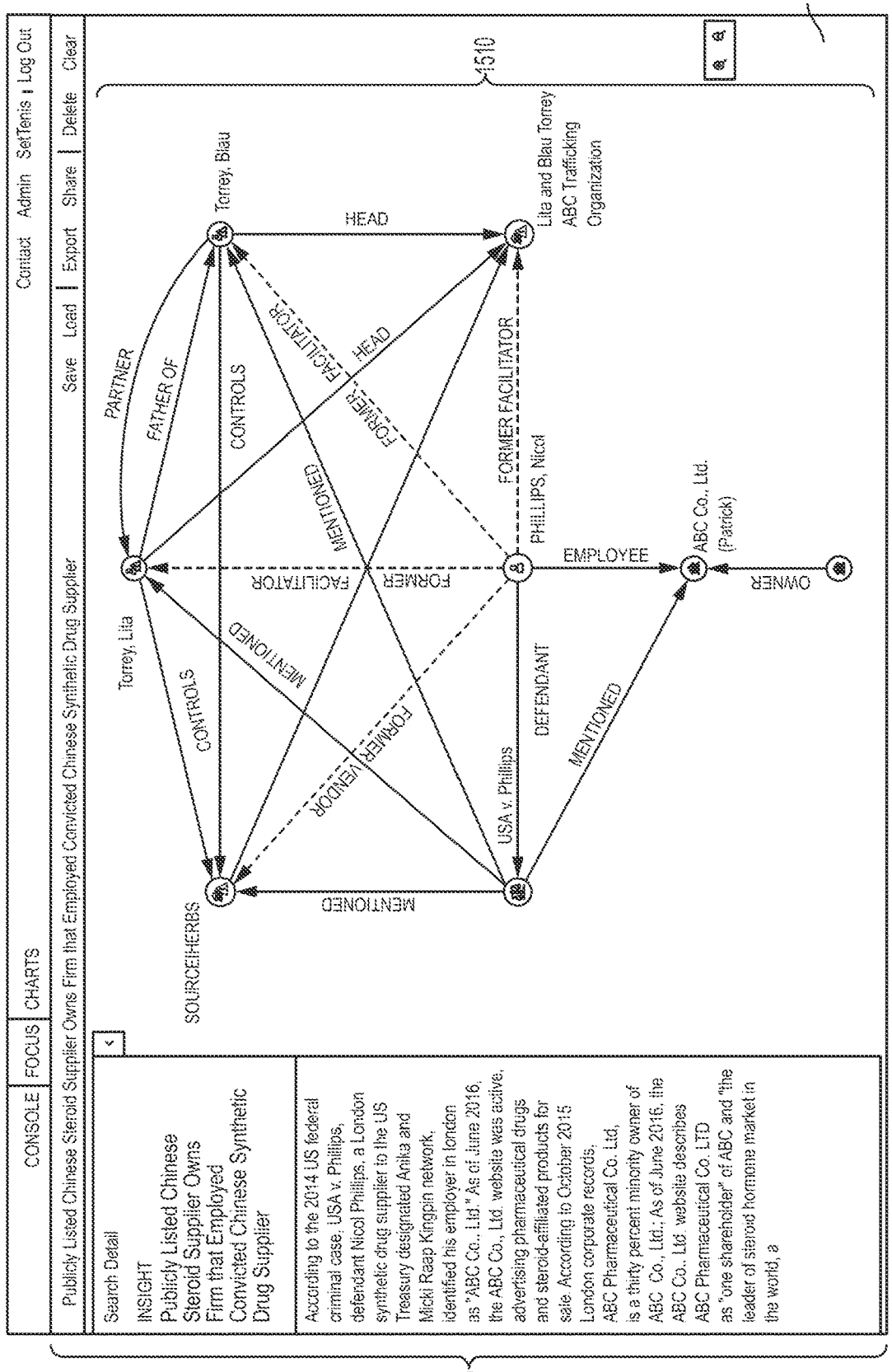
FIG. 15 depicts an illustrative structure for constructing the visual graphic of an illustrative insight in accordance with some embodiments of the present invention.

The system may save created visual graphics in the graph database, load previous created and saved visual graphics 1400 from the external graph database, and share created visual graphics 1400 as shown in FIG. 14. The visual interactive interface may allow users to export created visual graphics and the accompanying information to a particular file format (e.g., PDF, Word, Powerpoint, etc.) for saving or communicating with another computer system. The visual interactive interface also allows the customer to view graphs (subgraphs) or insights. An insight is a specific research for a particular subject or certain relationships that are illustrative, instructive, interesting, or unique. The research can be understood to include automated analysis such as that described herein. FIG. 15 depicts an illustrative insight 1500. The insight 1500 includes a short summary 1505 and a visual graphic 1510 representing the summary 1505. The insight may be provided to a customer only if an insight is relevant to or contains information that has appeared in the search or work.

Figure 16:
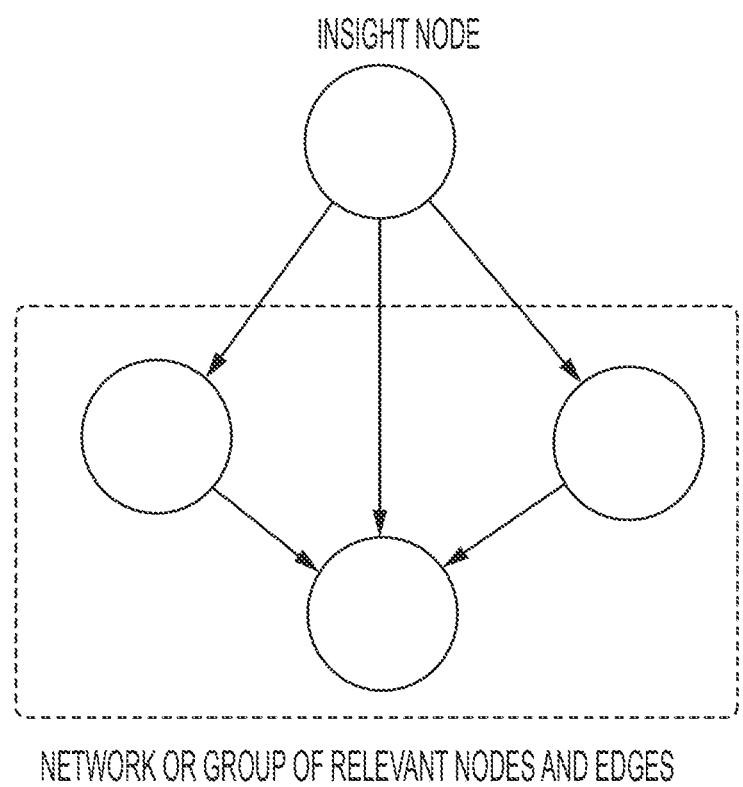
FIG. 16 depicts an insight node.
Figure 17:
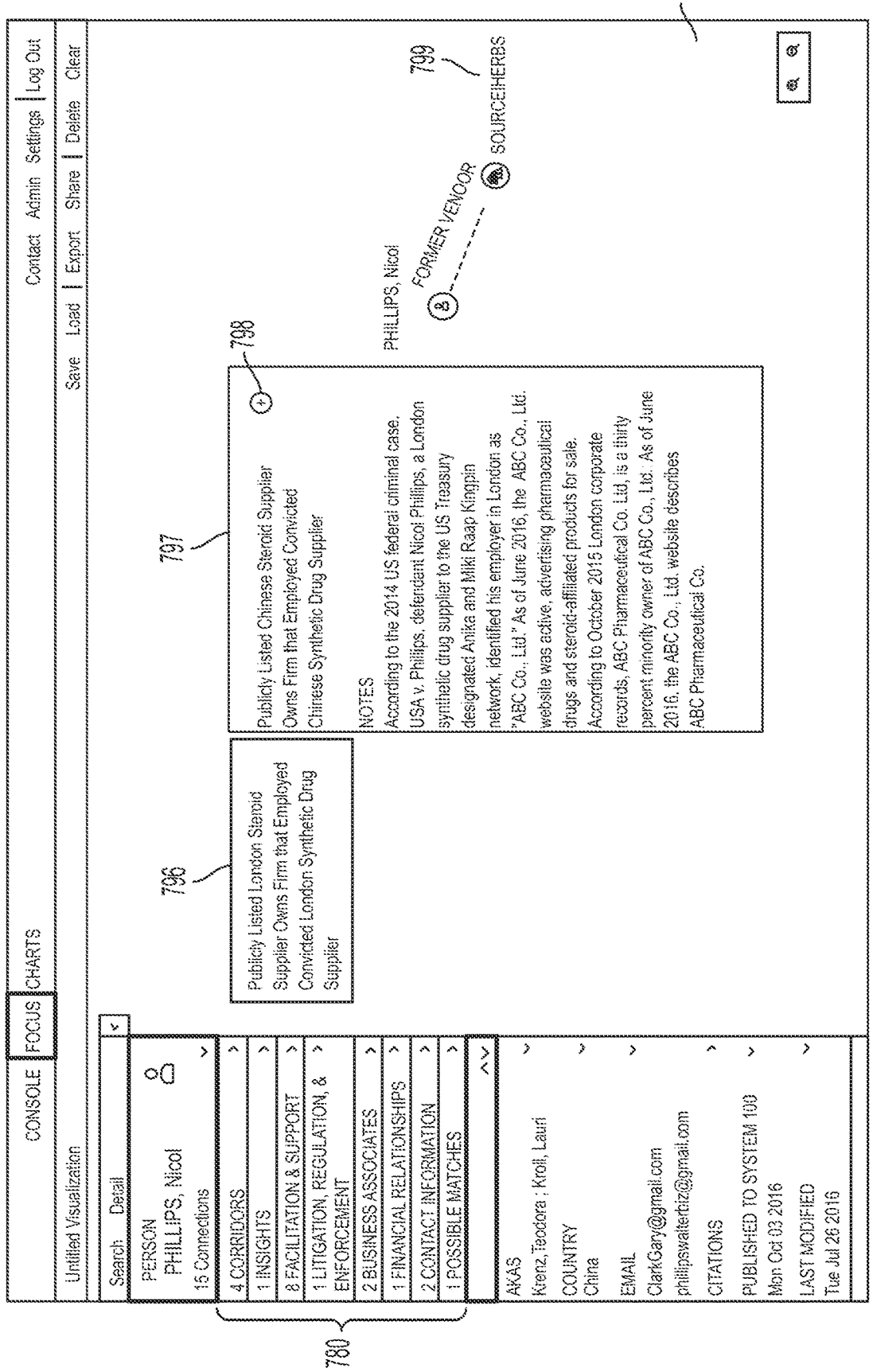
FIG. 17 depicts an illustrative features of the system in accordance with some embodiments of the present invention.

An insight may be created through an insight node with insight edges and relevant nodes and properties. An insight can be intended to provide a summary. An insight node and relevant nodes selected by analyst may have a limited number of edges or may be a node having a plurality of edges, as depicted in FIG. 16. The insight node, relevant nodes, and edges are created to form a narrative or description. FIG. 17 depicts an illustrative structure for constructing the visual graphic of an insight.

The interface may provide insights to users. The customer may access insights from the connection information 780 as shown in FIG. 17. The connection information 780 includes an insight category, and insights associated with a node will be displayed in a window 796. Upon selecting from the displayed insights in 796, the customer may view a short summary of the selected insight in another window 797 configured with a command 798 to add its visual graphic 799 to the workspace 725. Command 798 is configured to be displayed at a location relevant for navigation in relation to the displayed information.

The customer may also access insights from a location 930 that stores and displays insights as shown in FIG. 18 among other things, without the customer first querying a node or obtaining the connection information. The stored insights may be divided into different categories and the customer may select a category 935 to view insights 940 in that category. Each insight 945 may be depicted as a small window 945 displaying a portion of the brief summary. The window 945 is configured with a command 950 that can access the entire brief summary and the associated visual graphic.

As a matter of clarification, in some figures the graphical representation of the nodes are relatively larger than is implemented in the commercial version and this is for convenience in generating the figures.

The term platform is being used herein to refer to software implemented set of processes and operations that together provide an operating solution to users and is a foundation for using or adding tools or features for particular field of endeavor or application.

In one embodiment, the computer system includes a bus or other communication mechanism for communicating information, and a hardware processor coupled with bus for processing information. Hardware processor may be, for example, a general-purpose microprocessor.

The computer system also includes a main memory, such as a random-access memory (RAM) or other dynamic storage device, coupled to bus for storing information and instructions to be executed by processor. Main memory also may be used for storing temporary variables or other intermediate information during execution of instructions to be executed by processor. Such instructions, when stored in non-transitory storage media accessible to processor, render computer system into a special-purpose machine that is customized to perform the operations specified in the instructions.

Computer system further includes a read only memory (ROM) or other static storage device coupled to bus for storing static information and instructions for processor. A storage device, such as a magnetic disk or optical disk, is provided and coupled to bus for storing information and instructions.

Computer system may be coupled via bus to a display, such as a cathode ray tube (CRT), for displaying information to a computer user. An input device, including alphanumeric and other keys, is coupled to bus for communicating information and command selections to processor. Another type of user input device is cursor control, such as a mouse, a trackball, or cursor direction keys for communicating direction information and command selections to processor and for controlling cursor movement on display. This input device typically has two degrees of freedom in two axes, a first axis (e.g., x) and a second axis (e.g., y), that allows the device to specify positions in a plane.

Computer system may implement the techniques described herein using customized hard-wired logic, one or more ASICs or FPGAs, firmware and/or program logic which in combination with the computer system causes or programs computer system to be a special-purpose machine. According to one embodiment, the techniques herein are performed by computer system in response to processor executing one or more sequences of one or more instructions contained in main memory. Such instructions may be read into main memory from another storage medium, such as storage device. Execution of the sequences of instructions contained in main memory causes processor to perform the process steps described herein. In alternative embodiments, hard-wired circuitry may be used in place of or in combination with software instructions.

The term storage media as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device. Volatile media includes dynamic memory, such as main memory. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus. Transmission media can also take the form of acoustic or light waves, such as those generated during radio-wave and infra-red data communications.

Various forms of media may be involved in carrying one or more sequences of one or more instructions to processor for execution. For example, the instructions may initially be carried on a magnetic disk or solid-state drive of a remote computer. The remote computer can load the instructions into its dynamic memory and send the instructions over a telephone line using a modem. A modem local to computer system can receive the data on the telephone line and use an infra-red transmitter to convert the data to an infra-red signal. An infra-red detector can receive the data carried in the infra-red signal and appropriate circuitry can place the data on bus. Bus carries the data to main memory, from which processor retrieves and executes the instructions. The instructions received by main memory may optionally be stored on storage device either before or after execution by processor.

The computer system also includes a communication interface coupled to bus. Communication interface provides a two-way data communication coupling to a network link that is connected to a local network. For example, communication interface may be an integrated services digital network (ISDN) card, cable modem, satellite modem, or a modem to provide a data communication connection to a corresponding type of telephone line. As another example, communication interface may be a local area network (LAN) card to provide a data communication connection to a compatible LAN. Wireless links may also be implemented. In any such implementation, communication interface sends and receives electrical, electromagnetic or optical signals that carry digital data streams representing various types of information.

Network link typically provides data communication through one or more networks to other data devices. For instance, network link may provide a connection through local network to a host computer or to data equipment operated by an Internet Service Provider (ISP). ISP in turn provides data communication services through the worldwide packet data communication network now commonly referred to as the "Internet." Local network and Internet both use electrical, electromagnetic or optical signals that carry digital data streams. The signals through the various networks and the signals on network link and through communication interface, which carry the digital data to and from computer system, are example forms of transmission media.

Computer system can send messages and receive data, including program code, through the network(s), network link and communication interface. In the Internet example, a server might transmit a requested code for an application program through Internet, ISP, local network and communication interface.

The received code may be executed by processor as it is received, and/or stored in storage device, or other non-volatile storage for later execution.

Embodiments described herein are primarily described in the context of providing a tool for evaluating prospective financial crime and sanctions-related risks for businesses considering commercial dealings, but it should be understood that applications in other areas including application of particular features in other areas are contemplated.

It is understood from the above description that the functionality and features of the systems, devices, or methods of embodiments of the present invention include generating and sending signals to accomplish the actions.

It should be understood that variations, clarifications, or modifications are contemplated. Applications of the technology to other fields are also contemplated.

Exemplary systems, devices, and methods are described for illustrative purposes. Further, since numerous modifications and changes will readily be apparent to those having ordinary skill in the art, it is not desired to limit the invention to the exact constructions as demonstrated in this disclosure. Accordingly, all suitable modifications and equivalents may be resorted to falling within the scope of the invention.

Thus, for example, any sequence(s) and/or temporal order of steps of various processes or methods (or sequence of device connections or operation) that are described herein are illustrative and should not be interpreted as being restrictive. Accordingly, it should be understood that although steps of various processes or methods or connections or sequence of operations may be shown and described as being in a sequence or temporal order, but they are not necessarily limited to being carried out in any particular sequence or order. For example, the steps in such processes or methods generally may be carried out in various different sequences and orders, while still falling within the scope of the present invention. Moreover, in some discussions, it would be evident to those of ordinary skill in the art that a subsequent action, process, or feature is in response to an earlier action, process, or feature.

It is also implicit and understood that the applications or systems illustratively described herein provide computer-implemented functionality that automatically performs a process or process steps unless the description explicitly describes user intervention or manual operation.

It should be understood that claims that include fewer limitations, broader claims, such as claims without requiring a certain feature or process step in the appended claim or in the specification, clarifications to the claim elements, different combinations, and alternative implementations based on the specification, or different uses, are also contemplated by the embodiments of the present invention It should be understood that combinations of described features or steps are contemplated even if they are not described directly together or not in the same context.

The terms or words that are used herein are directed to those of ordinary skill in the art in this field of technology and the meaning of those terms or words will be understood from terminology used in that field or can be reasonably interpreted based on the plain English meaning of the words in conjunction with knowledge in this field of technology. This includes an understanding of implicit features that for example may involve multiple possibilities, but to a person of ordinary skill in the art a reasonable or primary understanding or meaning is understood.

Software can be implemented as distinct modules or software applications or can be integrated together into an overall application such as one that includes the user interface and that handles other feature for providing the functionality to the user on their device.

It is intended that the specification and examples be considered as exemplary only, with a true scope being indicated by the claims and their equivalents.

The invention claimed is:

1. A computer implemented system for providing a visual interactive software tool that permits users to investigate and evaluate financial, trade, and business-related risks, comprising:
a computer system configured to include:
a database, stored in nonvolatile memory and configured to store graph data structures comprising a plurality of different types of nodes, edges, and related properties that are used by the system to build a graph, wherein the database stores information represented as nodes, edges, and related properties;
an electronic online customer platform that includes a visual interactive interface having a visual workspace and interactive tools, the tools include a search engine that provides keyword searching capability that surfaces possible matching nodes in the database, that provides the user with the ability to add an identified node to the visual workspace, that generates a visual graphic representation of the identified node in the visual workspace, that communicates that the identified node has a certain number of connections, and that permits the user to select one of the connections to add to the visual workspace and in response displays additional nodes and edges using separate visual graphical elements for nodes and edges that visually illustrate the selected connection;
the computer system further configured to:
receive data input including selections of nodes of interest and selections of criteria that specify a type of edge to be traversed by a software engine;
implement a software engine configured to automatically traverse pathways starting from each node of interest through the types of edges specified by the criteria and identify one or more nodes in the database as associated nodes, wherein the software engine performs node traversal from each node of interest and stops traversing when a node has no edges that match the type of edge specified by the criteria and in response saves corresponding information representing the associated node of interest and, the type of edges connecting the associated nodes and the corresponding node of interest in accordance with the criteria;
wherein the electronic online customer platform is configured to determine whether the identified node is one of the associated nodes, and,
responsive to the determination, displays an interactive visual graphical element on the visual graphic representation of the identified node in the visual workspace and provides the user with the ability to interact with the interactive visual graphical element to selectively add, as a group, the edges and nodes connecting the identified node to one or more particular nodes of interest in accordance with the corresponding information; and
wherein the visual interactive interface is configured to allow the user to select a graphical representation of individual nodes displayed in the workspace and in response be presented with selectable options to add or remove individual nodes or edges to or from the visual workspace to further investigate and evaluate financial, trade, and business-related risks.

2. The computer implemented system of claim 1 wherein the corresponding information is configured to be ingested into another computer system and be displayed as in a table format, wherein the table format comprises alphanumeric names of actors represented by nodes of interest or associated nodes, identifiers for each of the associated nodes, and related textual information, and wherein the identifiers are configured to provide access to information of the corresponding associated nodes.

3. The computer implemented system of claim 1, wherein the electronic online customer platform is further configured to, in response to a user interaction with the visual graphical element, display some or all of the corresponding information.

4. The computer implemented system of claim 1, wherein the node of interest comprises a sanctioned person or entity.

5. The computer implemented system of claim 1, wherein the criteria comprises an ownership connection.

6. The computer implemented system of claim 1, wherein the visual interactive interface comprises an inspection area configured to display, in response to user selection of a node or connection, information about the node or connection.

7. The computer implemented system of claim 6, wherein the inspection area is configured to display, in response to user selection of a node, information about corridors related to user-selected node.

8. The computer implemented system of claim 1, wherein the software engine is configured to automatically traverse pathways starting from a sanctioned node in response to the sanctioned node being added to the database.

9. The computer implemented system of claim 1, wherein the visual graphical element comprises an indication of the criteria.

10. The computer implemented system of claim 1, wherein the system automatically displays a graphic representation of a corresponding connection between two nodes, based on the relationship between the nodes.

11. The computer implemented system of claim 1, wherein the system is configured to determine that the identified node corresponds to plural associated nodes and displays interactive option to select each association and retrieve a corresponding subgraph.

12. The computer implemented system of claim 1 wherein the system is configured to display a list of selectable options each corresponding to a subgraph that contains the identified node.

13. The computer implemented system of claim 1 wherein the system is configured to display a set of selectable options to add subgraphs that contain the identified node, wherein the one option corresponds to an ownership subgraph, a second option corresponds to a subgraph that comprises a connection to a sanctioned node, and third option corresponds to a subgraph related to investigational topic or theme, and wherein in response to the selection of one of the options, the system retrieves and displays the corresponding subgraph to the workspace.

14. A computer implemented method for providing a visual interactive software tool that permits users to investigate and evaluate financial, trade, and business-related risks, comprising:
   providing a database, stored in nonvolatile memory and configured to store graph data structures comprising a plurality of different types of nodes, edges, and related properties that are used by the system to build a graph, wherein the database stores information represented as nodes, edges, and related properties;
   implementing an electronic online customer platform that includes a visual interactive interface having a visual workspace and interactive tools, the tools include a search engine that provides keyword searching capability that surfaces possible matching nodes in the database, that provides the user with the ability to add an identified node to the visual workspace, that generates a visual graphic representation of the identified node in the visual workspace, that communicates that the identified node has a certain number of connections, and that permits the user to select one of the connections to add to the visual workspace and in response displays additional nodes and edges using separate visual graphical elements for nodes and edges that visually illustrate the selected connection; the method further comprising:
   storing data input including selections of nodes of interest and selections of criteria that specify a type of edge to be traversed by a software engine;
   implementing a software engine configured to automatically traverse pathways starting from each node of interest through the types of edges specified by the criteria and identify one or more nodes in the database as associated nodes, wherein the software engine performs node traversal from each node of interest and stops traversing when a node has no edges that match the type of edge specified by the criteria and in response saves corresponding information representing the associated node of interest and, the type of edges connecting the associated nodes and the corresponding node of interest in accordance with the criteria;
   wherein the electronic online customer platform is configured to determine whether the identified node is one of the associated nodes, and,
   responsive to the determination, displaying an interactive visual graphical element on the visual graphic representation of the identified node in the visual workspace and providing the user with the ability to interact with the interactive visual graphical element to selectively add, as a group, the edges and nodes connecting the identified node to one or more particular nodes of interest in accordance with the corresponding information; and
   wherein the method comprising allowing the user to select a graphical representation of individual nodes displayed in the workspace and in response be presented with selectable options to add or remove individual nodes or edges to or from the visual workspace to further investigate and evaluate financial, trade, and business-related risks.

15. The computer implemented method of claim 14, wherein the corresponding information is configured to be ingested into another computer system and be displayed as in a table format, wherein the table format comprises alphanumeric names of actors represented by nodes of interest or associated nodes, identifiers for each of the associated nodes, and related textual information, and wherein the identifiers are configured to provide access to information of the corresponding associated nodes.

16. The computer implemented method of claim 14, wherein the node of interest comprises a sanctioned person or entity.

17. The computer implemented method of claim 14, wherein the criteria comprises an ownership connection.

18. The computer implemented method of claim 14, further comprising displaying, in response to user selection of a node or connection, information about the node or connection.

19. The computer implemented system of claim 18, wherein the inspection area is configured to display, in response to user selection of a node, information about corridors related to user-selected node.

20. The computer implemented method of claim 14, wherein the software engine is configured to automatically traverse pathways starting from a sanctioned node in response to the sanctioned node being added to the database.

21. The computer implemented method of claim 14, wherein the visual graphical element comprises an indication of the criteria.

22. The computer implemented method of claim 14, comprising automatically displaying a graphic representation of a corresponding connection between two nodes, based on the relationship between the nodes.

23. The computer implemented method of claim 14, comprising determining that the identified node corresponds to plural associated nodes and displays interactive option to select each association and retrieve a corresponding subgraph.

24. The computer implemented method of claim 14, comprising displaying a list of selectable options each corresponding to a subgraph that contains the identified node.

25. The computer implemented method of claim 14 wherein the method comprises displaying a set of selectable options to add subgraphs that contain the identified node, wherein the one option corresponds to an ownership subgraph, a second option corresponds to a subgraph that comprises a connection to a sanctioned node, and third option corresponds to a subgraph related to investigational topic or theme, and wherein in response to the selection of one of the options, retrieving and displaying the corresponding subgraph to the workspace.

26. A computer-readable medium on which are encoded, computer executable instructions for carrying out a process, when executed by a computer, for providing a visual interactive software tool that permits users to investigate and evaluate financial, trade, and business-related risks, the process comprising:
  providing a database, stored in nonvolatile memory and configured to store graph data structures comprising a plurality of different types of nodes, edges, and related properties that are used by the system to build a graph, wherein the database stores information represented as nodes, edges, and related properties;
  implementing an electronic online customer platform that includes a visual interactive interface having a visual workspace and interactive tools, the tools include a search engine that provides keyword searching capability that surfaces possible matching nodes in the database, that provides the user with the ability to add an identified node to the visual workspace, that generates a visual graphic representation of the identified node in the visual workspace, that communicates that the identified node has a certain number of connections, and that permits the user to select one of the connections to add to the visual workspace and in response displays additional nodes and edges using separate visual graphical elements for nodes and edges that visually illustrate the selected connection; the method further comprising:
  storing data input including selections of nodes of interest and selections of criteria that specify a type of edge to be traversed by a software engine;
  implementing a software engine configured to automatically traverse pathways starting from each node of interest through the types of edges specified by the criteria and identify one or more nodes in the database as associated nodes, wherein the software engine performs node traversal from each node of interest and stops traversing when a node has no edges that match the type of edge specified by the criteria and in response saves corresponding information representing the associated node of interest and, the type of edges connecting the associated nodes and the corresponding node of interest in accordance with the criteria;
  wherein the electronic online customer platform is configured to determine whether the identified node is one of the associated nodes, and,
  responsive to the determination, displaying an interactive visual graphical element on the visual graphic representation of the identified node in the visual workspace and providing the user with the ability to interact with the interactive visual graphical element to selectively add, as a group, the edges and nodes connecting the identified node to one or more particular nodes of interest in accordance with the corresponding information; and
  wherein the method comprising allowing the user to select a graphical representation of individual nodes displayed in the workspace and in response be presented with selectable options to add or remove individual nodes or edges to or from the visual workspace to further investigate and evaluate financial, trade, and business-related risks.

27. The computer-readable medium of claim 26, wherein the corresponding information is configured to be ingested into another computer system and be displayed as in a table format, wherein the table format comprises alphanumeric names of actors represented by nodes of interest or associated nodes, identifiers for each of the associated nodes, and related textual information, and wherein the identifiers are configured to provide access to information of the corresponding associated nodes.

28. The computer-readable medium of claim 26, wherein the node of interest comprises a sanctioned person or entity.

29. The computer-readable medium of claim 26, wherein the criteria comprises an ownership connection.

30. The computer-readable medium of claim 26, further comprising displaying, in response to user selection of a node or connection, information about the node or connection.

* * * * *